United States Patent [19]

Endo et al.

[11] Patent Number: 4,896,950

[45] Date of Patent: Jan. 30, 1990

[54] ZOOM LENS OF HIGH POWER VARYING RATIO

[75] Inventors: Hiroshi Endo, Kanagawa; Sadatoshi Takahashi, Tokyo, both of Japan

[73] Assignee: Canon Kabushiki Kaisha, Tokyo, Japan

[21] Appl. No.: 157,241

[22] Filed: Feb. 18, 1988

[30] Foreign Application Priority Data

Feb. 20, 1987 [JP] Japan .............................. 62-038547
Feb. 20, 1987 [JP] Japan .............................. 62-038548
Apr. 24, 1987 [JP] Japan .............................. 62-101571
Apr. 24, 1987 [JP] Japan .............................. 62-101572
Jul. 2, 1987 [JP] Japan .............................. 62-166217

[51] Int. Cl.$^4$ .......................... G02B 15/14; G02B 9/64
[52] U.S. Cl. ................................................. 350/427
[58] Field of Search ......................................... 350/427

[56] References Cited

U.S. PATENT DOCUMENTS 4,437,732 3/1984 Ishiyama .............................. 350/127
4,636,040 1/1987 Tokumaru ............................ 350/427
4,749,266 6/1988 Takahashi et al. .................... 350/427

*Primary Examiner*—Bruce Y. Arnold
*Assistant Examiner*—Rebecca D. Gass
*Attorney, Agent, or Firm*—Fitzpatrick, Cella, Harper & Scinto

[57] ABSTRACT

A zoom lens is composed of, as counted from the object side of the lens, a first lens unit or group having a positive refractive power, a second lens unit or group having a negative refractive power, a third lens unit or group having a positive refractive power, a fourth lens unit or group having a negative refractive power and a fifth lens unit or group having a positive refractive power. Assuming that, when varying the magnifying power of the lens from a wide angle end to a telephoto end, an air space between an i-th lens unit and an i+1-th lens unit varies to a degree $\Delta D_i$, the i-th lens unit has a focal length $f_i$, the focal length of the whole lens system as obtained at the telephoto end is FT, and a space between the first and second lens units varies to a degree $\Delta E_1$ between the wide angle end and the telephoto end, the zoom lens is arranged to satisfy the following conditions:

$\Delta D_1 > 0$ $\Delta D_2 < 0$ $\Delta D_3 > 0$ $\Delta D_4 < 0$ $0.046 < |f_2/FT| < 0.093$ $0.22 < |f_1/FT| < 0.6$ $2.1 < |\Delta E_1/f_2| < 3.6$.

14 Claims, 46 Drawing Sheets

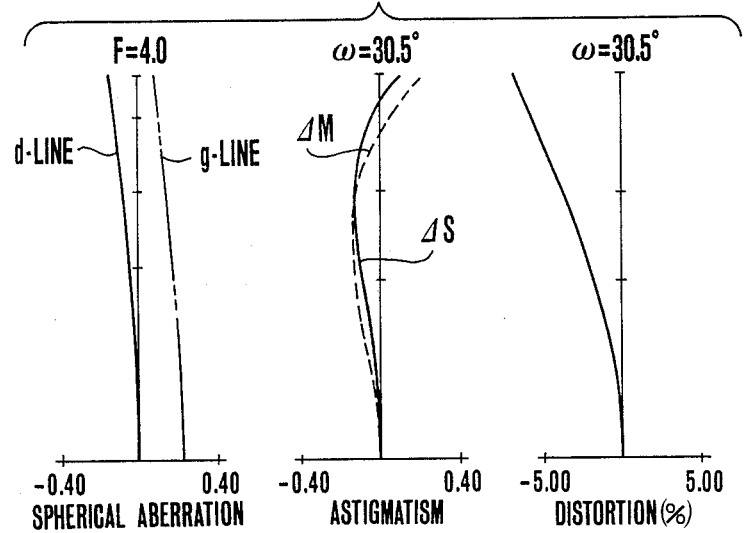
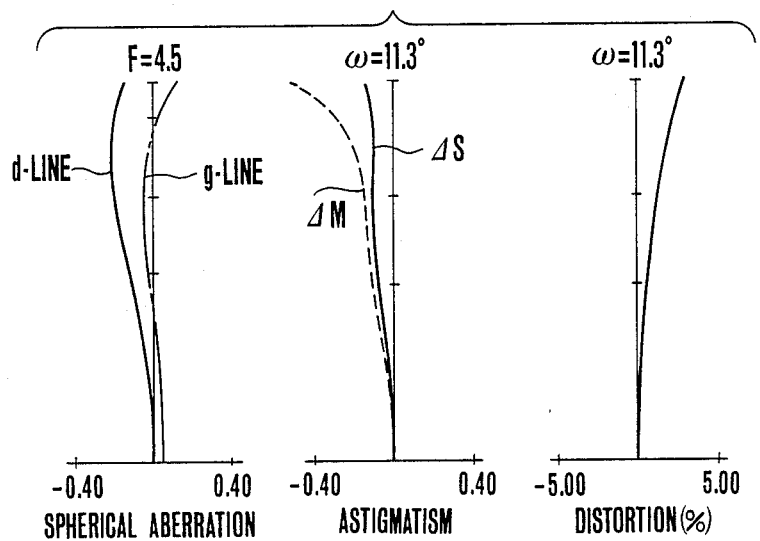

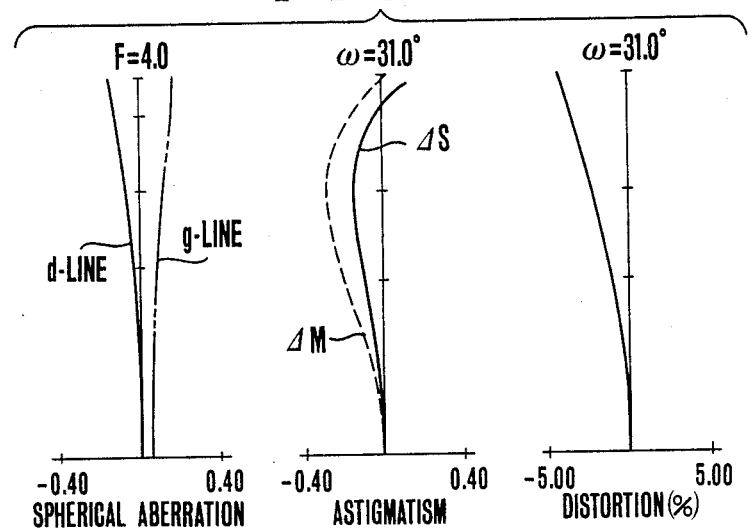
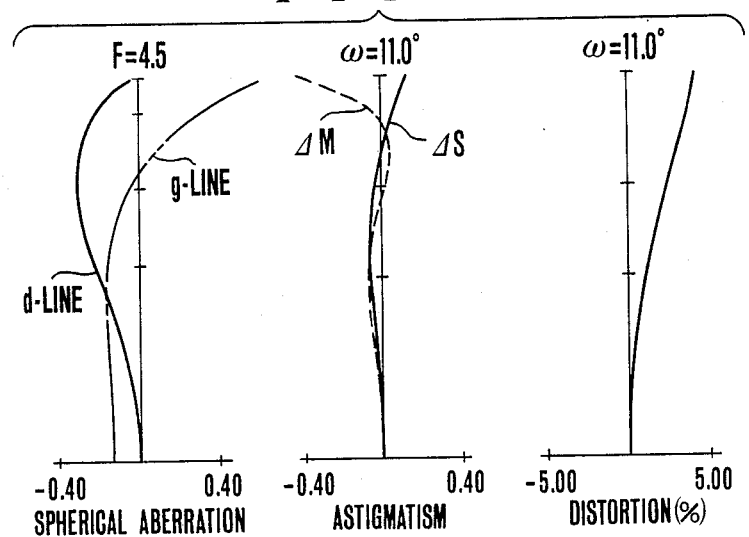

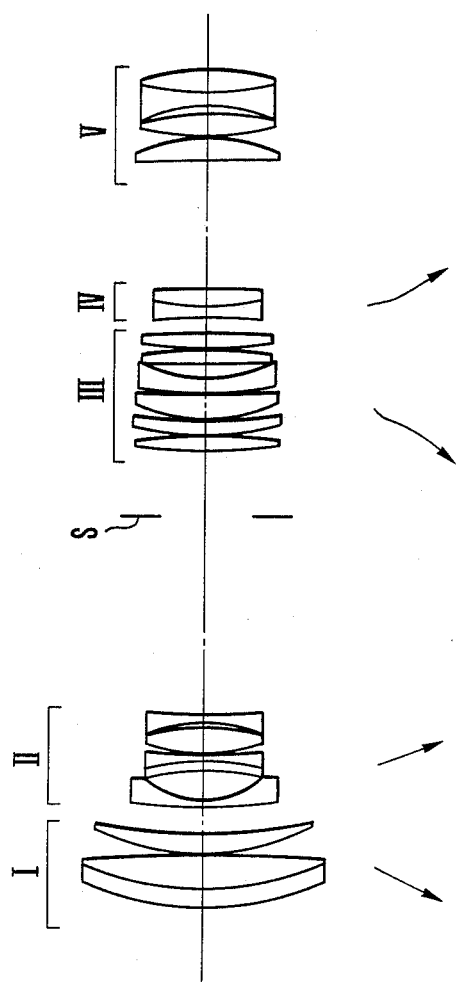

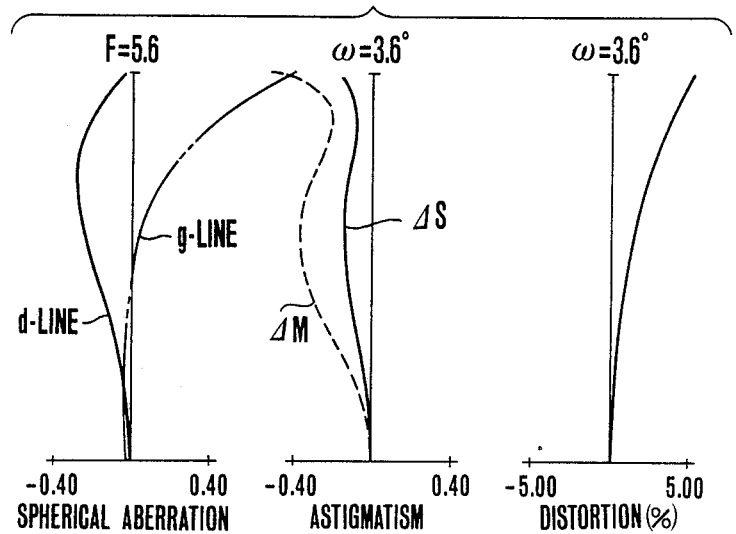

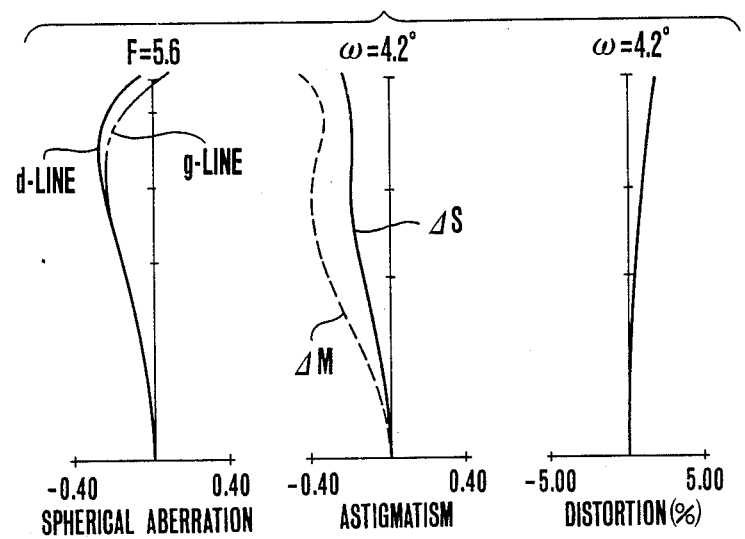

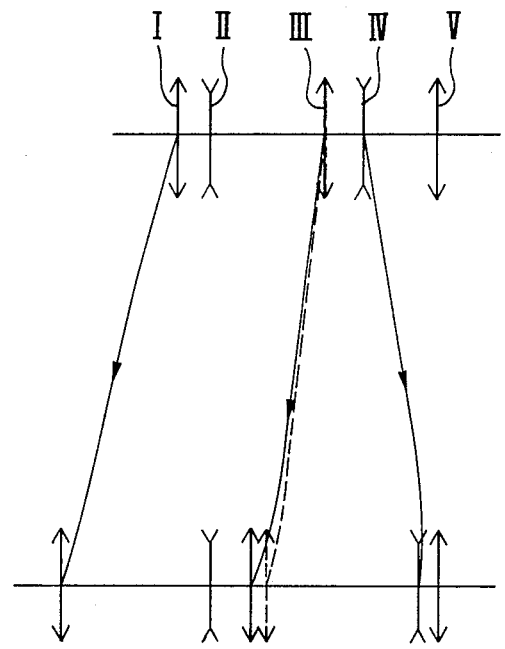
FIG.43
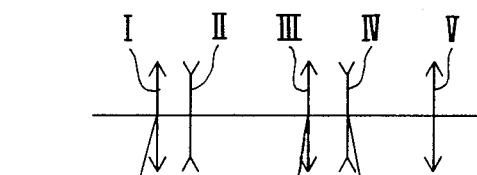
FIG.44
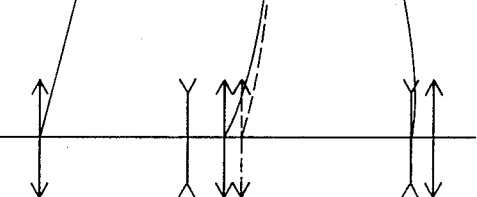

ZOOM LENS OF HIGH POWER VARYING RATIO

BACKGROUND OF THE INVENTION

1. Field of the Invention

This invention relates to a zoom lens of a high power varying ratio and more particularly to a zoom lens which is highly suited for a photographic camera, a video camera or the like having a high power varying ratio and a high optical performance over the whole variable power range thereof.

2. Description of the Related Art

A zoom lens having a high power varying ratio with a short total length has heretofore been desired for a photographic camera, a video camera, etc.

U.S. Pat. No. 4,749,266, filed Nov. 16, 1983, corresponding to Japanese Patent Application Laid-Open No. SHO 59-93411, has disclosed a zoom lens which is composed of five lens units or groups and has a high magnifying power varying ratio up to 10 by shifting four of these lens units or groups. In this case, the five lens units are arranged to have refractive powers in the order of positive, negative, positive, negative and positive refractive powers as viewed from the side of an object to be photographed. The zoom lens disclosed is arranged to have a high optical performance over the whole variable power range thereof with aberration fluctuations which take place in varying the power of the lens adequately corrected by specifically setting the shifting conditions of the lens units and their refractive powers.

In the case of the zoom lens disclosed in the patent application cited above, the telephoto ratio (the ratio between the total lens length obtained at the wide-angle end of the lens and the focal length obtained at the telephoto end) is 1.35 and the power varying ratio is 10. The total lens length is relatively short for a zoom lens. Besides, the F number is 1.6. The lens thus has a large aperture ratio and is particularly suited for a video camera.

U.S. Pat. No. 4,437,732, corresponding to Japanese Patent Application Laid-Open No. SHO 57-2014 has disclosed a zoom lens. The zoom lens also includes five lens units or groups having their refractive powers arranged in the order of positive, negative, positive, negative and positive refractive powers as viewed from the side of the object. All the lens units or groups are arranged to be shifted under a predetermined condition in varying the magnifying power of the lens. However, the lens has a power varying ratio of only 4.5, which is not sufficient.

Meanwhile, there have been proposed various zoom lenses of the kind called a rear focus type which are arranged to shift lens units or groups other than a first lens unit or group disposed on the object side. An example of them is disclosed, for example in Japanese Patent Application Laid-Open No. SHO 58-136012.

Generally, the rear focus type zoom lens is arranged to shift relatively small and light-weight lens units or groups. Therefore, a focusing action can be promptly carried out with a small lens unit driving force. However, with the focusing action performed by shifting the lens units which are located in the rear of a power varying lens unit in the rear focus type zoom lens, the zooming position of the lens sometimes varies for the same object distance. In other words, the drawing-out (or delivery) extent of the focusing lens unit varies accordingly as the focal length varies and the drawing-out extent sometimes quadratically or noncontinuously varies.

In the zoom lens of this kind, a larger space must be provided on the wide angle side to allow the focusing lens units to shift in order to have a higher power varying ratio. Then, this results in an increase in the size of the lens system. Further, with the above stated rear focus type zoom lens employed, the drawing-out extent of the focusing lens unit on the telephoto side sometimes becomes two or three times as large as the drawing-out extent on the wide angle side for the same object distance.

Further, in the zoom lens of this kind, the sensitivity, which means the shifting degree of an image surface in relation to the shifting extent of the focusing lens unit, increases on the telephoto side. If the value of this sensitivity increases to exceed a certain degree, mechanical shift control over the focusing lens unit becomes difficult. However, if the sensitivity obtained on the telephoto side is set at a controllable value, the sensitivity at the wide angle end of the lens becomes too low, thus requiring a larger space for shifting the focusing lens unit. Then, this result in an increased size of the lens system.

A further example of the prior art relative to this invention is disclosed in U.S. Pat. No. 4,636,040, corresponding to Japanese Patent Application Laid-Open No. SHO 58-202416.

SUMMARY OF THE INVENTION

It is a first object of this invention to provide a zoom lens having a high power varying ratio.

It is a second object of the invention to provide a zoom lens having a shorter diameter and a shorter total length.

It is a third object of the invention to provide a zoom lens which has a less degree of difference between the above stated sensitivity obtained at the wide angle end and the sensitivity obtained at the telephoto end and is thus arranged to facilitate mechanical control over the focusing lens unit.

The above and further objects and features of the invention will become apparent from the following detailed description of embodiments thereof taken in connection with the accompanying drawings.

BRIEF DESCRIPTION OF THE DRAWINGS

FIGS. 5(A) to 5(C), 6(A) to 6(C), 7(A) to 7(C) and 8(A) to 8(C) show various aberrations of the lenses shown in FIGS. 1, 2, 3 and 4 respectively. Among these illustrations of aberrations, FIGS. 5(A), 6(A), 7(A) and 8(A) respectively show the aberrations taking place at a wide angle end; FIGS. 5(B), 6(B), 7(B) and 8(B) the aberrations taking place at an intermediate telephoto point; and FIGS. 5(C), 6(C), 7(C) and 8(C) the aberrations taking place at the telephoto end of the lens.

FIG. 9 is a sectional view showing a numerical example 5 embodying this invention. FIG. 14(A) shows aberrations taking place at the wide angle end; FIG. 14(B) aberrations taking place at an intermediate point; and FIG. 14(C) aberrations taking place at a telephoto end.

FIGS. 20(A) to 23(C) show the aberrations of the examples 9 to 12 of the invention. Of these drawings, FIGS. 20(A), 20(C) and 20(E) show the aberrations taking place at the wide angle end, at the intermediate point and at the telephoto end for an object located at an infinity distance; FIGS. 21(A), 22(A), 23(A), 21(B), 22(B), 23(B), 21(C), 22(C) and 23(C) show the aberrations taking place at the wide angle end, at the intermediate point and at the telephoto end for an object located at an infinity distance respectively.

FIGS. 37(A) to 40(C) show the aberrations of the numerical examples 14, 15, 16 and 17. Of these drawings, FIGS. 37(A), 37(B) and 37(C) show the aberrations taking place at a wide angle end, at an intermediate point and at a telephoto end for an object located at an infinity distance; FIGS. 38(A), 39(A), 40(A), 38(B), 39(B), 40(B), 38(C), 39(C) and 40(C) show the aberrations taking place at the wide angle end, at the intermediate point and at the telephoto end for an object locate at an infinity distance.

FIGS. 43 and 44 show the paraxial refractive power allocation of the numerical examples 18 and 19 of the invention. FIGS. 45(A) to 48(A), 45(B) to 48(B) and 45(C) to 48(C) show the aberrations taking place at the wide angle end, at the intermediate point and at the telephoto end respectively.

Figure 1:
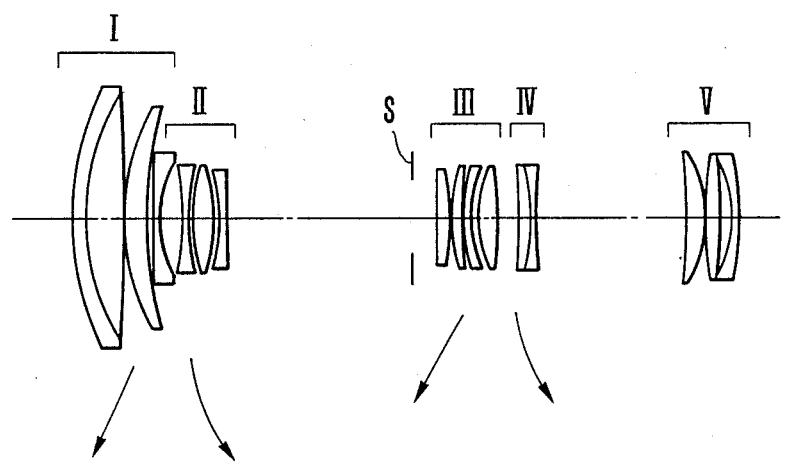
FIGS. 1, 2, 3 and 4 are sectional views showing the wide angle end positions of numerical examples 1, 2, 3 and 4 embodying this invention.
Figure 2:
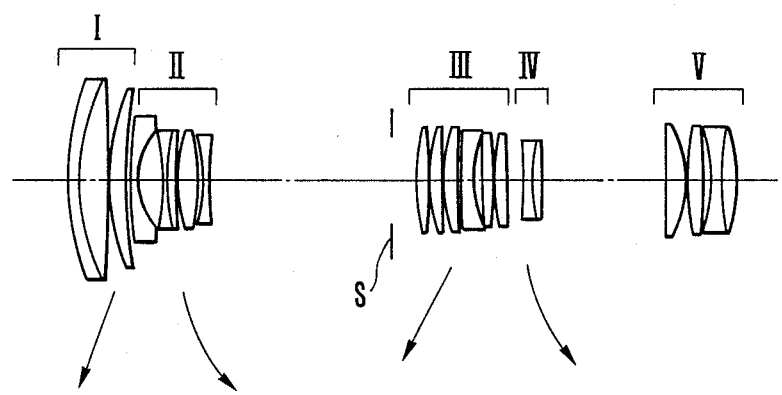
Figure 3:
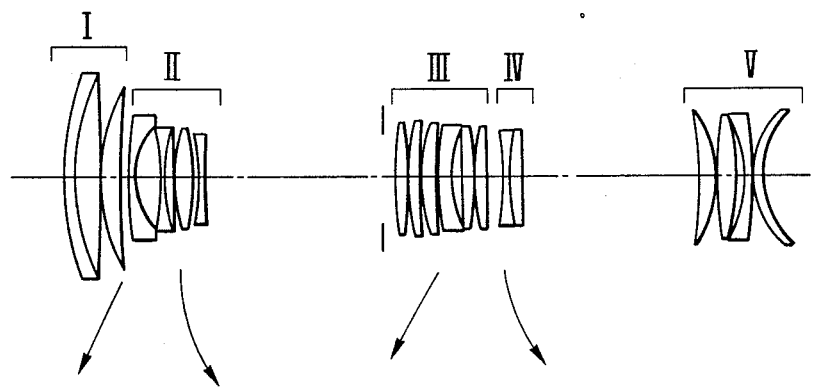
Figure 4:
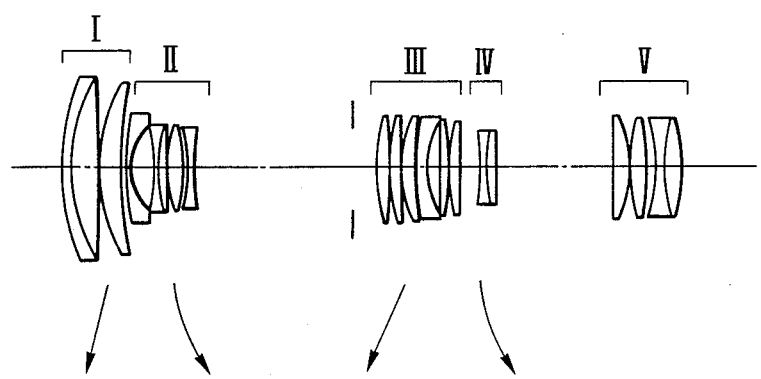
Figure 5C:
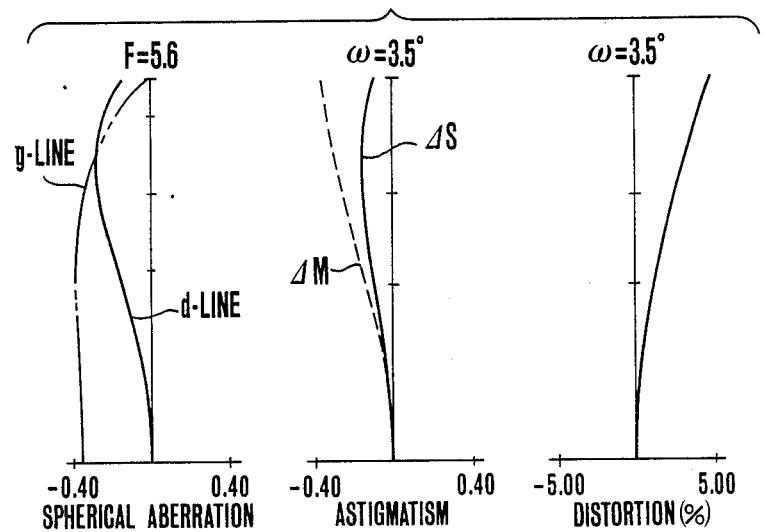
Figure 6A:
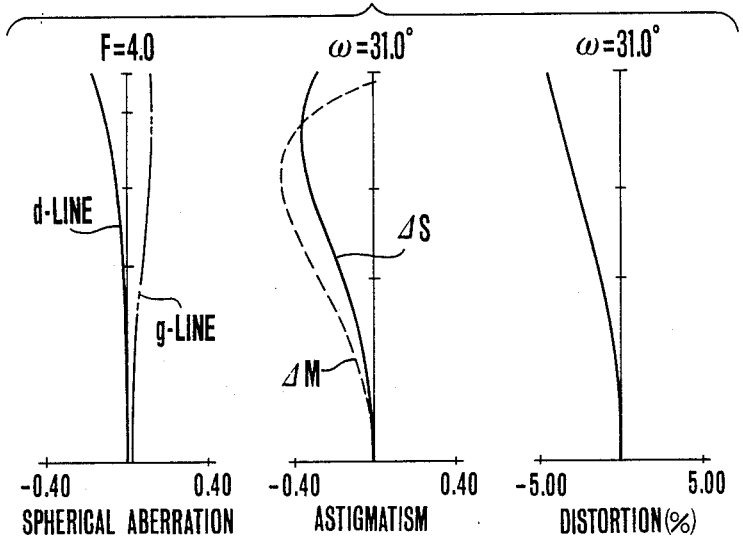
Figure 6B:
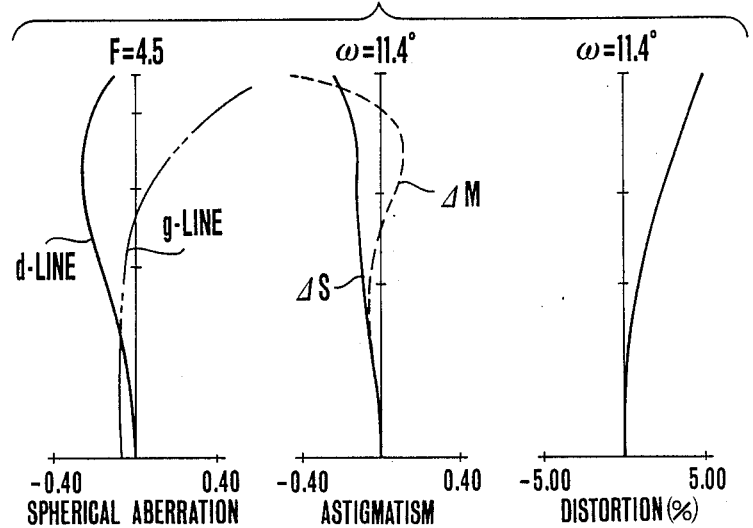
Figure 6C:
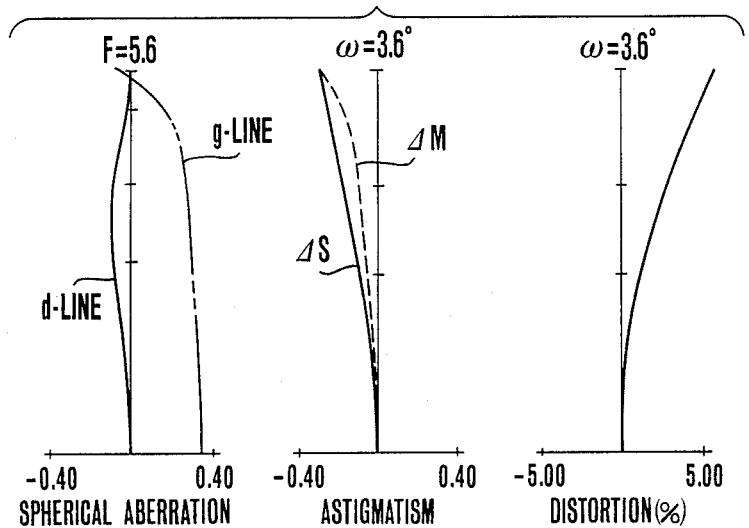
Figure 7C:
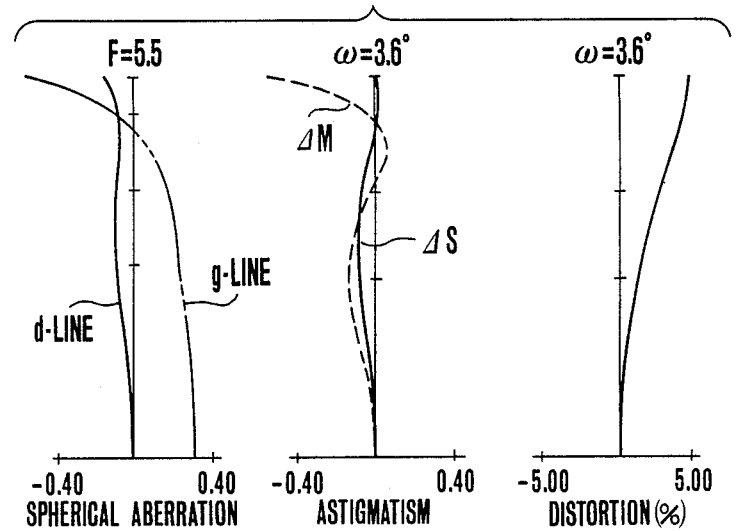
Figure 8A:
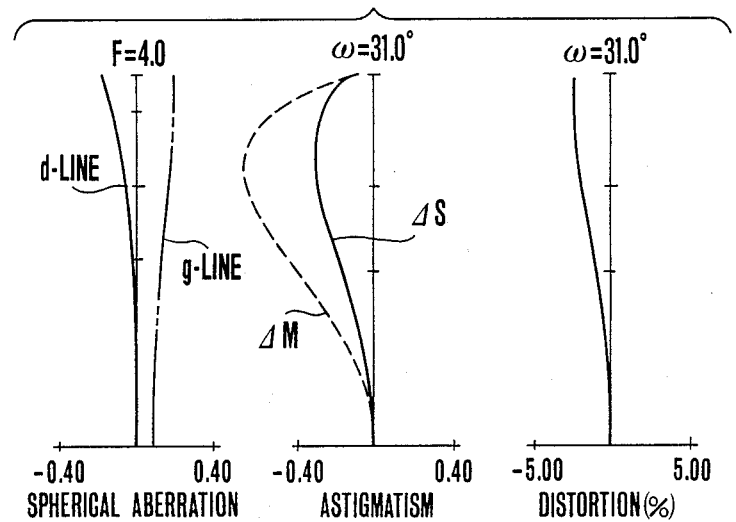
Figure 8B:
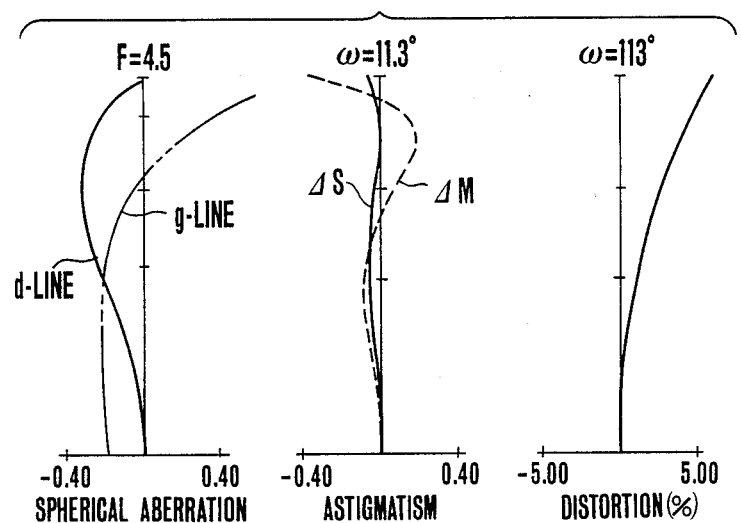
Figure 8C:
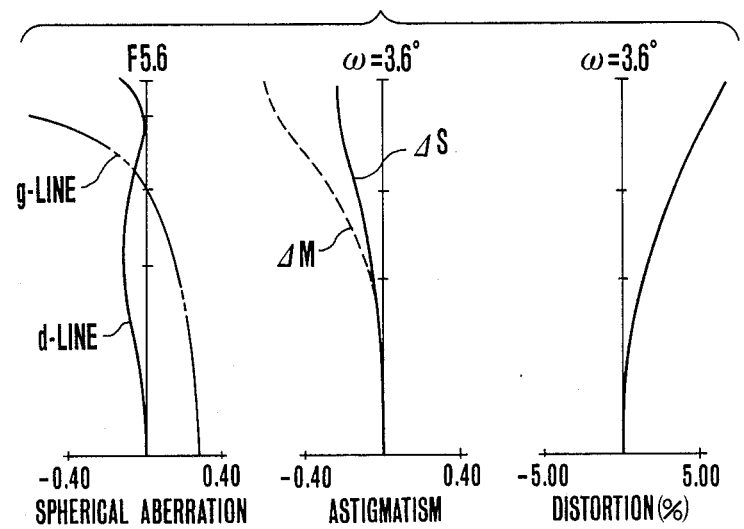
Figure 10:
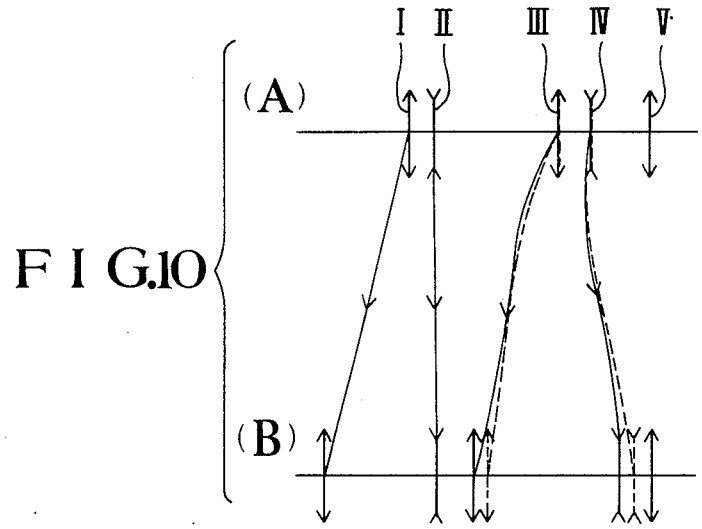
FIGS. 10 to 13 show the paraxial refractive power allocation of the numerical examples 5 to 8 of the invention.
Figure 11:
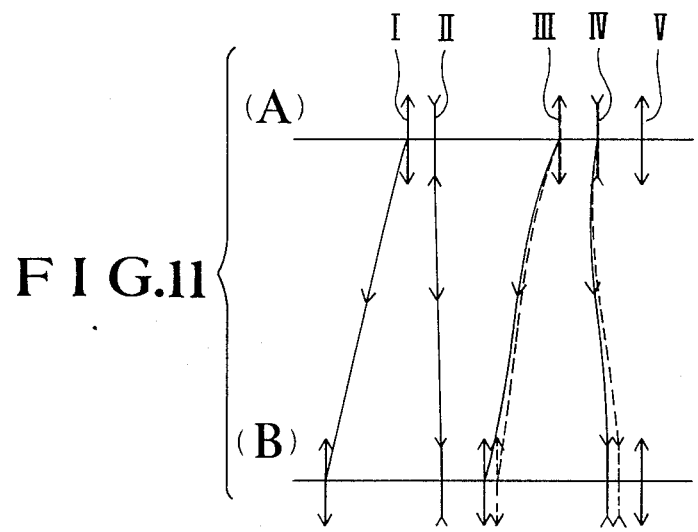
Figure 12:
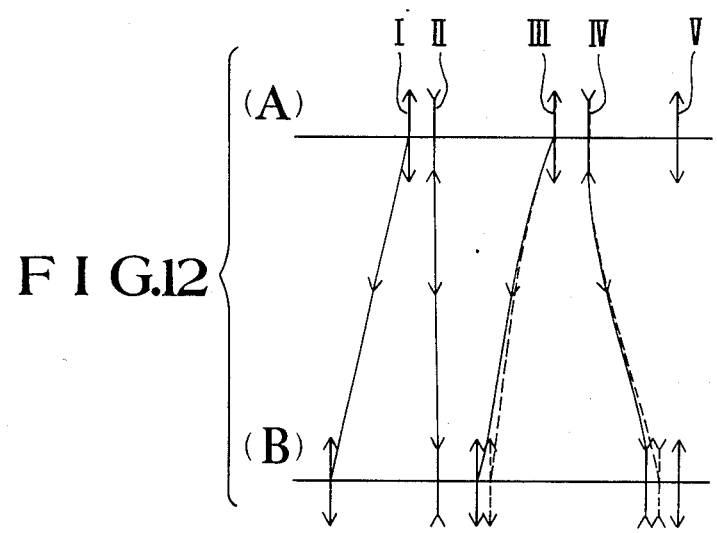
Figure 13:
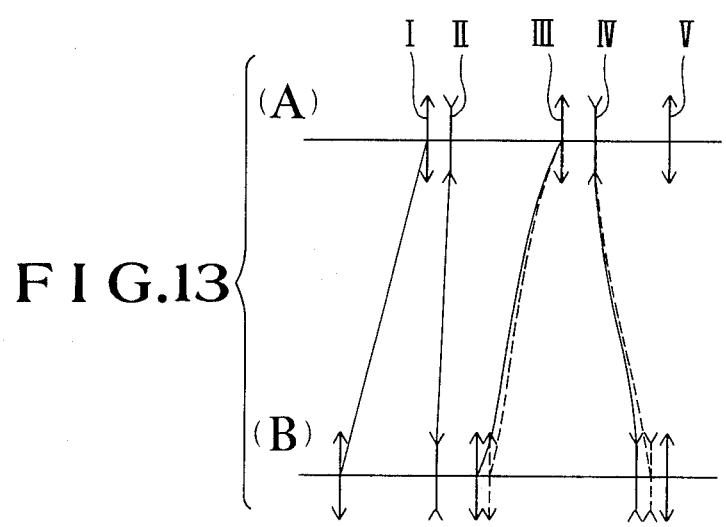
Figure 14A:
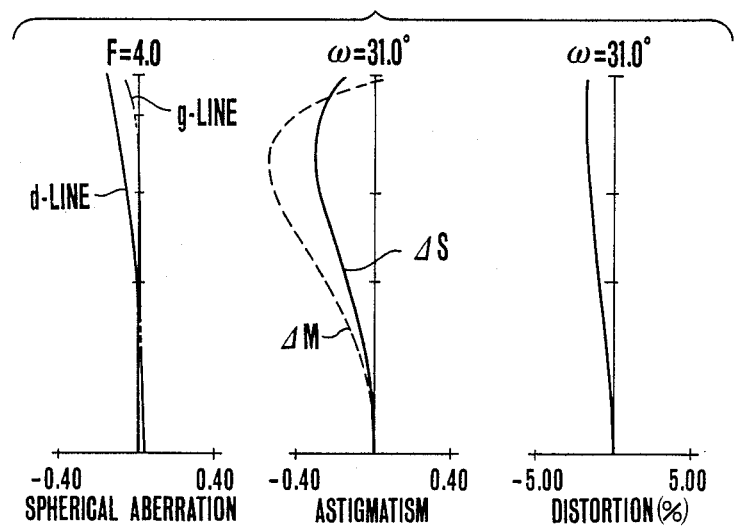
FIGS. 14(A) to 14(C) show the aberration of the numerical example 5 of this invention. In each of FIGS. 10 to 13, a symbol (A) denotes the wide angle end of the lens and a symbol (B) the telephoto end thereof.
Figure 14B:
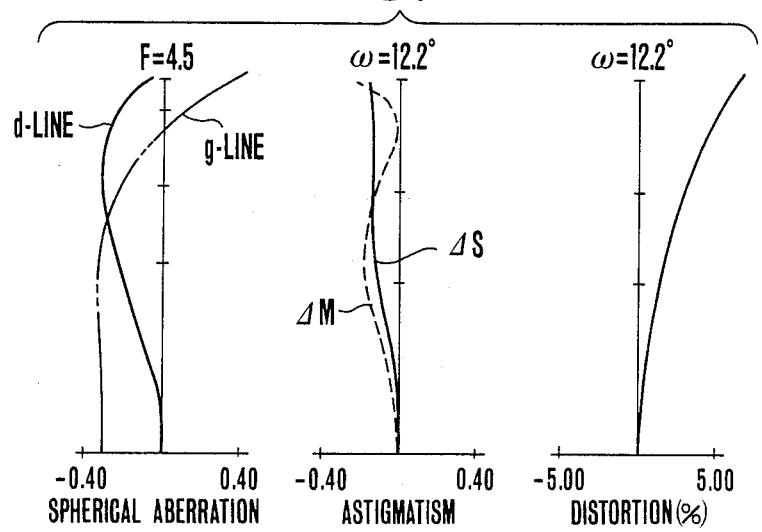
Figure 14C:
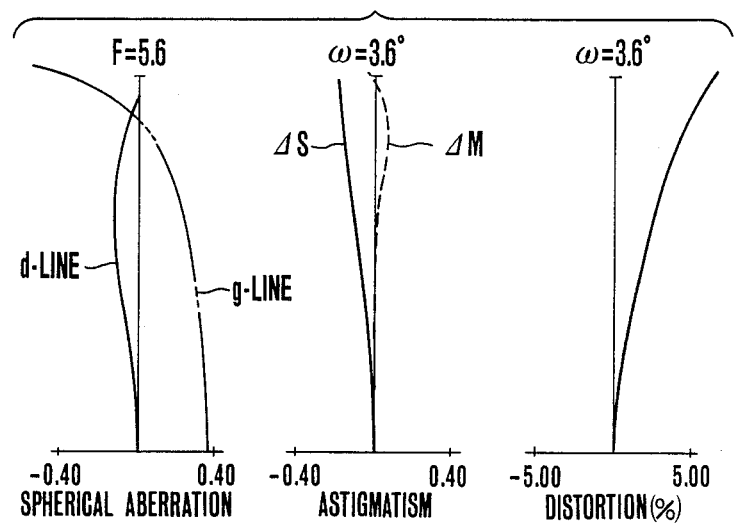

In the above stated drawings, reference numerals I, II, III, IV and V denote first, second, third, fourth and fifth lens units or groups; a reference symbol S denotes a stop; a symbol ΔS denotes a sagittal image surface; and ΔM denotes a meridional image surface. The term "group" ns "unit" are used interchangeably, for purposes of the embodiments, described hereafter.

DETAILED DESCRIPTION OF THE PREFERRED EMBODIMENTS

FIGS. 1, 2, 3 and 4 show in sectional views the numerical examples 1, 2, 3 and 4 of lenses embodying this invention as in their zoom positions obtained at the wide angle ends of them. Referring to these drawings, a first lens unit I has a positive refractive power. A second lens unit II has a negative refractive power. A third lens unit or group III has a positive refractive power. A fourth lens unit or group IV has a negative refractive power. A fifth lens unit or group V has a positive refractive power. A reference symbol S denotes a stop. These lens units or groups are arranged to move in the directions of arrows in varying the power of the lenses by shifting them from their wide angle ends to their telephoto ends. Assuming that the varying extent of an air space between an i-th (1st, 2nd, 3rd, 4th or 5th) lens unit and an i+1-th lens unit as counted from the object side is $\Delta Di$, the lens units are moved in such a way as to satisfy a condition of:

$$\left.\begin{array}{l} \Delta D1 > 0 \\ \Delta D2 < 0 \\ \Delta D3 > 0 \\ \Delta D4 < 0 \end{array}\right\} \quad (A)$$

Fluctuations in aberrations is prevented from occurring during a power varying process to attain a high power varying ratio between 8 and 10. In case that the varying extent $\Delta Di$ is of a positive value, the air space is increased with the air space at the wide angle end used as a reference value. If the varying extent is of a negative value, the air space is decreased.

With the zoom lens viewed from the object side, a total of five lens units are disposed in the order of the first lens unit which has a positive refractive power, the second lens unit which has a negative refractive power, the third lens unit which has a positive refractive power, the fourth lens unit which has a negative refractive power and the fifth lens unit which has a positive refractive power. In varying the power of the lens by shifting it from the wide angle end position thereof toward the telephoto end position, the fifth lens unit is stationary and a zooming action is carried out in accordance with the above stated Formula (A). In addition to that, with the focal length of an i-th lens unit assumed to be fi, that of the whole lens system obtained at the telephoto end to be FT and the space changing degree between the first and second lens units to be $\Delta E1$, the above stated zooming action is performed in such a way as to satisfy the following conditions:

$$0.046 < |f2/FT| < 0.093 \tag{1}$$

$$0.22 < |f1/FT| < 0.6 \tag{2}$$

$$2.1 < |\Delta E1/f2| < 3.6 \tag{3}$$

With the refractive powers of the first and second lens units and the varying rate of the space between the two lens units set to meet the above stated conditions, the embodiment is capable of adequately correcting aberration fluctuations which take place in attaining the high power varying ratio.

In the case of these examples, the space between the first and second lens units are increased while the first lens unit are being shifted toward the object side to enhance the power varying action of the second lens unit. Further, with the first lens unit arranged to be shifted toward the object side, the total length of the lens system obtained at the wide angle end thereof can be shortened. The total length of the lens system is arranged to be longer at the telephoto end than at the wide angle end. This arrangement obviates the necessity of increasing the diameter of the front lens for the purpose of securing an off-axial light flux. Further, the various aberrations are adequately corrected by increasing the telephoto ratio on the telephoto side of the lens system.

For attaining such a high power varying ratio of 10, the third lens unit participates also in the power varying action and is thus arranged to be shiftable toward the object side to reduce a space between the second and third lens units. In varying the power of the lens system from the wide angle end to the telephoto end, the fourth lens unit which has the negative refractive power is shifted toward the image side in such a way as to increase thereby a space between the third and fourth lens units and to decrease a space between the fourth and fifth lens unit. This arrangement enables the lens system to effectively correct fluctuating aberrations during a power varying process. It is an advantageous feature of the embodiment that with the third lens unit to the fifth lens unit considered to be a relay lens system, the object side lens has a positive refractive power and the image side lens has a negative refractive power, so that a great aberration correcting effect can be obtained. In other words, a lens system including the third lens unit to the fifth lens unit is changed to the telephoto type by moving the fourth lens unit having a negative refractive power toward the image side, and a lens system including the first lens unit and the second lens unit is also changed to the telephoto type by moving the first lens unit having a positive refractive power toward the object side and the second lens unit having a negative refractive power toward the image side, so that the total lens length can be shortened.

Further, a total length of the third, fourth and fifth lens units obtained at the telephoto end is arranged to be increased for facilitating aberration correction. Any possible flare is prevented from taking place with unnecessary off-axial light cut by the outside diameter of the lens by shifting the fourth lens unit toward the image side. The technological meaning of the above stated condition formulas is as described below:

Condition Formula (1): This formula relates to the refractive power of the second lens unit and is provided mainly for allowing the second lens unit to give a sufficient power varying effect for attaining a predetermined power varying ratio and also for reduction in size of the whole lens system. If the refractive power of the second lens unit becomes weak with the upper limit value of Formula (1) exceeded, the first lens unit must be shifted to a greater extent in order to obtain the desired power varying ratio. That is not desirable, because the total length of the lens system would become longer. Besides, the effective diameter of the first lens unit also would increase. Further, in order to attain the desired power varying ratio, the third lens unit must be shifted to a greater extent. It necessitates provision for a wider space between the second and third lens units and would result in an increase in the effective diameter of the first lens unit for the purpose of securing a given amount of an off-axial light flux.

If the refractive power of the second lens unit is too strong with the lower limit value of Formula (1) not reached, a Petzval sum would increase in the negative direction and it would be difficult to keep an image surface characteristic in an adequate state although the total length of the lens can be shortened. Besides, during the power varying process, spherical aberration is prompted by the second lens unit. Then, fluctuating spherical aberration cannot be adequately corrected.

Condition Formula (2): This relates to the refractive power of the first lens unit. The formula is intended to have the size of the front lens diameter reduced with a focusing action arranged to be performed by the third and fourth lens units. In accordance with this formula, the third and fourth lens units can be shifted to adequate extents respectively.

The refractive power of the first lens unit becomes too weak if the upper limit value defined by Formula (2) is exceeded. In that event, the shifting extent of the first lens unit required for obtaining a predetermined power varying ratio increases and results in an increase in the total length of the lens obtained at the telephoto end. Further, if the shifting extents of the third and fourth lens units for focusing become too small, mechanical control becomes difficult.

If the refractive power of the first lens unit becomes too strong with the lower limit value defined by Condition Formula (2) is not reached, the moving extents of the third and fourth lens units for focusing become larger. This requires some additional air space within the lens system and thus results in an increase in the total length of the lens system at the wide angle end and at the telephoto end thereof.

Condition Formula (3): This formula relates to a space varying degree $\Delta E_1$ obtained from a formula of $\Delta E1 = e1T - e1W$, wherein e1W and e1T respectively represent spaces obtained between the first and second lens units at the wide angle end and at the telephoto end. If the space varying degree $\Delta E1$ becomes too large relative to the refractive power of the second lens unit with the upper limit value of Formula (3) exceeded, the first lens unit must be shifted to a greater extent in order to secure a given space between the first and second lens units at the telephoto end of the lens system. This results in an increase in the total length of the whole lens system as obtained at the telephoto end.

Further, if the spacing varying degree $\Delta E1$ becomes too small with the lower limit value of Formula (3) not reached, the third lens unit must be shifted to a greater extent in order to secure the desired power varying ratio. As a result, in the wide angle end position of the lens system, the space between the second and third lens units becomes larger. Then, this necessitates an increase in the effective diameter of the first lens unit for securing a given amount of an off-axial light flux.

In the case of numerical examples of embodiment of this invention which will be described later herein, a zoom lens is arranged to satisfy the following conditions for the purpose of furthering the high power varying ratio with a high degree of optical performance: Assuming that the varying degree of space between the second and third lens units is $\Delta E2$, $$1.8 < |f3/f2| < 3.0 \tag{4}$$

$$3.3 < f4/f2 < 7.3 \tag{5}$$

$$3.7 < |f5/f2| < 12 \tag{6}$$

$$1.6 < \Delta E2/f2 < 3.4 \tag{7}$$

Among the formulas shown above, Formula (4) relates to the ratio of the refractive power of third lens unit to the focal length of the second lens unit. If the refractive power of the third lens unit becomes weak with the upper limit value of the formula exceeded, the space between the second and third lens units must be changed to a greater degree in order to attain the desired power varying ratio. Therefore, the space obtained between the second and third lens units at the wide angle end of the lens system must be arranged to be wider. As a result, the total length of the lens system becomes longer while the effective diameter of the first lens unit increases for securing a necessary amount of the off-axial light flux. The space obtained between the third and fourth lens units at the telephoto end also increases. Then, this results in an increased total length of the lens system in its telephoto end position.

If the refractive power of the third lens unit becomes too strong with the lower limit value of the formula (4) not reached, the refractive powers of the lens units must be increased for the purpose of correcting aberrations. Then, it becomes difficult to adequately maintain the Petzval sum. Besides, it also becomes difficult to adequately correct fluctuations which take place in the spherical aberration during power varying process.

Condition Formula (5): The formula relates to the refractive power of the fourth lens unit. If the refractive power of the fourth lens unit becomes weak with the upper limit value exceeded, it lowers the merit of having the third, fourth and fifth lens units arranged to jointly give the negative refractive power of a telephoto type lens system. The aberration correcting power of the zoom lens then lowers. Besides, in that event, the thickness of the third lens unit must be increased; the shifting degree of the fourth lens unit must be increased; then the effective diameter of the fifth lens unit increases; and the size of the whole lens system also increases.

If the refractive power of the fourth lens unit becomes stronger with the lower limit value of Formula (5) not reached, the height of the light flux incident on the fifth lens unit becomes higher. It necessitates an increase in the effective diameter of the fifth lens unit and thus increases aberration fluctuations incidental to the power varying process.

Condition Formula (6): This formula relates to the ratio of the refractive power of the fifth lens unit to the focal length of the second lens unit and is chiefly intended to ensure well-balanced correction of the aberrations of the lens system as a whole by adjusting the focal length of the whole lens system. If the refractive power of the fifth lens unit becomes weak with the upper limit value of the formula exceeded, the well-balanced correction of aberrations becomes difficult. If the refractive power of the fifth lens unit becomes too strong with the lower limit value of the formula not reached, it necessitates an increase in the refractive power of the fourth lens unit accordingly. As a result, the aberration fluctuations incidental to the power varying process increases.

Condition Formula (7): The formula relates to the ratio of the refractive power of the second lens unit to a space varying degree obtained between the second and third lens units at the wide angle end and the telephoto end. If the space varying degree $\Delta E_2$ becomes too much with the upper limit value exceeded, the power varying effect of the third lens unit increases to facilitate attainment of a high power varying ratio. In that case, however, the space between the second and third lens units must be arranged to be wider. Then, in order to secure a sufficient amount of the off-axial light flux, the first lens unit must be arranged to have a larger effective diameter. The total length of the lens system also increases. If the lower limit value defined by the formula is not reached, the space varying degree $\Delta E_2$ becomes too small for obtaining a predetermined power varying ratio. Further, in the case of this embodiment, a diaphragm is interposed in between the second and third lens units and is arranged to be shiftable toward the object according to the power varying process in such a way as to prevent the effective lens diameter of the first lens unit from increasing for reduction in size of the whole lens system.

Next, the numerical examples 1 to 4 of embodiment of this invention are described as follows: In the numerical examples listed, a symbol Ri denotes the radius of curvature of a lens surface located in an i-th place as counted from the object side of the lens system; Di denotes the lens thickness and air space of the lens located in the i-th place; Ni and $\nu i$ respectively denote the refractive index of the glass and the Abbe number of the i-th lens. Further, Table-1 to Table-4 shows optical values of the numerical examples 1 to 4 of the invention along with the values corresponding to the various conditions mentioned in the foregoing.

NUMERICAL EXAMPLE 1

(FIGS. 1 and 5(A) to 5(C))

| $F = 36.5$ $FNo = 1:4 - 5.6$ $2\omega = 60.9 - 7.1°$ | | | |
|---|---|---|---|
| R1 = 115.70 | D1 = 4.05 | N1 = 1.80518 | $\nu1$ = 25.4 |
| R2 = 86.00 | D2 = 13.00 | N2 = 1.49700 | $\nu2$ = 81.6 |
| R3 = −1381.92 | D3 = 0.10 | | |
| R4 = 81.46 | D4 = 7.50 | N3 = 1.49700 | $\nu3$ = 81.6 |
| R5 = 147.57 | D5 = 1.65 | | |
| | − 54.33 − 81.65 | | |
| R6 = 244.20 | D6 = 2.30 | N4 = 1.88300 | $\nu4$ = 40.8 |
| R7 = 35.02 | D7 = 8.50 | | |
| R8 = −81.71 | D8 = 1.80 | N5 = 1.88300 | $\nu5$ = 40.8 |
| R9 = 70.69 | D9 = 2.00 | | |
| R10 = 62.94 | D10 = 8.00 | N6 = 1.84666 | $\nu6$ = 23.9 |
| R11 = −45.92 | D11 = 1.70 | | |
| R12 = −39.35 | D12 = 1.70 | N7 = 1.88300 | $\nu7$ = 40.8 |
| R13 = −1962.06 | D13 = 64.29 | | |
| | − 9.19 − 1.73 | | |
| R14 = Stop | D14 = 7.70 | | |
| | − 30.12 − 4.98 | | |
| R15 = 460.89 | D15 = 4.50 | N8 = 1.48749 | $\nu8$ = 70.2 |
| R16 = −77.79 | D16 = 0.10 | | |
| R17 = 52.92 | D17 = 4.00 | N9 = 1.48749 | $\nu9$ = 70.2 |
| R18 = 308.92 | D18 = 0.20 | | |
| R19 = 61.67 | D19 = 2.00 | N10 = 1.84666 | $\nu10$ = 23.9 |
| R20 = 35.97 | D20 = 3.00 | | |
| R21 = 42.64 | D21 = 6.00 | N11 = 1.48749 | $\nu11$ = 70.2 |
| R22 = −184.28 | D22 = 7.67 | | |
| | − 32.10 − 69.62 | | |
| R23 = −175.69 | D23 = 4.00 | N12 = 1.76182 | $\nu12$ = 26.6 |
| R24 = −55.00 | D24 = 2.00 | N13 = 1.83481 | $\nu13$ = 42.7 |
| R25 = 314.96 | D25 = 50.85 | | |
| | − 32.63 − 22.18 | | |
| R26 = −238.47 | D26 = 7.00 | N14 = 1.51633 | $\nu14$ = 64.1 |
| R27 = −39.00 | D27 = 0.10 | | |
| R28 = 166.93 | D28 = 5.00 | N15 = 1.51118 | $\nu15$ = 51.0 |
| R29 = −138.51 | D29 = 3.99 | | |
| R30 = −38.85 | D30 = 2.00 | N16 = 1.80100 | $\nu16$ = 35.0 |
| R31 = −89.67 | | | |

NUMERICAL EXAMPLE 2

(FIGS. 2 and 6(A) to 6(C))

| $F = 35.9$ $FNo = 1:4 - 5.6$ $2\omega = 62.0 - 7.2°$ | | | |
|---|---|---|---|
| R1 = 102.16 | D1 = 3.20 | N1 = 1.80518 | $\nu1$ = 25.4 |
| R2 = 73.54 | D2 = 9.00 | N2 = 1.43387 | $\nu2$ = 95.1 |
| R3 = −1022.00 | D3 = 0.15 | | |

-continued

| F = 35.9 FNo = 1:4 − 5.6 2ω = 62.0 − 7.2° | | | |
|---|---|---|---|
| R4 = 68.03 | D4 = 6.00 | N3 = 1.49700 | ν3 = 81.6 |
| R5 = 213.51 | D5 = 1.48 − 36.19 − 64.58 | | |
| R6 = 159.06 | D6 = 2.01 | N4 = 1.88300 | ν4 = 40.8 |
| R7 = 24.77 | D7 = 8.86 | | |
| R8 = −79.05 | D8 = 1.20 | N5 = 1.88300 | ν5 = 40.8 |
| R9 = 57.00 | D9 = 3.00 | N6 = 1.80518 | ν6 = 25.4 |
| R10 = 162.20 | D10 = 0.20 | | |
| R11 = 46.13 | D11 = 7.54 | N7 = 1.84666 | ν7 = 23.9 |
| R12 = −58.03 | D12 = 1.97 | | |
| R13 = −41.38 | D13 = 1.38 | N8 = 1.88300 | ν8 = 40.8 |
| R14 = 235.52 | D14 = 60.00 − 25.77 − 2.28 | | |
| R15 = Stop | D15 = 8.29 − 8.17 − 5.98 | | |
| R16 = 104.10 | D16 = 3.82 | N9 = 1.50137 | ν9 = 56.4 |
| R17 = −130.15 | D17 = 0.10 | | |
| R18 = 67.82 | D18 = 4.02 | N10 = 1.49388 | ν10 = 66.1 |
| R19 = 642.03 | D19 = 0.10 | | |
| R20 = 46.09 | D20 = 5.03 | N11 = 1.48749 | ν11 = 70.2 |
| R21 = 196.18 | D21 = 0.99 | | |
| R22 = 156.76 | D22 = 3.95 | N12 = 1.84666 | ν12 = 23.9 |
| R23 = 37.20 | D23 = 2.96 | | |
| R24 = 147.16 | D24 = 3.95 | N13 = 1.51118 | ν13 = 51.0 |
| R25 = −130.00 | D25 = 0.10 | | |
| R26 = 72.72 | D26 = 3.95 | N14 = 1.51118 | ν14 = 51.0 |
| R27 = −453.14 | D27 = 5.83 − 32.71 − 54.70 | | |
| R28 = −95.44 | D28 = 2.38 | N15 = 1.88300 | ν15 = 40.8 |
| R29 = 55.37 | D29 = 3.08 | N16 = 1.80518 | ν16 = 25.4 |
| R30 = −4130.87 | D30 = 41.21 − 35.76 − 28.88 | | |
| R31 = 1085.72 | D31 = 6.65 | N17 = 1.50657 | ν17 = 62.0 |
| R32 = −39.65 | D32 = 0.10 | | |
| R33 = 87.24 | D33 = 5.63 | N18 = 1.51118 | ν18 = 51.0 |
| R34 = −144.28 | D34 = 3.07 | | |
| R35 = −43.88 | D35 = 2.56 | N19 = 1.80610 | ν19 = 40.9 |
| R36 = 78.73 | D36 = 0.10 | | |
| R37 = 165.82 | D37 = 4.50 | N20 = 1.51633 | ν20 = 64.1 |
| R38 = −80.25 | | | |

NUMERICAL EXAMPLE 3

(FIGS. 3 and 7(A) to 7(C))

| F = 35.9 FNo = 1:4 − 5.6 2ω = 62.0 − 7.2° | | | |
|---|---|---|---|
| R1 = 99.91 | D1 = 3.08 | N1 = 1.76182 | ν1 = 26.6 |
| R2 = 69.29 | D2 = 9.00 | N2 = 1.43387 | ν2 = 95.1 |
| R3 = −1081.81 | D3 = 0.14 | | |
| R4 = 70.60 | D4 = 5.78 | N3 = 1.49700 | ν3 = 81.6 |
| R5 = 286.56 | D5 = 2.82 − 35.56 − 62.34 | | |
| R6 = 153.47 | D6 = 1.91 | N4 = 1.88300 | ν4 = 40.8 |
| R7 = 24.17 | D7 = 8.43 | | |
| R8 = −74.17 | D8 = 1.14 | N5 = 1.88300 | ν5 = 40.8 |
| R9 = 49.10 | D9 = 2.85 | N6 = 1.80518 | ν6 = 25.4 |
| R10 = 160.00 | D10 = 0.19 | | |
| R11 = 44.76 | D11 = 7.17 | N7 = 1.84666 | ν7 = 23.9 |
| R12 = −57.40 | D12 = 1.87 | | |
| R13 = −40.93 | D13 = 1.31 | N8 = 1.88300 | ν8 = 40.8 |
| R14 = 202.06 | D14 = 59.82 − 26.99 − 4.63 | | |
| R15 = Stop | D15 = 3.87 − 4.40 − 3.91 | | |
| R16 = 103.68 | D16 = 4.00 | N9 = 1.50137 | ν9 = 56.4 |
| R17 = −138.79 | D17 = 0.11 | | |
| R18 = 71.00 | D18 = 4.21 | N10 = 1.49388 | ν10 = 66.1 |
| R19 = 542.00 | D19 = 0.11 | | |
| R20 = 48.25 | D20 = 5.26 | N11 = 1.48749 | ν11 = 70.2 |
| R21 = 191.39 | D21 = 1.03 | | |
| R22 = 151.79 | D22 = 4.13 | N12 = 1.84666 | ν12 = 23.9 |
| R23 = 38.62 | D23 = 3.10 | | |
| R24 = 243.36 | D24 = 4.13 | N13 = 1.51118 | ν13 = 51.0 |
| R25 = −118.07 | D25 = 0.10 | | |
| R26 = 66.89 | D26 = 4.13 | N14 = 1.51118 | ν14 = 51.0 |
| R27 = −702.77 | D27 = 4.72 − 45.02 − 77.99 | | |
| R28 = −131.13 | D28 = 3.08 | N15 = 1.88300 | ν15 = 40.8 |
| R29 = 77.00 | D29 = 3.99 | N16 = 1.80518 | ν16 = 25.4 |
| R30 = 2511.27 | D30 = 57.53 − 44.14 − 29.61 | | |
| R31 = −322.10 | D31 = 6.50 | N17 = 1.50657 | ν17 = 62.0 |
| R32 = −37.20 | D32 = 0.10 | | |
| R33 = 198.29 | D33 = 6.50 | N18 = 1.48749 | ν18 = 70.2 |
| R34 = −74.31 | D34 = 2.75 | | |
| R35 = −35.53 | D35 = 2.29 | N19 = 1.80610 | ν19 = 40.9 |
| R36 = −167.60 | D36 = 0.10 | | |
| R37 = 29.79 | D37 = 4.03 | N20 = 1.51633 | ν20 = 64.1 |
| R38 = 31.51 | | | |

NUMERICAL EXAMPLE 4

(FIGS. 4 and 8(A) to 8(C))

| F = 36.0 FNo = 1:4 − 5.6 2ω = 62.0 − 7.2° | | | |
|---|---|---|---|
| R1 = 88.76 | D1 = 2.80 | N1 = 1.80518 | ν1 = 25.4 |
| R2 = 64.00 | D2 = 9.00 | N2 = 1.43387 | ν2 = 95.1 |
| R3 = −819.14 | D3 = 0.10 | | |
| R4 = 59.71 | D4 = 7.50 | N3 = 1.49700 | ν3 = 81.6 |
| R5 = 183.17 | D5 = 1.57 − 30.64 − 54.42 | | |
| R6 = 134.55 | D6 = 1.74 | N4 = 1.88300 | ν4 = 40.8 |
| R7 = 21.56 | D7 = 7.66 | | |
| R8 = −68.02 | D8 = 1.04 | N5 = 1.88300 | ν5 = 40.8 |
| R9 = 54.88 | D9 = 2.59 | N6 = 1.80518 | ν6 = 25.4 |
| R10 = 140.61 | D10 = 0.17 | | |
| R11 = 39.84 | D11 = 6.52 | N7 = 1.84666 | ν7 = 23.9 |
| R12 = −47.93 | D12 = 1.70 | | |
| R13 = −35.53 | D13 = 1.19 | N8 = 1.88300 | ν8 = 40.8 |
| R14 = 162.61 | D14 = 53.44 − 26.70 − 9.32 | | |
| R15 = Stop | D15 = 8.77 − 5.93 − 1.19 | | |
| R16 = 100.45 | D16 = 3.80 | N9 = 1.51118 | ν9 = 51.0 |
| R17 = −122.46 | D17 = 0.10 | | |
| R18 = 63.04 | D18 = 3.79 | N10 = 1.49388 | ν10 = 66.1 |
| R19 = 1925.58 | D19 = 0.10 | | |
| R20 32 43.21 | D20 = 4.74 | N11 = 1.48749 | ν11 = 70.2 |
| R21 = 157.89 | D21 = 0.93 | | |
| R22 = 147.32 | D22 = 3.72 | N12 = 1.84666 | ν12 = 23.9 |
| R23 = 35.13 | D23 = 2.79 | | |
| R24 = 163.08 | D24 = 3.72 | N13 = 1.51118 | ν13 = 51.0 |
| R25 = −113.38 | D25 = 0.09 | | |
| R26 = 69.45 | D26 = 3.72 | N14 = 1.51118 | ν14 = 51.0 |
| R27 = −523.22 | D27 = 6.66 − 34.07 − 56.50 | | |
| R28 = −86.47 | D28 = 2.60 | N15 = 1.88300 | ν15 = 40.8 |
| R29 = 80.00 | D29 = 3.20 | N16 = 1.80518 | ν16 = 25.4 |
| R30 = −772.30 | D30 = 38.65 − 35.80 − 31.37 | | |
| R31 = −1037.35 | D31 = 6.00 | N17 = 1.51118 | ν17 = 51.0 |
| R32 = −39.64 | D32 = 0.10 | | |
| R33 = 85.90 | D33 = 5.00 | N18 = 1.51118 | ν18 = 51.0 |
| R34 = −125.81 | D34 = 3.50 | | |
| R35 = −43.92 | D35 = 2.00 | N19 = 1.80610 | ν19 = 40.9 |
| R36 = 47.35 | D36 = 0.20 | | |
| R37 = 52.59 | D37 = 5.50 | N20 = 1.50137 | ν20 = 56.4 |
| R38 = −85.63 | | | |

TABLE 1

| Focal Length | 36.7 | 349.1 | Condition | |
|---|---|---|---|---|
| f1 | 152.7 | | f2/FT | −0.077 |
| f2 | −27.0 | | f1/f2 | −5.65 |
| f3 | 53.0 | | ΔE1/f2 | −2.96 |
| f4 | −119.4 | | f3/FT | 0.151 |
| f5 | 134.2 | | f4/FT | −0.342 |
| D5 | 1.65 | 81.64 | f5/FT | 0.384 |
| D13 + 14 | 71.99 | 6.71 | ΔE2/f2 | 2.41 |
| D22 | 7.67 | 69.62 | | |
| D25 | 50.85 | 22.18 | | |

TABLE 2

| Focal Length | 36.0 | 342.0 | Condition | |
|---|---|---|---|---|
| f1 | 121.5 | | f2/FT | −0.067 |
| f2 | −23.1 | | f1/f2 | −5.25 |
| f3 | 47.7 | | ΔE1/f2 | −2.73 |
| f4 | −95.4 | | f3/FT | 0.139 |
| f5 | 166.8 | | f4/FT | −0.278 |
| D5 | 1.48 | 64.58 | f5/FT | 0.487 |
| D14 + 15 | 68.29 | 8.26 | ΔE2/f2 | 2.59 |
| D27 | 5.83 | 54.70 | | |
| D30 | 41.21 | 28.88 | | |

TABLE 3

| Focal Length | 35.9 | 342.0 | Condition | |
|---|---|---|---|---|
| f1 | 117.0 | | f2/FT | −0.064 |
| f2 | −22.0 | | f1/f2 | −5.31 |
| f3 | 50.0 | | ΔE1/f2 | 2.705 |
| f4 | −123.6 | | f3/FT | 0.146 |
| f5 | 149.4 | | f4/FT | −0.361 |
| D5 | 2.82 | 62.34 | f5/FT | 0.436 |
| D14 + 15 | 63.69 | 8.54 | ΔE2/f2 | 2.50 |
| D27 | 4.72 | 77.99 | | |
| D30 | 57.53 | 29.61 | | |

TABLE 4

| Focal Length | 36.0 | 342.0 | Condition | |
|---|---|---|---|---|
| f1 | 105.9 | | f2/FT | 0.058 |
| f2 | −20.0 | | f1/f2 | −5.295 |
| f3 | 45.0 | | ΔE1/f2 | −2.642 |
| f4 | −98.8 | | f3/FT | 0.131 |
| f5 | 199.8 | | f4/FT | −0.288 |
| D5 | 1.57 | 54.42 | f5/FT | 0.584 |
| D14 + 15 | 62.21 | 10.51 | ΔE2/f2 | 2.58 |
| D27 | 6.66 | 56.50 | | |
| D30 | 38.65 | 31.37 | | |

Referring to FIGS. 9 to 15, the movement of the focusing lens in an embodiment of this invention is described as follows: FIG. 9 shows the arrangement of this embodiment. The embodiment comprises five lens units, i.e., from the object side to the image side, a first lens unit I which has a positive refractive power; a second lens unit II which has a negative refractive power; a third lens unit III which has a positive refractive power; a fourth lens unit IV which has a negative refractive power; and a fifth lens unit V which has a positive refractive power. A power varying operation on the lens system is performed by shifting the lens from a wide angle end position to a telephoto end position thereof in the following manner: The first lens unit I is shifted toward the object side. Then, each of the lens units is shifted in such a way as to increase spaces between the first and second lens units and between the third and fourth lens units and to decrease spaces between the second and third lens units and between the fourth and fifth lens units. Focus shifting from an object located at an infinity distance to an object located at a near distance is arranged to be performed by shifting the third and fourth lens units toward the image side.

Further, numerical examples of the embodiment which will be shown hereinafter are arranged to satisfy all the conditions of Formulas (1) to (3).

Generally, in a zoom lens having a high power varying ratio, the lens system becomes larger if the focusing operation is arranged to be performed with the front lens unit, that is, with the first lens unit. Further, the lens system also becomes larger accordingly as the power varying ratio increases in case that the zooming method or the focusing method is inapposite. Further, aberration fluctuations increase in the event of inapposite refractive power allocation.

Whereas, in the case of the above stated lens arrangement of this embodiment, the total length of the lens system can be shortened and the fluctuations in aberrations can be lessened with the focusing operation arranged to be performed by shifting the third and fourth lens units. Further, in this instance, focusing may be carried out by changing the space between the third and fourth lens units. That arrangement permits a high degree of aberration correction without difficulty. It is also possible to carry out focusing by shifting the third and fourth lens units together as one unified body. Such arrangement permits simplified mechanical arrangement.

With the focusing operation arranged to be performed by shifting the third and fourth lens units, the lens system must b arranged to satisfy the following conditions: Assuming that the sensitivity and the image forming magnification of the focusing lens group which consists of the third and fourth lens units are ES and βF, respectively, and the image forming magnifications of the lens units which are disposed closer to the image side than the focusing lens group are Bi, Bi+1, --, Bk, the sensitivity ES which is obtained when the lens system is focused on an object located near to the infinity distance can be expressed as follows:

$$ES \approx (1 - \beta F^2) \, Bi^2, Bi+1^2 \cdots Bk^2 \qquad (8)$$

Further, the defocus degree for one and the same object distance increases approximately in proportion to the square of the zooming ratio. Therefore, in order to lessen a difference between the drawn-out or delivery extent of the focusing lens group obtained at the wide angle end and that of the focusing lens group obtained at the telephoto end, the sensitivity must be increased accordingly as the position of the zoom lens shifts from the wide angle end position to the telephoto end position thereof. Further, it is preferable, for attaining a high power varying ratio, to have the focusing lens group also arranged to perform a magnifying action. In the light of these points, the image forming magnification βF by this embodiment is arranged to satisfy the following condition:

$$|\beta F| > 1 \qquad (9)$$

In other words, the refractive powers of the lens units of the embodiment are arranged such that the focusing lens group are shifted toward the image side in shifting the focus from an infinity distance object to a near distance object.

Next, the technical meaning of the fifth lens unit which is disposed closer to the image side than the focusing lens group ia as described below:

Assuming that the focal length of the lens unit disposed closer to the object side than the focusing lens group is f1B, the focal length F of the whole lens system can be expressed as follows:

$$F = f1B \cdot \beta F \cdot Bi, \, Bi+1 \cdots Bk \qquad (10)$$

In order to attain a high power varying ratio of a zoom lens, it is necessary to have its sensitivity values arranged to be mechanically controllable for its positions from the wide angle end to the telephoto end thereof; to minimize the extent to which the focusing lens group is to be drawn out; and to avoid an excessively large ratio between a sensitivity value obtained at the wide angle end and a sensitivity value obtained at the telephoto end of the zoom lens. In other words, the drawn-out extent of the focusing lens group should be arranged to be either unvarying or varies only to a very little degree.

The upper limit of the power varying ratio of the focusing lens group is controlled under the above stated condition. In other words, in case that no lens unit is disposed on the image side of the focusing lens group, the power varying ratio of the lens unit disposed on the object side of the focusing lens group must be increased. In that case, it is necessary either to have the lens unit which is located closer to the object side than the focusing lens group arranged to be shifted to a greater extent for the power varying purpose or to increase the number of lens units. To avoid that, this embodiment is arranged to have at least one lens unit which is either fixed or movable for the power varying purpose disposed on the image side of the focusing lens group. This specific lens unit does not have to be movable in varying the lens power and may be arranged to be stationary.

With the zoom lens arranged in the manner as described above, focusing by shifting the third and fourth lens units is preferably performed to satisfy the following condition: Assuming that a focal length obtained at an arbitrary zooming point during the focusing process is F, a focal length of the whole lens system obtained at the wide angle end is Fw, the overall image forming magnification of the third and fourth lens units obtained at the above stated focal length F is $\beta F$ and there is a relation of $Z=F/Fw$, the above stated condition is expressed as follows:

$$1.5 < (\beta F^2 - 1)/Z < 6.0 \quad (11)$$

Condition Formula (11) defines a range within which the the third and fourth lens units may be drawn out for focusing at each zooming point between the wide angle end and the telephoto end position of the lens.

If the image forming magnification $\beta F$ becomes too large compared with the value Z with the upper limit value of Formula (11) exceeded, the sensitivity of the focusing lens group increases too much for accurate mechanical control over the focusing lens group, although the total length of the lens system becomes shorter as the drawing-out extent of the lens group decreases.

Further, the refractive power of the third lens unit then becomes weaker. As a result, the third lens unit must be shifted to a greater extent for power varying. This necessitates the lens system to have a wider space provided between the second and third lens units in the wide angle end position thereof. The total lens length then increases. In addition to that, the effective diameter of the first lens unit must be increased in order to secure a required amount of off-axial light.

If the image forming magnification $\beta F$ becomes too small compared with the value Z with the lower limit value of Formula (11) not reached, the sensitivity of the focusing lens group becomes low and comes to require an increase in the drawing-out degree thereof. The total length of the lens then must be increased accordingly.

For further improvement of this embodiment in terms of aberration correction and reduction in size of the whole lens system, the embodiment is preferably arranged to satisfy the following condition:

$$-2.3 < \beta Fw < -1.6 \quad (12)$$

wherein $\beta Fw$ represents the image forming magnification rate of the focusing lens group obtained when the zoom lens is focused on an object located at an infinity distance with the zoom lens in its wide angle position.

If the upper limit value defined by Formula (12) is exceeded, the image forming magnification $\beta Fw$ becomes too large. Then, in order to obtain a given power varying ratio, the value $\Delta E1$ must be increased. The shifting extent of the first lens unit must be increased. As a result, the total length of the zoom lens in its telephoto end position increases. Assuming that a space which obtains between the first and second lens units at the wide angle end and a space obtained between them at the telephoto end are E1w and E1T, respectively, there obtains the following relation: $\Delta E1 = E1T - E1w$. Further, in this instance, the shifting extent of the fourth lens unit also increases. The sensitivity obtained at the wide angle end decreases. As a result, the total lens length obtained at the wide angle end thus increases.

If the lower limit value of Formula (12) is not reached, the image forming magnification $\beta Fw$ becomes too small. The sensitivity then increases. As a result, it becomes difficult to accurately perform mechanical control over the focusing lens group.

Figure 15:
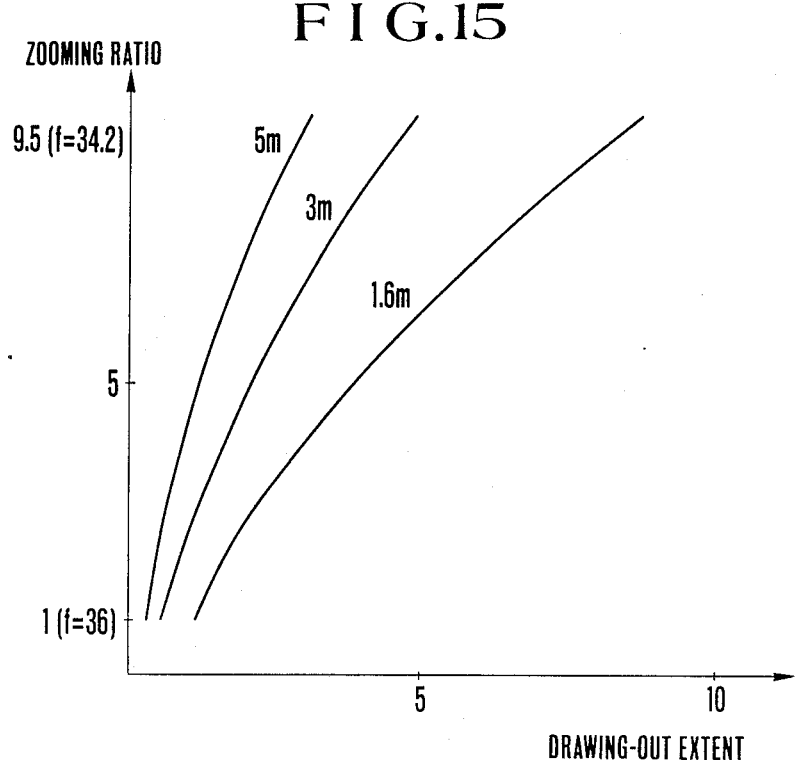
FIG. 15 is a graph showing the drawing-out extent of the focusing lens units in relation to a zooming ratio.
Figure 16:
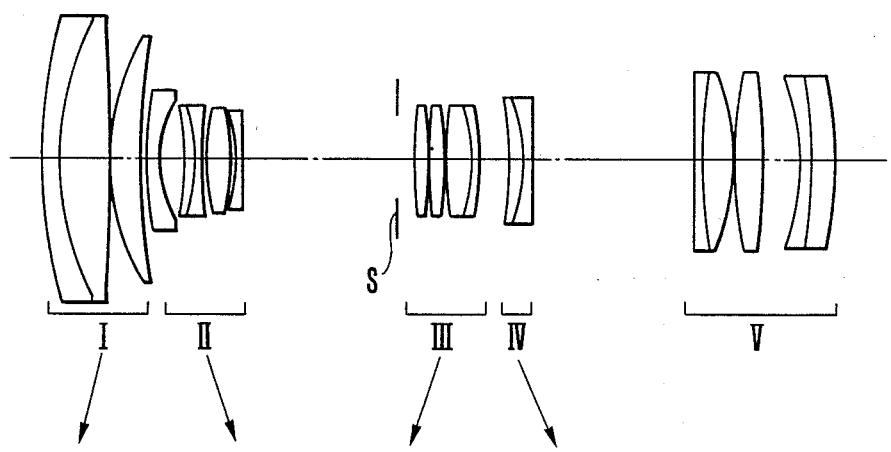
FIGS. 16, 17, 18 and 19 are sectional views showing numerical examples 9, 10, 11 and 12 of lenses embodying this invention.
Figure 17:
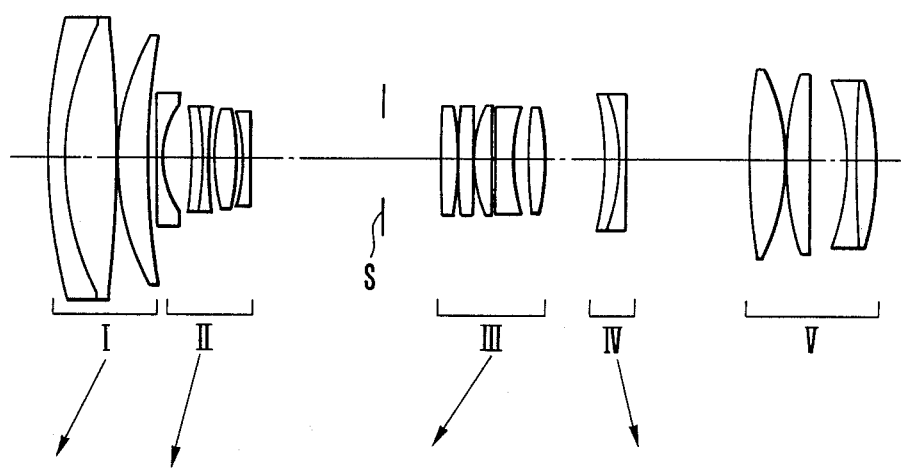
Figure 18:
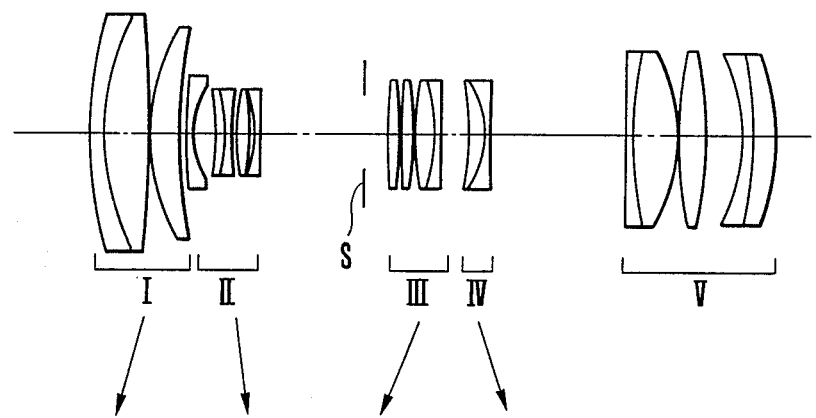
Figure 19:
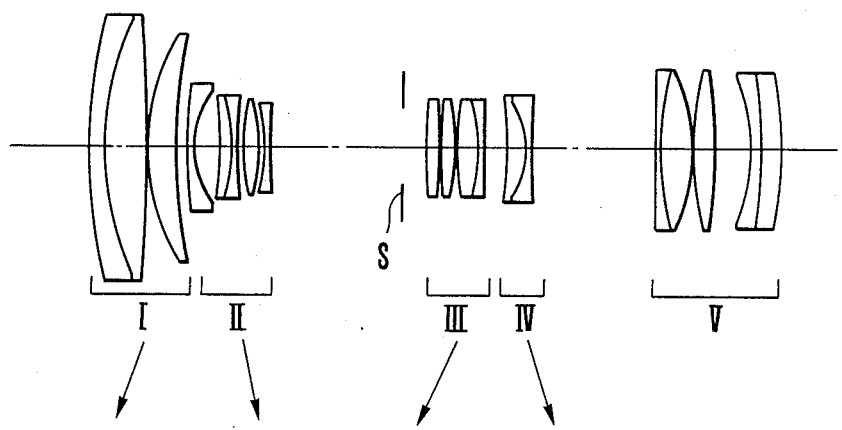
Figure 20A:
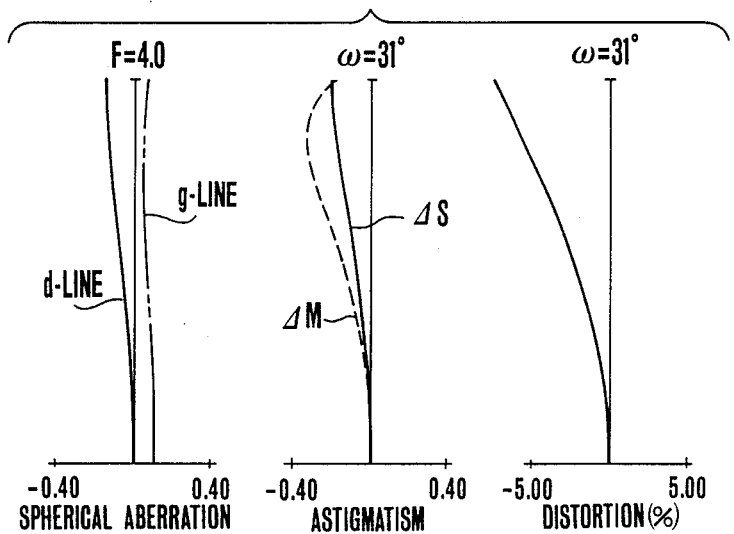
Figure 20B:
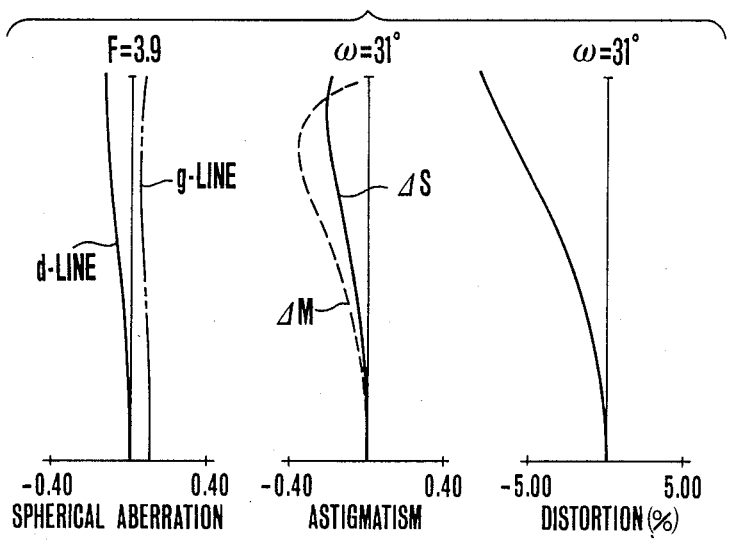
FIGS. 20(B), 20(D) and 20(F) show the aberrations taking place at the wide angle end, at the intermediate point and at the telephoto end for an object located at a distance of 2 m.
Figure 20C:
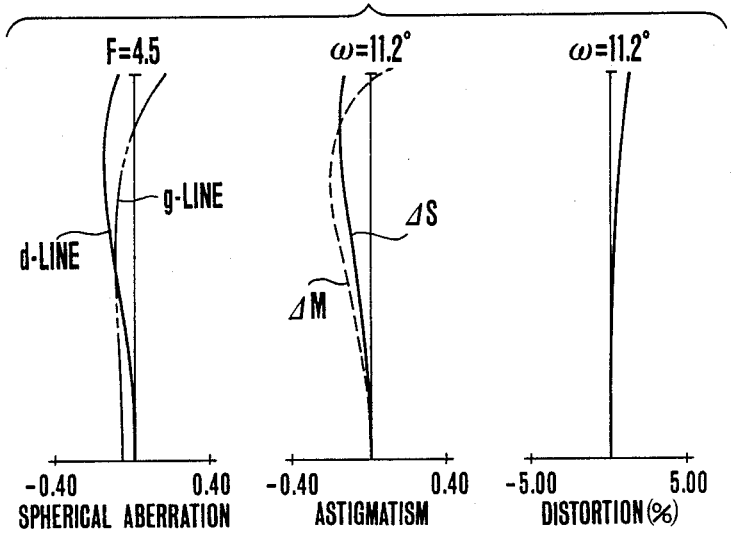
Figure 20D:
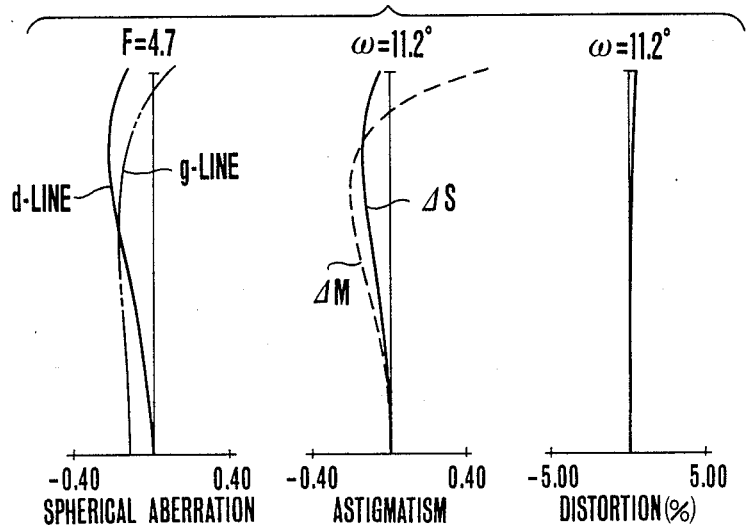
Figure 20E:
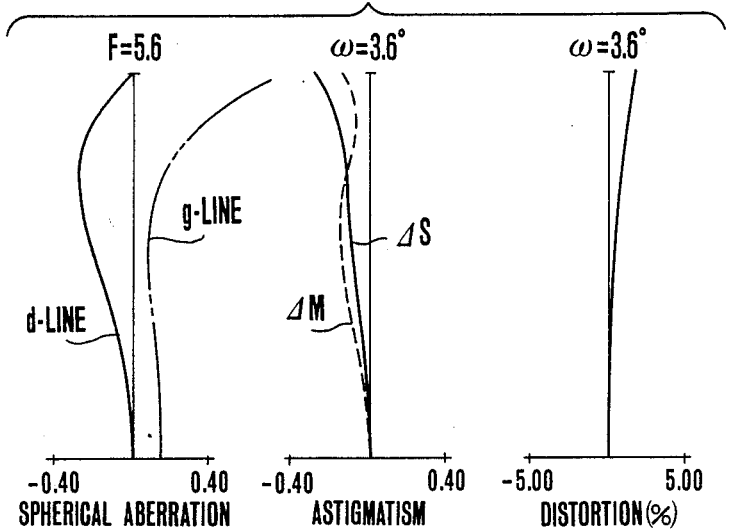
Figure 20F:
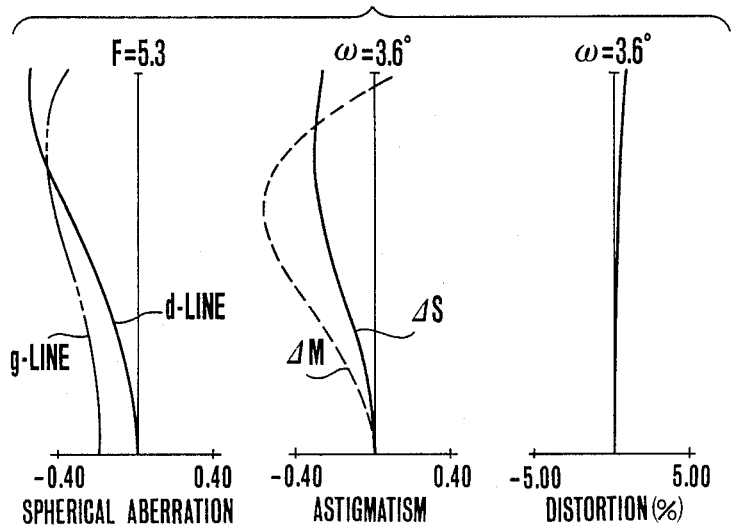
Figure 21A:
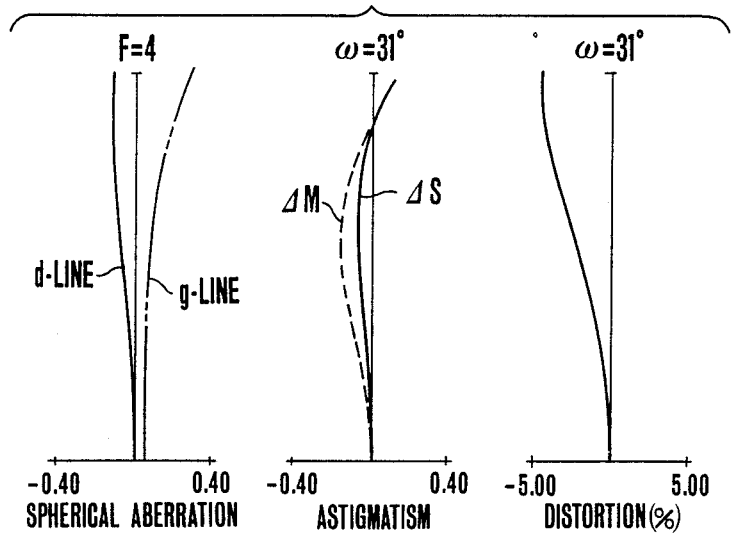
Figure 21B:
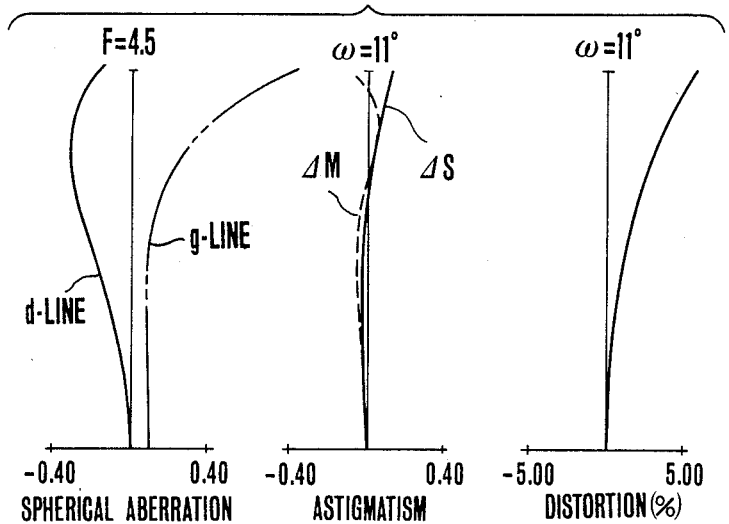
Figure 22A:
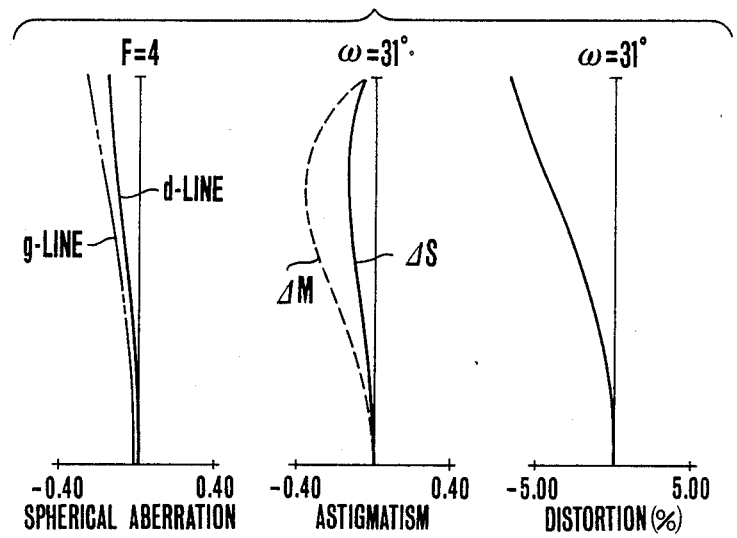
Figure 22B:
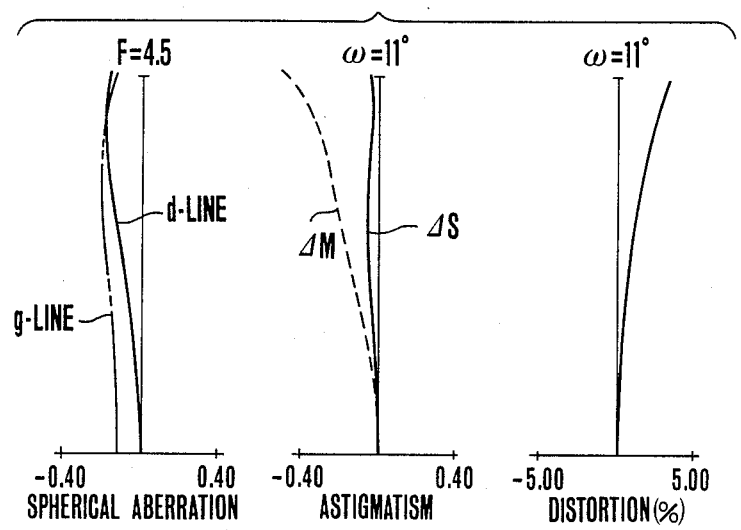
Figure 22C:
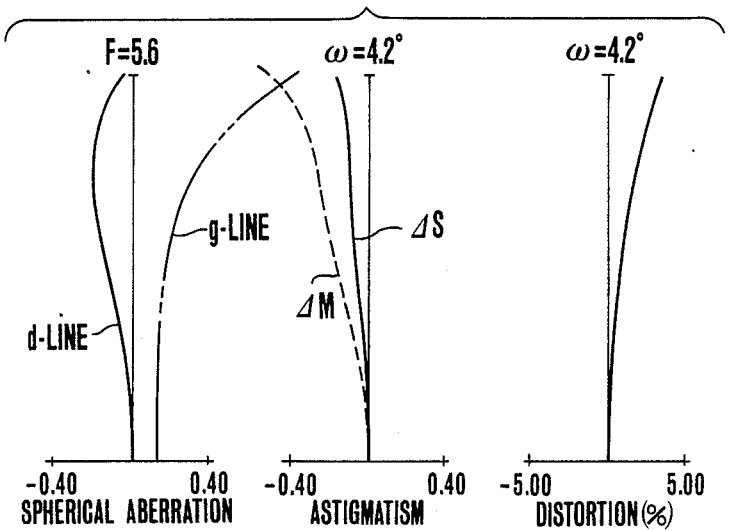
Figure 23A:
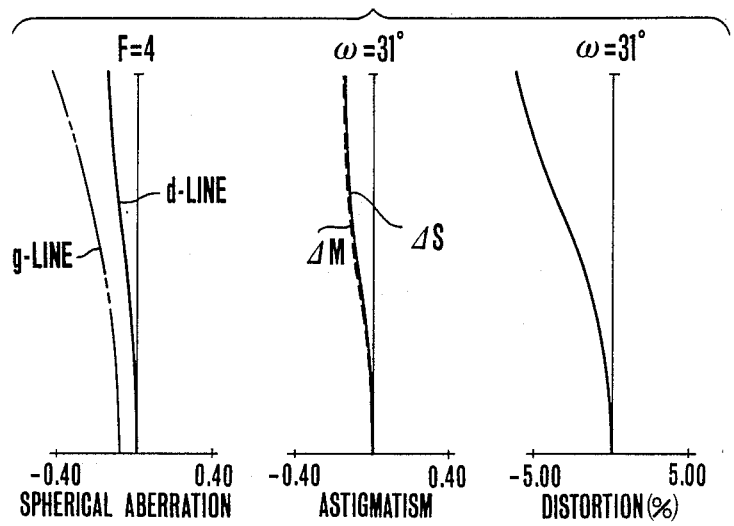
Figure 23B:
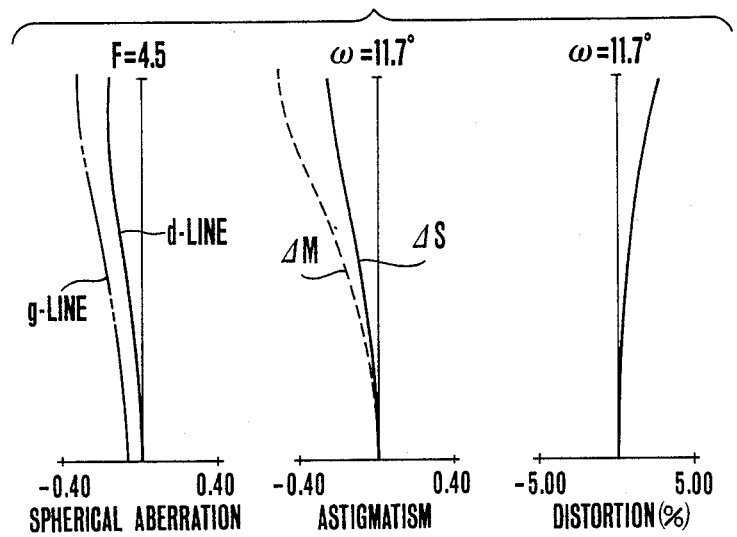
Figure 23C:
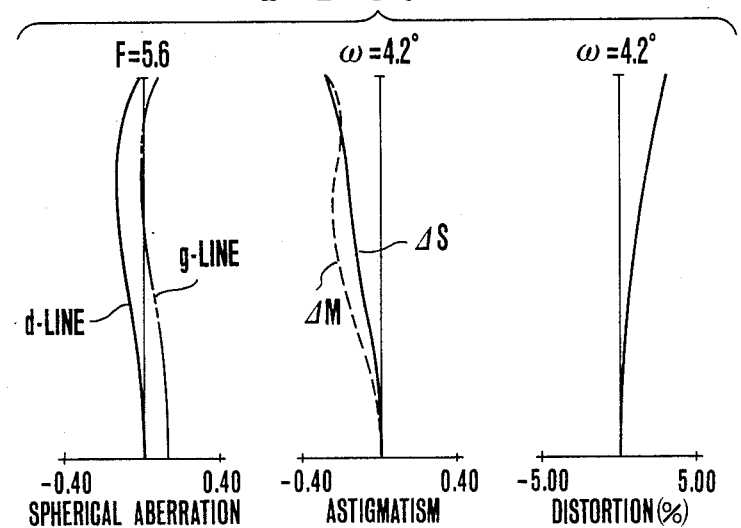
Figure 24:
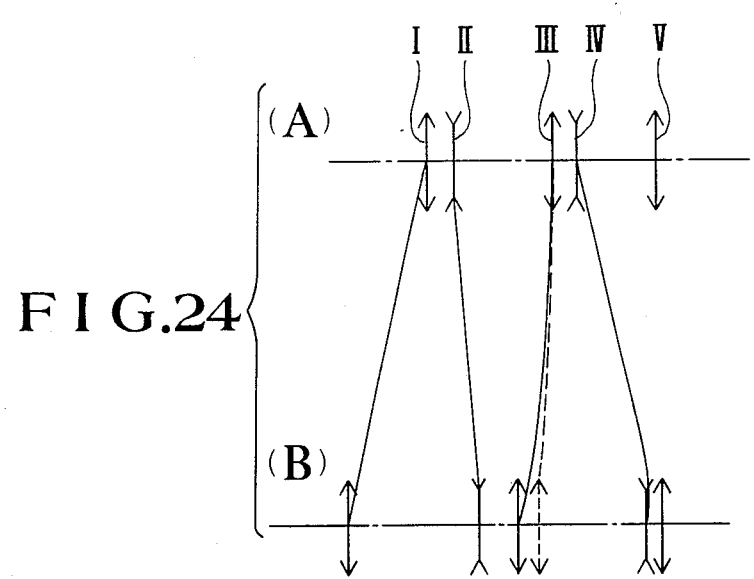
FIGS. 24 to 28 show the paraxial refractive power allocation of the examples 9 to 13 of the invention.

FIG. 15 shows zooming ratio in relation to the drawing-out extents of the focusing lens group obtained when the focused state of the zoom lens on an infinity distance object is shifted to object distances of 1.6 m, 3 m and 5 m. The drawing-out extents are indicated on the axis of abscissa and the zooming ratio on the axis of ordinate. As apparent from this drawing, the drawing-out extent of the focusing lens group relative to the same object distance increases accordingly as the focal length increases.

Next, the numerical examples 5 to 8 of the embodiment are described as follows: In a numerical example 5, a reference symbol Ri denotes the radius of curvature of the i-th lens surface of the lens system as counted from the object side thereof; a symbol Di the i-th lens thickness and air space; and symbols Ni and $\nu i$ the refractive index of glass and the Abbe number of the i-th lens, respectively. In numerical examples 6, 7 and 8, a reference symbol fi denotes the focal length of an i-th lens unit as counted from the object side; and a symbol ei' a distance between the principal points of the i-th lens unit and an $i+1$-th lens unit.

NUMERICAL EXAMPLE 5

FIGS. 9, 10 and 14(A) to 14(C)

| $F = 35.9$ $FNo = 1:4 = 5.6$ $2\omega = 62 - 7.2°$ | | | |
|---|---|---|---|
| R1 = 114.19 | D1 = 3.20 | N1 = 1.80518 | $\nu 1$ = 25.4 |
| R2 = 78.12 | D2 = 9.00 | N2 = 1.43387 | $\nu 2$ = 95.1 |
| R3 = −373.42 | D3 = 0.10 | | |
| R4 = 64.29 | D4 = 5.50 | N3 = 1.49782 | $\nu 3$ = 66.3 |
| R5 = 166.17 | D5 = 3.12 | | |
| | − 33.06 − 62.99 | | |
| R6 = 126.27 | D6 = 2.00 | N4 = 1.88300 | $\nu 4$ = 40.8 |
| R7 = 24.49 | D7 = 8.70 | | |
| R8 = −67.30 | D8 = 2.50 | N5 = 1.84666 | $\nu 5$ = 23.9 |
| R9 = −52.00 | D9 = 1.00 | N6 = 1.88300 | $\nu 6$ = 40.8 |
| R10 = 140.30 | D10 = 1.00 | | |
| R11 = 49.94 | D11 = 6.50 | N7 = 1.84666 | $\nu 7$ = 23.9 |
| R12 = −51.67 | D12 = 1.50 | | |
| R13 = −39.11 | D13 = 1.50 | N8 = 1.88300 | $\nu 8$ = 40.8 |
| R14 = 355.48 | D14 = 48.27 | | |
| | − 23.50 − 4.27 | | |

-continued

| F = 35.9 FNo = 1:4 = 5.6 2ω= 62 − 7.2° | | | |
|---|---|---|---|
| R15 = Stop | D15 = 17.2 − 8.2 − 4.1 | | |
| R16 = 132.71 | D16 = 4.00 | N9 = 1.51633 | ν9 = 64.1 |
| R17 = −129.59 | D17 = 0.11 | | |
| R18 = 70.70 | D18 = 4.21 | N10 = 1.51633 | ν10 = 64.1 |
| R19 = 47461.89 | D19 = 0.11 | | |
| R20 = 50.35 | D20 = 5.26 | N11 = 1.51633 | ν11 = 64.1 |
| R21 = 141.76 | D21 = 1.03 | | |
| R22 = 139.50 | D22 = 4.13 | N12 = 1.84666 | ν12 = 23.9 |
| R23 = 39.61 | D23 = 3.10 | | |
| R24 = 173.01 | D24 = 4.13 | N13 = 1.51118 | ν13 = 51.0 |
| R25 = −122.88 | D25 = 0.10 | | |
| R26 = 84.41 | D26 = 4.13 | N14 = 1.51118 | ν14 = 51.0 |
| R27 = −746.49 | D27 = 5.79 − 43.81 − 81.84 | | |
| R28 = −88.41 | D28 = 2.98 | N15 = 1.88300 | ν15 = 40.8 |
| R29 = 100.00 | D29 = 3.86 | N16 = 1.80518 | ν16 = 25.4 |
| R30 = −345.13 | D30 = 41.5 37.06 − 22.19 | | |
| R31 = 1472.04 | D31 = 6.00 | N17 = 1.51633 | ν17 = 64.1 |
| R32 = −40.27 | D32 = 0.10 | | |
| R33 = 93.85 | D33 = 5.00 | N18 = 1.51118 | ν18 = 51.0 |
| R34 = −137.58 | D34 = 2.94 | | |
| R35 = −43.03 | D35 = 2.00 | N19 = 1.80610 | ν19 = 40.9 |
| R36 = 75.27 | D36 = 0.50 | | |
| R37 = 124.66 | D37 = 5.00 | N20 = 1.51118 | ν20 = 51.0 |
| R38 = −71.07 | | | |

NUMERICAL EXAMPLE 6
(FIG. 11)

| Focal Length | 28.9 | 249.9 |
|---|---|---|
| f1 | 102.0 | |
| f2 | −19.0 | |
| f3 | 40.0 | |
| f4 | −84.2 | |
| f5 | 114.5 | |
| e1' | 14.0 | 64.3 |
| e2' | 66.8 | 23.0 |
| e3' | 20.0 | 64.7 |
| e4' | 23.8 | 18.0 |

NUMERICAL EXAMPLE 7
(FIG. 12)

| Focal Length | 29.0 | 275.0 |
|---|---|---|
| f1 | 100.4 | |
| f2 | −19.0 | |
| f3 | 45.0 | |
| f4 | −116.8 | |
| f5 | 96.5 | |
| e1' | 14.0 | 64.0 |
| e2' | 70.6 | 23.0 |
| e3' | 20.0 | 100.5 |
| e4' | 52.5 | 18.0 |

NUMERICAL EXAMPLE 8
(FIG. 13)

| Focal Length | 35.9 | 295.0 |
|---|---|---|
| f1 | 98.3 | |
| f2 | −20.0 | |
| f3 | 50.0 | |
| f4 | −190.7 | |
| f5 | 156.0 | |
| e1' | 16.0 | 61.6 |
| e2' | 71.5 | 26.0 |
| e3' | 22.0 | 105.3 |

-continued

| e4' | 48.1 | 20.0 |
|---|---|---|

Figure 25:
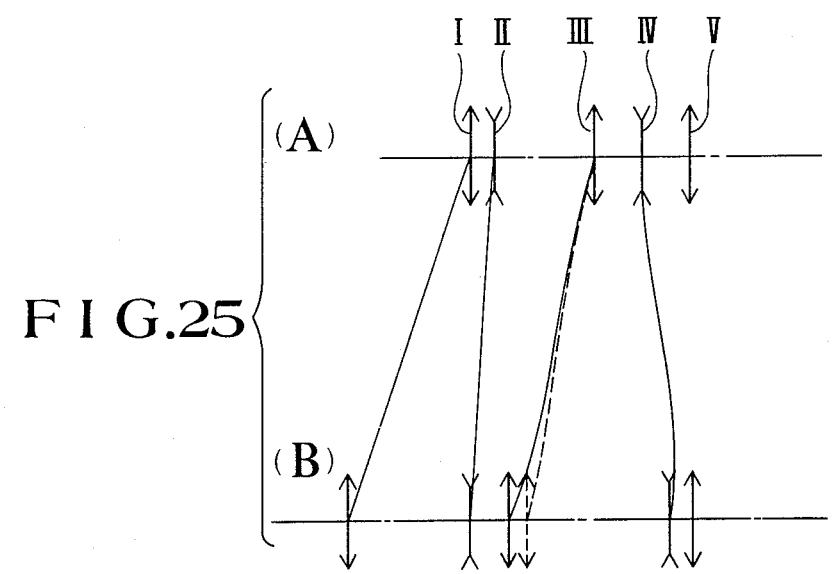
Figure 26:
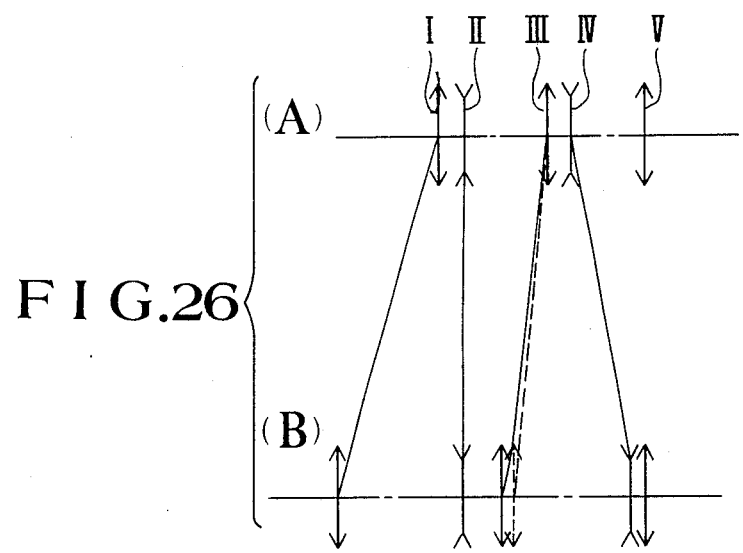
Figure 27:
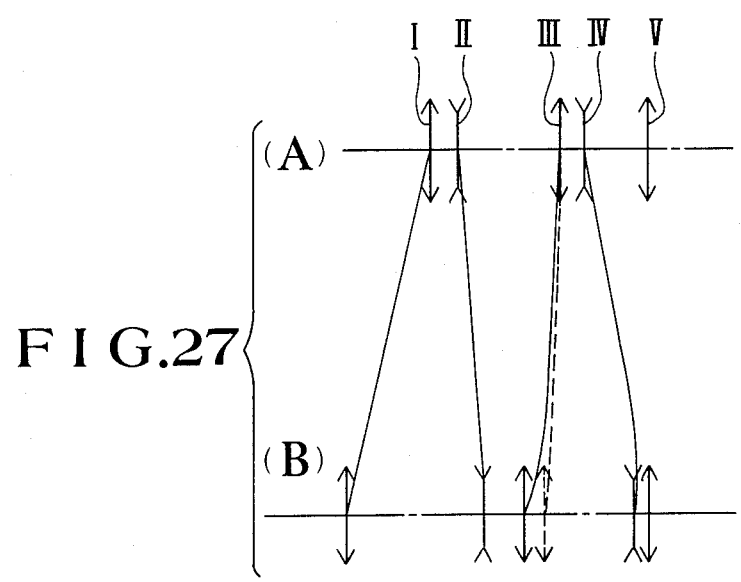
Figure 28:
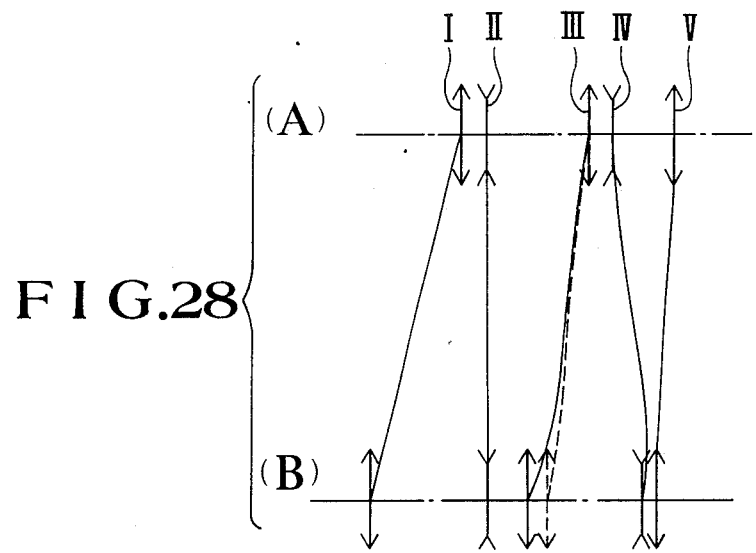
Figure 29:
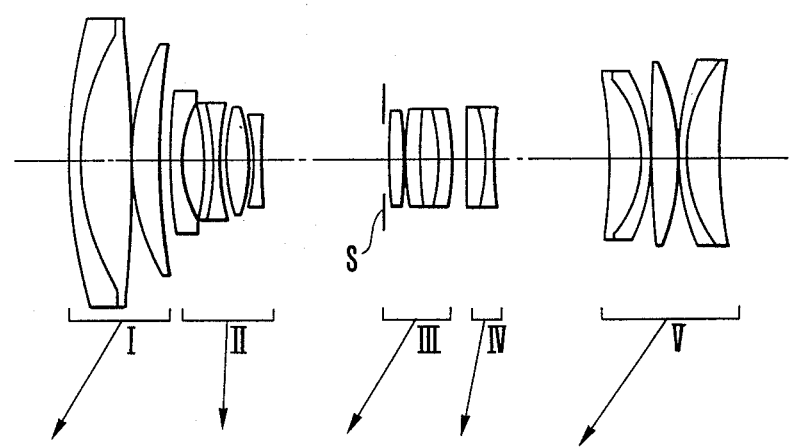
FIGS. 29, 30, 31 and 32 are sectional views showing numerical examples 14, 15, 16 and 17 of lenses embodying the invention.
Figure 30:
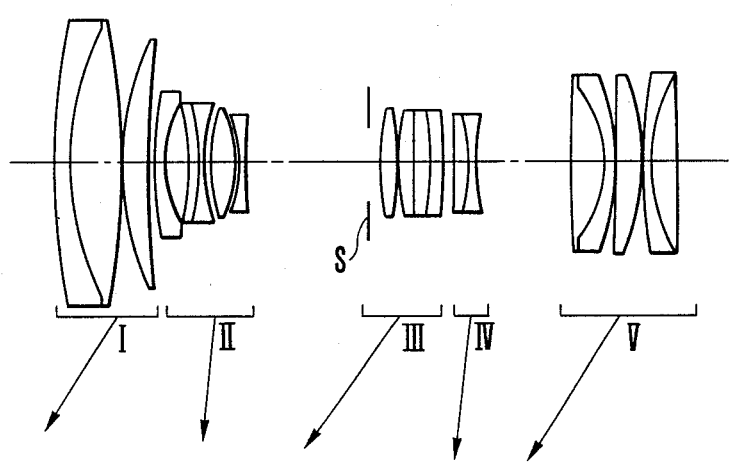
Figure 31:
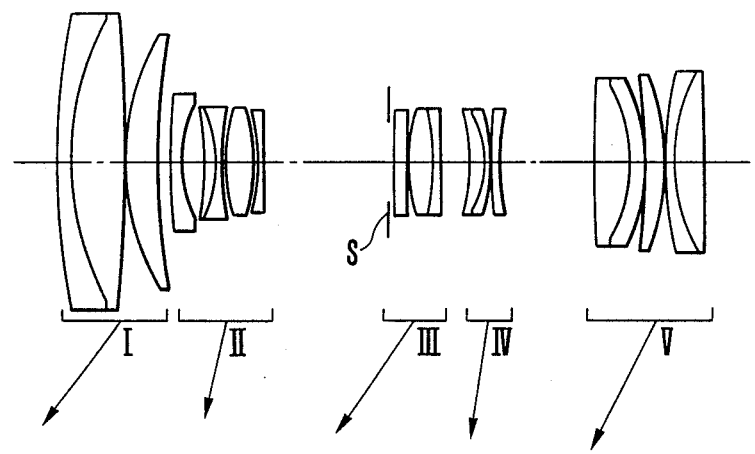
Figure 32:
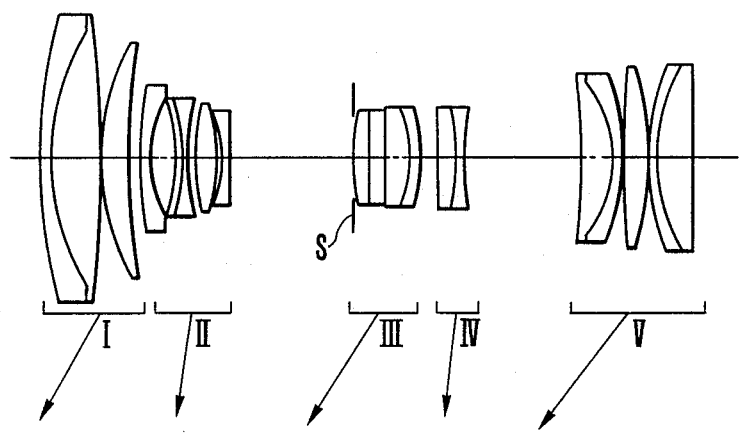
Figure 33:
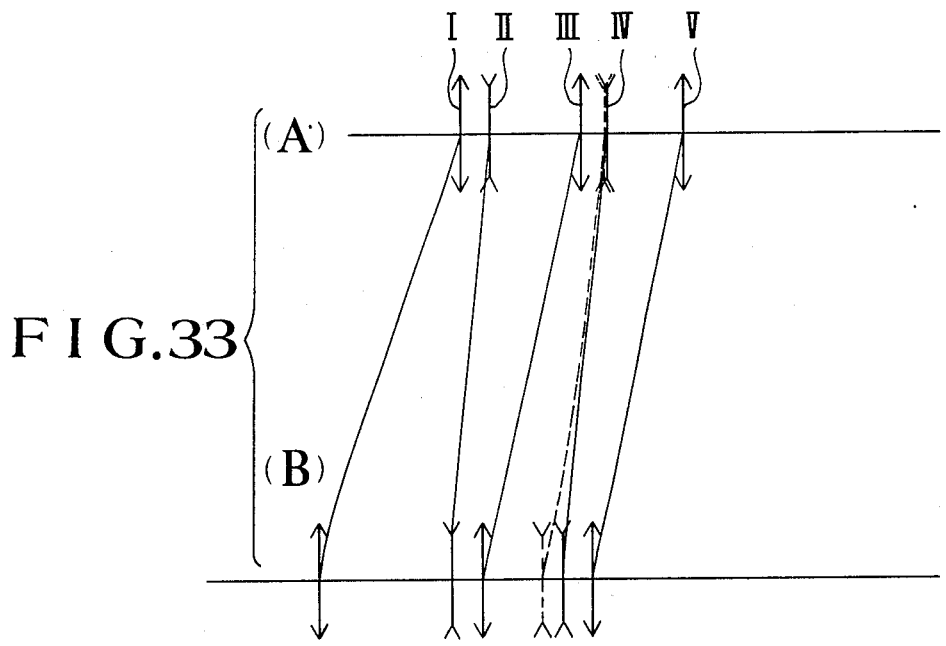
FIGS. 33 to 36 show the paraxial refractive power allocation of the numerical examples 14 to 17 of the invention.
Figure 34:
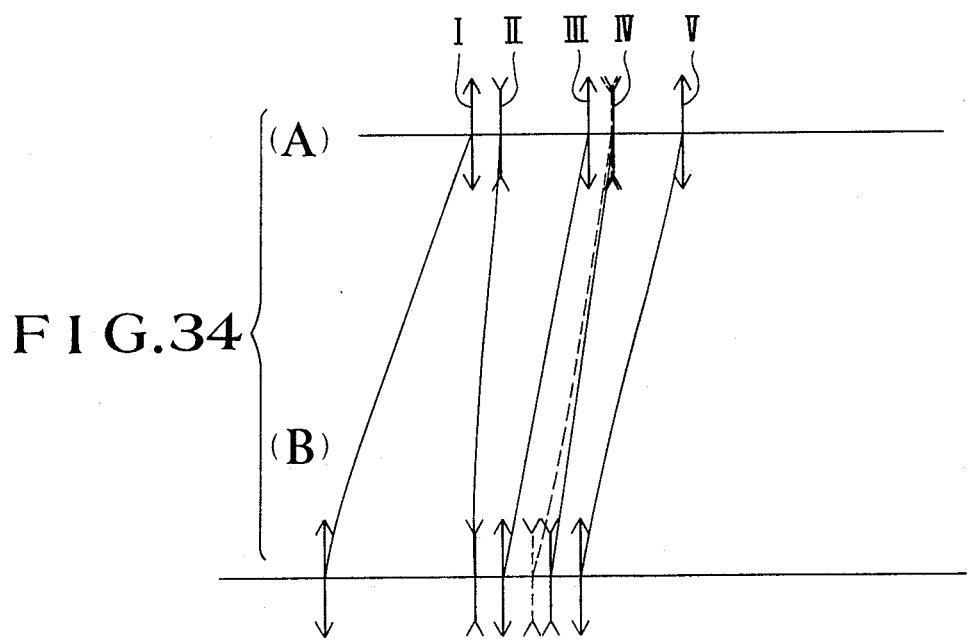
Figure 35:
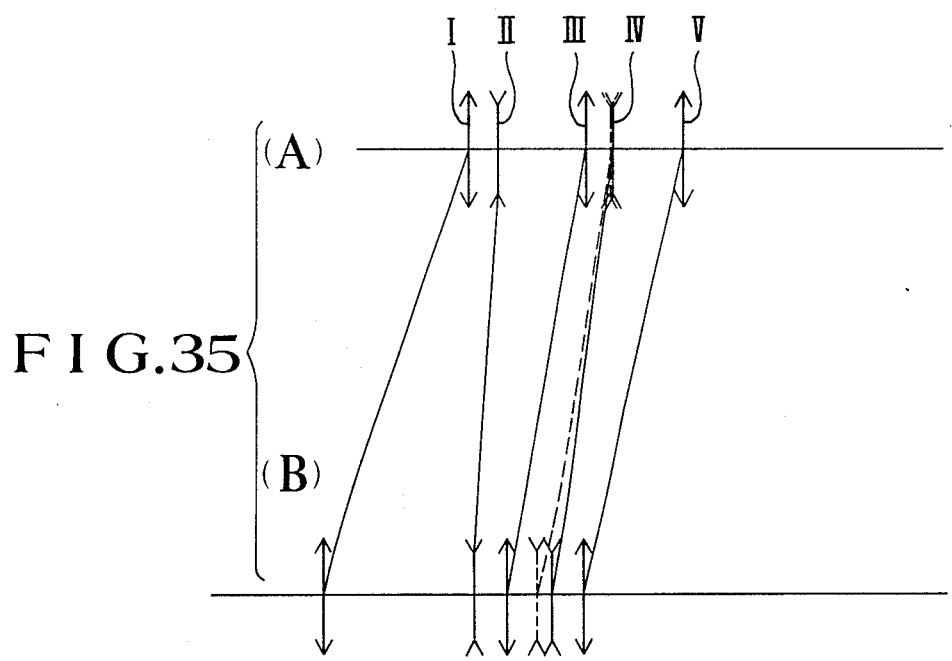
Figure 36:
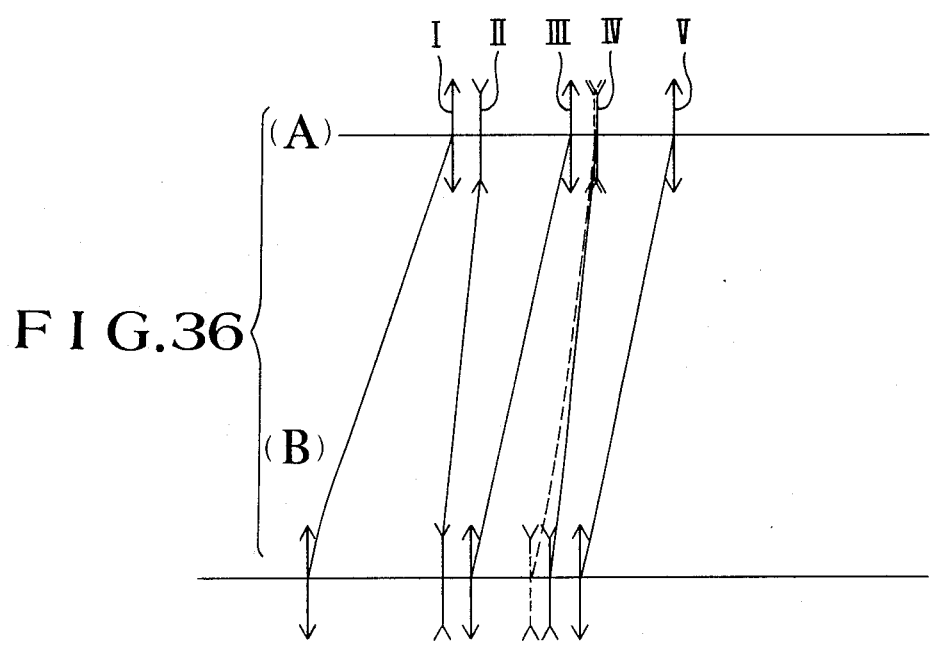
Figure 37A:
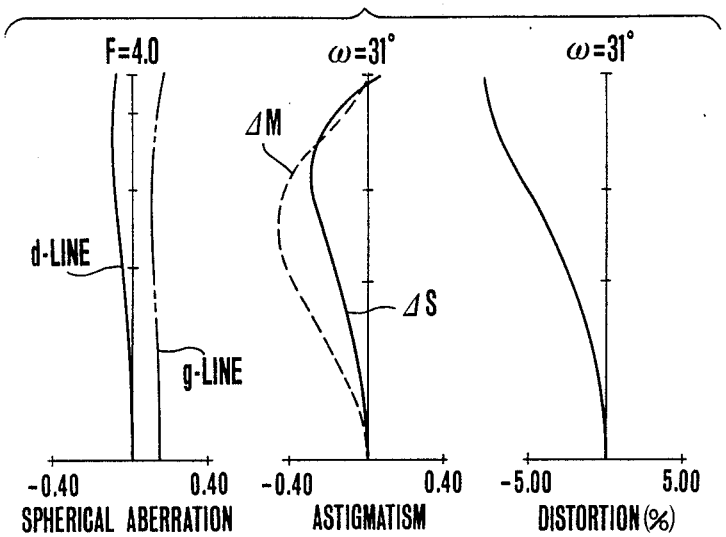
Figure 37B:
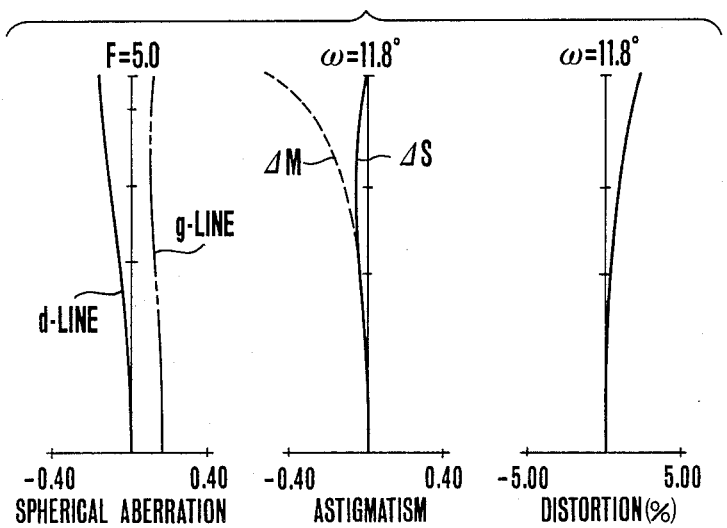
Figure 37C:
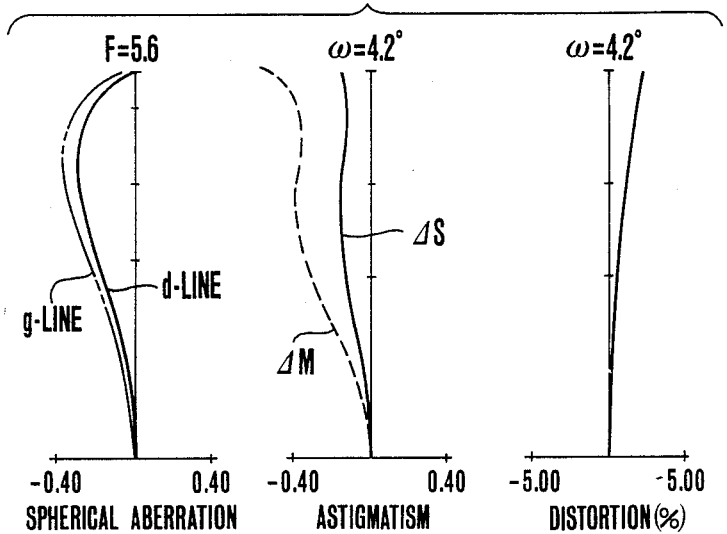
Figure 37D:
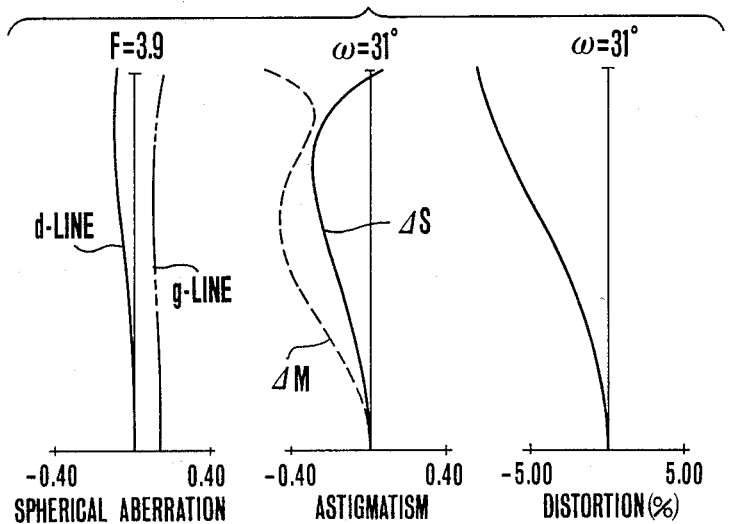
FIGS. 37(D), 37(E) and 37(F) show the aberrations taking place at the wide angle end, at the intermediate point and at the telephoto end for an object located at a distance of 3 m.
Figure 37E:
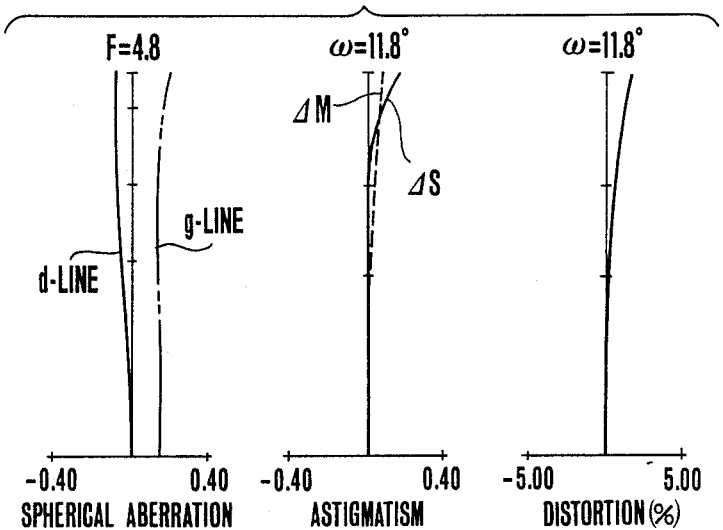
Figure 37F:
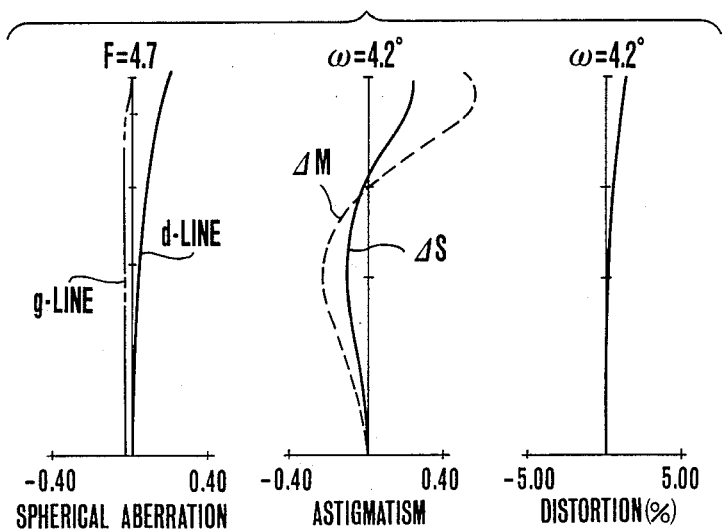
Figure 38A:
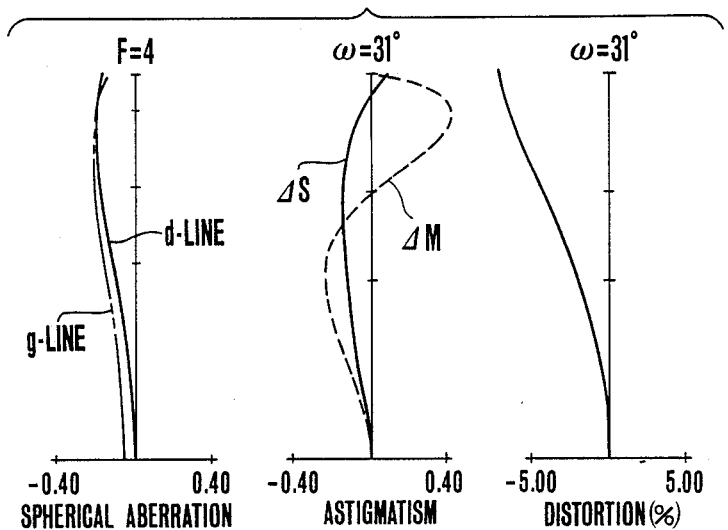
Figure 38B:
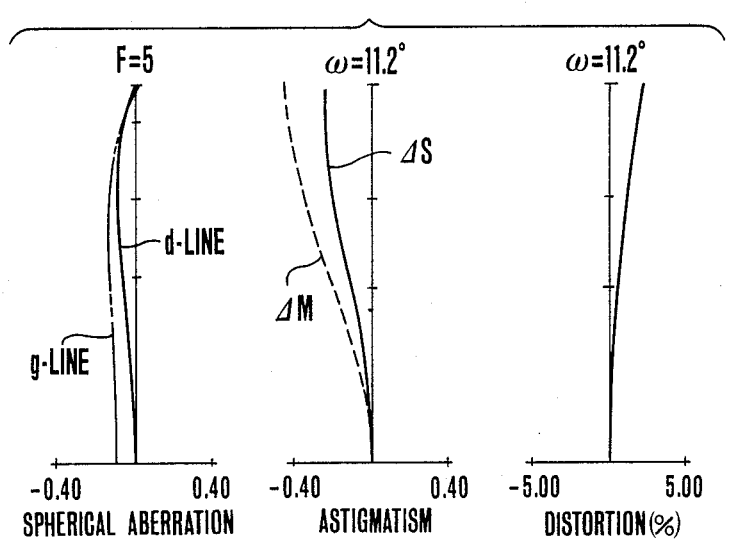
Figure 38C:
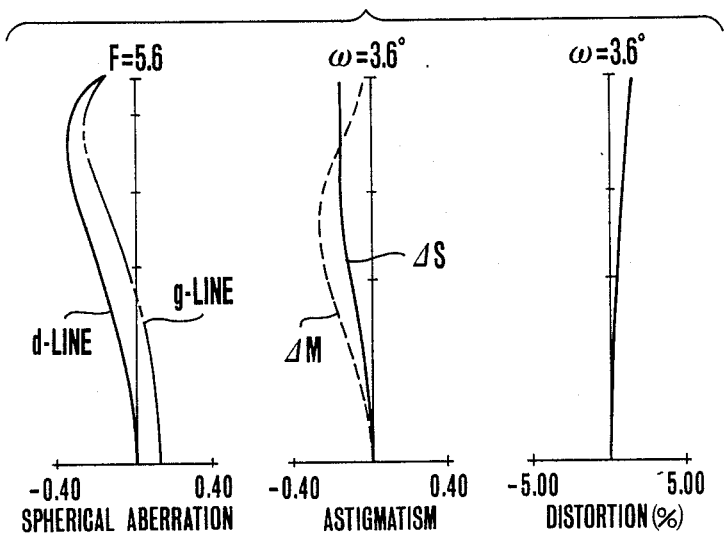
Figure 39A:
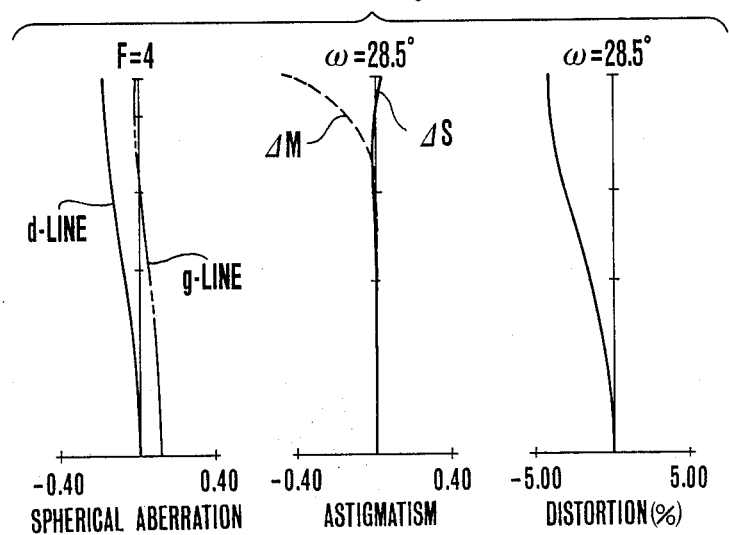
Figure 39B:
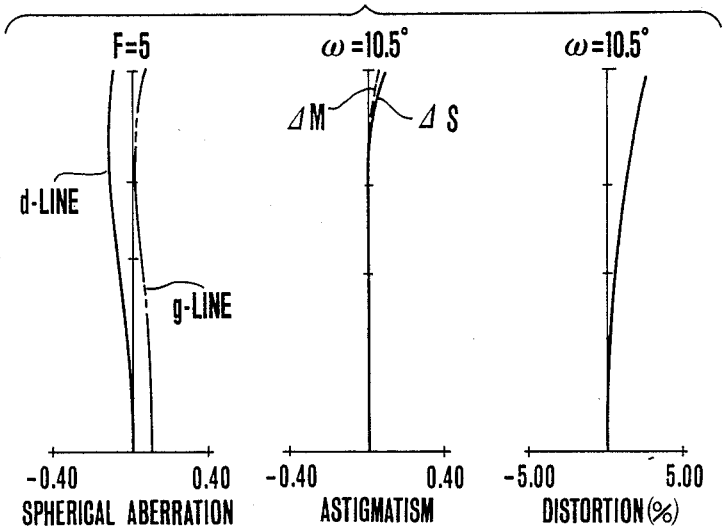
Figure 39C:
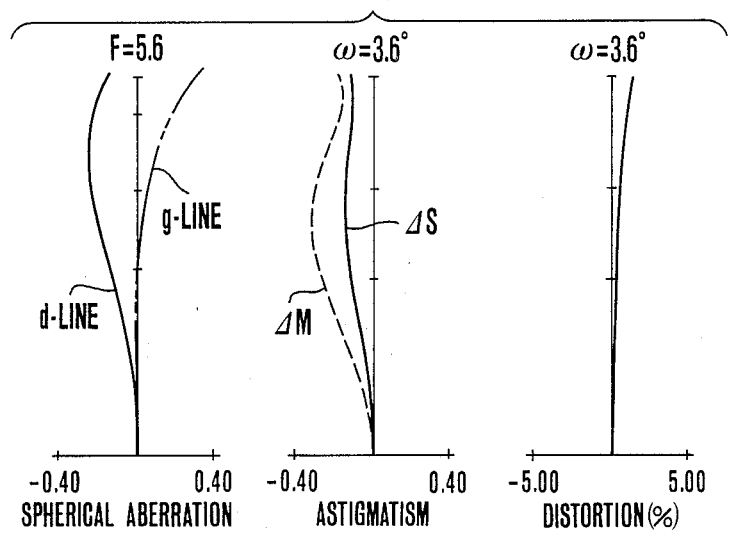
Figure 40A:
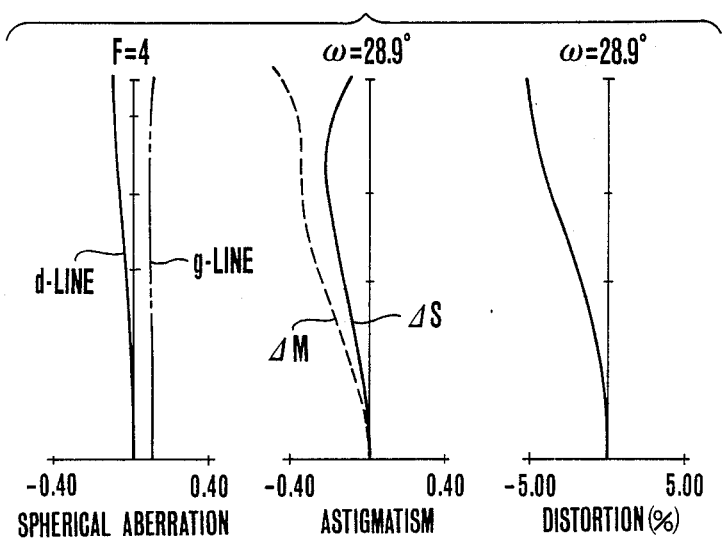
Figure 40B:
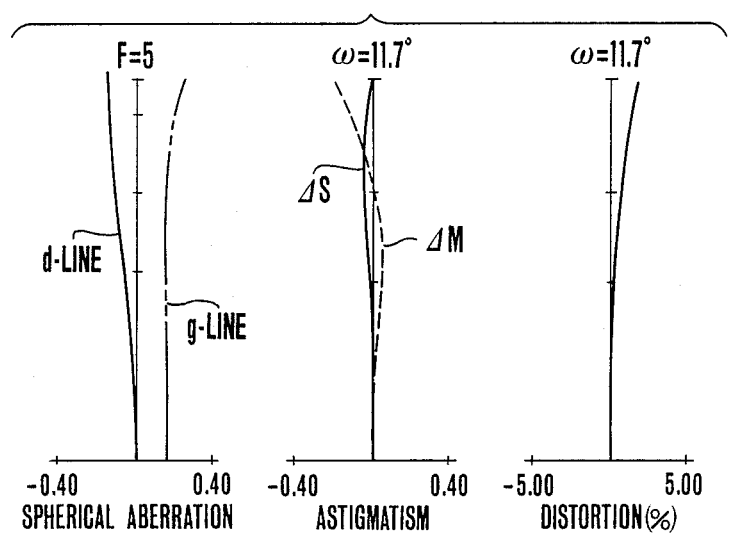

Another embodiment of this invention is arranged to perform a focusing operation by shifting the third of the lens units. The embodiment is arranged as described below with reference to FIGS. 16 to 28:

In zooming, the lens units are shifted in the same manner as described in the foregoing. In addition to that, the focusing lens is arranged to be moved by utilizing a space which is provided at the telephoto end of the lens system. As shown in FIG. 25, for example, while zooming is performed by shifting the lens units as indicated by full lines, focusing is performed by shifting the third lens unit III toward the image side as indicated by a broken line. In cases where there is disposed no lens unit on the image side of the focusing lens group, the power varying ratio of the lens unit located on the object side of the focusing lens group must be increased. To meet this requirement, it is necessary ether to increase the extent of power varying movement of a lens unit located closer to the object side than the focusing lens group or to increase the number of lens units. In view of this, this embodiment is arranged to have the fourth and fifth lens units arranged in positions closer to the image side than the focusing lens unit or group.

Assuming that a focal length obtained at an arbitrary zooming point while the lens system is focused on an object located at an infinity distance is F, the focal length of the whole lens system obtained at the wide angle end is Fw, the image forming magnification of the third lens unit at the above stated focal length F is $\beta F$ and that there obtains a relation of $Z = F/Fw$, the above stated focusing operation by shifting the third lens unit is preferably performed in such a way as to satisfy the following condition:

$$0.65 < (\beta F^2 - 1)/\sqrt{Z} < 3.46 \tag{13}$$

The condition formula (13) above defines a range within which the third lens unit may be drawn out for focusing at each of zooming points between the wide angle end position and the telephoto end position of the zoom lens. If the image forming magnification $\beta F$ becomes too large compared with the value Z with the upper limit value of the formula (13) exceeded, the sensitivity of the focusing lens group increases. Then, although the drawing-out extent becomes shorter to permit reduction in the total lens length, it becomes difficult to accurately accomplish mechanical control over the focusing lens group. Further, the refractive power of the third lens unit becomes weaker and the third lens unit must be shifted to a greater extent in varying the power. Then, it necessitates the lens system to have a wider space between the second and third lens units at the wide angle end. As a result, the total lens length increases. Further, in order to secure a sufficient amount of off-axial light, the effective diameter of the first lens unit must be increased.

If the lower limit value which is defined by the formula (13) is not reached, the image forming magnification $\beta F$ becomes too small relative to the value Z. In that event, the sensitivity of the focusing lens group becomes small to cause an increase in the drawing-out extent of the lens group. This necessitates an increase in the shifting space of the lens group and thus causes an increase in the total lens length.

Further, in order to obtain a zoom lens which not only has a high power varying ratio but also has a high degree of optical performance, the embodiment is preferably arranged to satisfy the following conditions:

Assuming that the focal lengths of the first, second and third lens units are f1, f2 and f3, respectively, and that the focal length of the whole lens system as obtained at the telephoto end position thereof is FT, there must obtain the following relations:

$$0.22 < f1/FT < 0.6 \quad (14)$$

$$0.046 < |f2/FT| < 0.093 \quad (15)$$

$$1.8 < |f3/f2| < 3.0 \quad (16)$$

If the upper limit value of the formula (14) is exceeded, the refractive power of the first lens unit become weak. In that case, to obtain a given power varying ratio, the shifting extent of the first lens unit must be increased. This increases the total lens length in the telephoto end position of the lens system. Further, in focusing, the shifting extents of the third and fourth lens units become too short for adequate mechanical control. Meanwhile, if the refractive power of the first lens unit becomes too strong with the lower limit value of the formula (14) not reached, the shifting extent of the third lens unit for focusing increases. Then, this necessitates provision for additional air space within the lens system. As a result, the total lens lengths obtained at the wide angle and telephoto ends increase.

The condition formula (15) relates to the refractive power of the second lens unit and is chiefly aimed to enhance the power varying effect of the second lens unit for obtaining a given power varying ratio while also permitting reduction in size of the whole lens system.

If the upper limit value defined by the formula (15) is exceeded, the refractive power of the second lens unit becomes weak. Then, to obtain the given power varying ratio, the shifting extent of the first lens unit must be increased. This causes an increase in the total lens length and also an increase in the effective diameter of the first lens unit. Further, the shifting extent of the third lens unit must be also increased for attaining the given power varying ratio. This necessitates an arrangement for a wider space between the second and third lens units. Then, in order to secure a given amount of an off-axial light flux, the effective diameter of the first lens unit must be increased.

If the lower limit value of the formula (15) is not reached, the refractive power of the second lens unit becomes too strong. In that event, although the total lens length can be shortened, the Petzval sum increases in the negative direction. This makes it difficult to keep an image surface characteristic in an adequate state. Further, during the power varying process, the second lens unit produces spherical aberration in a greater degree. Then, it becomes difficult to adequately correct the fluctuations of spherical aberration.

The condition formula (16) relates to the ratio of the refractive power of the third lens unit to the focal length of the second lens unit. If the upper limit value defined by the formula (16) is exceeded, the refractive power of the third lens unit becomes weaker. In that event, the varying degree of a space between the second and third lens units must be increased for attaining a given power varying ratio. The space which is obtained between the second and third lens units in the wide angle end position, therefore, must be arranged to be wider. This results in an increase in the total lens length. Further, in order to secure a given amount of an off-axial light flux, the effective diameter of the first lens unit must be increased. A space which is obtained between the third and fourth lens units in the telephoto end position also increases. Accordingly, the total lens length at the telephoto end increases.

If the refractive power of the third lens unit becomes too strong with the low limit value of the formula (16) not reached, the refractive powers of other lens units must be increased for correcting aberrations. As a result, it becomes difficult to retain the Petzval sum in an adequate state. In addition to that, it becomes difficult to adequately correct fluctuations of spherical aberration during the power varying process.

The numerical examples 9 to 13 of the embodiment of this invention are described as follows: In the examples 9, 10, 11 and 12, a reference symbol Ri denotes the radius of curvature of a lens surface located in an i-th place as viewed from the object side; a symbol Di denotes the lens thickness and air space located in the i-th place as viewed from the object side; and symbols Ni and νi respectively denote the refractive index of glass and the Abbe number of a lens located in the i-th place as viewed from the object side.

In the example 13, a symbol fi denotes the focal length of a lens unit located in the i-th place as viewed from the object side; and a symbol ei' denotes a distance between the principal points of i-th and i.+1-th lens units. Further, the relation of the above stated condition formulas to the numerical examples is as shown in Table-5.

NUMERICAL EXAMPLE 9

(FIGS. 16, 20(A) to 20(F) and 24)

| F = 36.0 − 342 FNo = 1:4 − 5.6 2ω = 63 − 7° | | | |
|---|---|---|---|
| R1 = 155.05 | D1 = 4.0 | N1 = 1.72047 | ν1 = 34.7 |
| R2 = 77.60 | D2 = 14.0 | N2 = 1.49700 | ν2 = 81.6 |
| R3 = −507.72 | D3 = 0.1 | | |
| R4 = 67.03 | D4 = 8.0 | N3 = 1.49700 | ν3 = 81.6 |
| R5 = 233.39 | D5 = 1.69 −42.42 − 69.58 | | |
| R6 = 135.96 | D6 = 2.0 | N4 = 1.88300 | ν4 = 40.8 |
| R7 = 25.09 | D7 = 8.0 | | |
| R8 = −60.40 | D8 = 2.7 | N5 = 1.84666 | ν5 = 23.9 |
| R9 = −40.19 | D9 = 1.5 | N6 = 1.88300 | ν6 = 40.8 |
| R10 = 198.83 | D10 = 1.2 | | |
| R11 = 59.81 | D11 = 7.0 | N7 = 1.84666 | ν7 23.9 |

-continued

| F =36.0 — 342 FNo = 1:4 — 5.6 2ω = 63 — 7° | | | |
|---|---|---|---|
| R12 = −59.81 | D12 = 1.4 | | |
| R13 = −42.37 | D13 = 1.5 | N8 = 1.88300 | ν8 = 40.8 |
| R14 = 18662.74 | D14 = ⎫ 45.88 | | |
| R15 = Stop | D15 = ⎭ | | |
| | − 28.03 − 5.78 | | |
| R16 = 155.24 | D16 = 4.3 | N9 = 1.48749 | ν9 = 70.2 |
| R17 = −96.40 | D17 = 0.1 | | |
| R18 = 489.85 | D18 = 4.3 | N10 = 1.48749 | ν10 = 70.2 |
| R19 = −89.00 | D19 = 0.1 | | |
| R20 = 293.03 | D20 = 6.7 | N11 = 1.51112 | ν11 = 60.5 |
| R21 = −40.95 | D21 = 1.91 | | |
| R22 = −83.55 | D22 = 8.04 | N12 = 1.80518 | ν12 = 25.4 |
| | − 47.52 − 73.84 | | |
| R23 = −93.73 | D23 = 4.42 | N13 = 1.80518 | ν13 = 25.4 |
| R 24 = −34.18 | D24 = 2.10 | N14 = 1.88300 | ν14 = 40.8 |
| R25 = −2348.17 | D25 = 43.12 | | |
| | − 12.14 = 1.81 | | |
| R26 = −3723.52 | D26 = 2.4 | N15 = 1.72825 | ν15 = 28.5 |
| R27 = 135.33 | D27 = 8.0 | N16 = 1.61800 | ν16 = 63.4 |
| R28 = −58.98 | D28 = 0.1 | | |
| R29 = 101.70 | D29 = 8.0 | N17 = 1.51112 | ν17 = 60.5 |
| R30 = −200.63 | D30 = 10.0 | | |
| R31 = −64.39 | D31 = 3.0 | N18 = 1.80518 | ν18 = 25.4 |
| R32 = −142.83 | D32 = 6.5 | N19 = 1.48749 | ν19 = 70.2 |
| R33 = −115.95 | | | |

NUMERICAL EXAMPLE 10
(FIGS. 17, 21(A) to 21(C) and 25)

NUMERICAL EXAMPLE 11
(FIGS. 18, 22(A) to 22(C) and 26)

| F = 35.9 — 342 FNo = 1:4 — 5.6 2ω = 63 — 7° | | | |
|---|---|---|---|
| R1 = 160.99 | D1 = 4.0 | N1 = 1.72047 | ν1 = 34.7 |
| R2 = 80.56 | D2 = 14.0 | N2 = 1.49700 | ν2 = 81.6 |
| R3 = −260.59 | D3 = 0.1 | | |
| R4 = 71.56 | D4 = 8.0 | N3 = 1.49700 | ν3 = 81.6 |
| R5 = 194.54 | D5 = 1.55 | | |
| | − 42.29 − 69.45 | | |
| R6 = 252.91 | D6 = 2.0 | N4 = 1.88300 | ν4 = 40.8 |
| R7 = 26.85 | D7 = 8.0 | | |
| R8 = −80.59 | D8 = 2.7 | N5 = 1.84666 | ν5 = 23.9 |
| R9 = −79.79 | D9 = 1.5 | N6 = 1.88300 | ν6 = 40.8 |
| R10 = 89.22 | D10 = 1.2 | | |
| R11 = 48.92 | D11 = 7.0 | N7 = 1.84666 | ν7 = 23.9 |
| R12 = −48.92 | D12 = 1.4 | | |
| R13 = −38.47 | D13 = 1.5 | N8 = 1.88300 | ν8 = 40.8 |
| R14 = 463.58 | D14 = ⎫ 50.9 | | |
| R15 = Stop | D15 = ⎭ | | |
| | − 31.12 − 8.61 | | |
| R16 = 249.41 | D16 = 4.5 | N9 = 1.51742 | ν9 = 52.4 |
| R17 = −96.66 | D17 = 0.1 | | |
| R18 = 108.95 | D18 = 4.5 | N10 = 1.56384 | ν10 = 60.7 |
| R19 = −785.46 | D19 = 0.1 | | |
| R20 = 40.14 | D20 = 4.5 | N11 = 1.53256 | ν11 = 45.9 |
| R21 = 1015.87 | D21 = 1.0 | | |
| R22 = −311.47 | D22 = 4.8 | N12 = 1.80518 | ν12 = 25.4 |
| R23 = 43.87 | D23 = 3.8 | | |
| R24 = 112.87 | D24 = 4.5 | N13 = 1.53256 | ν13 = 45.9 |
| R25 = −75.22 | D25 = 16.07 | | |
| | − 62.55 − 93.53 | | |
| R26 = −76.49 | D26 = 4.2 | N14 = 1.80518 | ν14 = 25.4 |
| R27 = −53.27 | D27 = 2.0 | N15 = 1.88300 | ν15 = 40.8 |
| R28 = −963.97 | D28 = 33.1˙ | | |
| | − 17.33 − 16.14 | | |
| R29 = 185.18 | D29 = 9.0 | N16 = 1.61800 | ν16 = 63.4 |
| R30 = −60.46 | D30 = 0.1 | | |
| R31 = 77.23 | D31 = 7.0 | N17 = 1.51118 | ν17 = 51.0 |
| R32 = −1126.73 | D32 = 10.0 | | |
| R33 = −57.61 | D33 = 2.0 | N18 = 1.80100 | ν18 = 35.0 |
| R34 = 518.66 | D34 = 5.0 | N19 = 1.51633 | ν19 = 64.1 |
| R35 = −108.60 | | | |

| F = 36.0 − 295 FNo = 1:4 − 5.6 2ω = 63 − 8° | | | |
|---|---|---|---|
| R1 = 149.55 | D1 = 3.6 | N1 = 1.72047 | ν1 = 34.7 |
| R2 = 73.29 | D2 = 12.0 | N2 = 1.49700 | ν2 = 81.6 |
| R3 = −246.64 | D3 = 0.1 | | |
| R4 = 59.42 | D4 = 7.4 | N3 = 1.49700 | ν3 = 81.6 |
| R5 = 141.23 | D5 = 1.35 − 36.55 − 60.01 | | |
| R6 = 121.18 | D6 = 1.7 | N4 = 1.88300 | ν4 = 40.8 |
| R7 = 23.50 | D7 = 6.8 | | |
| R8 = −58.57 | D8 = 2.4 | N5 = 1.84666 | ν5 = 23.9 |
| R9 = −33.14 | D9 = 1.5 | N6 = 1.88300 | ν6 = 40.8 |
| R10 = 130.98 | D10 = 1.05 | | |
| R11 = 53.52 | D11 = 4.0 | N7 = 1.84666 | ν7 = 23.9 |
| R12 = −56.65 | D12 = 1.2 | | |
| R13 = −36.88 | D13 = 1.5 | N8 = 1.88300 | ν8 = 40.8 |
| R14 = 1952.54 | D14 = } 33.60 | | |
| R15 = Stop | D15 = −21.79 − 8.61 | | |
| R16 = 212.18 | D16 = 3.6 | N9 = 1.51633 | ν9 = 64.1 |
| R17 = −89.30 | D17 = 0.1 | | |
| R18 = 280.09 | D18 = 3.6 | N10 = 1.51633 | ν10 = 64.1 |
| R19 = −63.20 | D19 = 0.1 | | |
| R20 = 99.35 | D20 = 5.6 | N11 = 1.55963 | ν11 = 61.2 |
| R21 = −46.35 | D21 = 1.6 | | |
| R22 = −198.45 | D22 = 6.92 − 43.88 − 68.52 | N12 = 1.80518 | ν12 = 25.4 |
| R23 = −93.30 | D23 = 4.5 | N13 = 1.80518 | ν13 = 25.4 |
| R24 = −25.74 | D24 = 1.5 | N14 = 1.88300 | ν14 = 40.8 |
| R25 = 344.44 | D25 = 34.45 − 11.05 − 0.03 | | |
| R26 = 1402.95 | D26 = 2.0 | N15 = 1.72825 | ν15 = 28.5 |
| R27 = 101.24 | D27 = 11.5 | N16 = 1.61800 | ν16 = 63.4 |
| R28 = −51.31 | D28 = 0.1 | | |
| R29 = 104.12 | D29 = 7.0 | N17 = 1.51633 | ν17 = 64.1 |
| R30 = −167.55 | D30 = 10.0 | | |
| R31 = −54.92 | D31 = 2.5 | N18 = 1.80518 | ν18 = 25.4 |
| R32 = −113.69 | D32 = 5.5 | N19 = 1.49388 | ν19 = 66.1 |
| R33 = −87.57 | | | |

NUMERICAL EXAMPLE 12

(FIGS. 19, 23(A) to 23(C) and 27)

| F = 36.0 − 295 FNo = 1:4 − 5.6 2ω = 63 − 8° | | | |
|---|---|---|---|
| R1 = 163.92 | D1 = 3.5 | N2 = 1.72047 | ν1 = 34.7 |
| R2 = 77.8 | D2 = 12.0 | N2 = 1.49700 | ν2 = 81.6 |
| R3 = −297.09 | D3 = 0.1 | | |
| R4 = 62.79 | D4 = 7.5 | N3 = 1.49700 | ν3 = 81.6 |
| R5 = 178.60 | D5 = 2.27 − 39.89 − 64.98 | | |
| R6 = 136.24 | D6 = 1.7 | N4 = 1.88300 | ν4 = 40.8 |
| R7 = 24.10 | D7 = 7.5 | | |
| R8 = −67.64 | D8 = 2.8 | N5 = 1.84666 | ν5 = 23.9 |
| R9 = −47.25 | D9 = 1.5 | N6 = 1.88300 | ν6 = 40.8 |
| R10 = 156.13 | D10 = 1.2 | | |
| R11 = 52.14 | D11 = 4.5 | N7 = 1.84666 | ν7 = 23.9 |
| R12 = −54.70 | D12 = 1.3 | | |
| R13 = −39.94 | D13 = 1.6 | N8 = 1.88300 | ν8 = 40.8 |
| R14 = 552.72 | D14 = } 41.40 | | |
| R15 = Stop | D15 = −26.72 − 6.82 | | |
| R16 = 155.43 | D16 = 4.0 | N9 = 1.51633 | ν9 = 64.1 |
| R17 = −169.05 | D17 = 0.1 | | |
| R18 = 251.08 | D18 = 4.0 | N10 = 1.51633 | ν10 = 64.1 |
| R19 = −64.76 | D19 = 0.1 | | |
| R20 = 84.63 | D20 = 6.0 | N11 = 1.55963 | ν11 = 61.2 |
| R21 = −51.38 | D21 = 1.6 | | |
| R22 = −407.87 | D22 = 5.78 − 34.59 − 53.80 | N12 = 1.80518 | ν12 = 25.4 |
| R23 = −103.91 | D23 = 5.0 | N13 = 1.80518 | ν13 = 25.4 |
| R24 = −25.45 | D24 = 1.5 | n14 = 1.88300 | ν14 = 40.8 |
| R25 = 266.57 | D25 = 31.64 − 8.97 − 3.97 | | |
| R26 = 433.02 | D26 = 1.8 | N15 = 1.72825 | ν15 = 28.5 |
| R27 = 91.39 | D27 = 9.0 | N16 = 1.61800 | ν16 = 63.4 |
| R28 = −50.79 | D28 = 0.1 | | |
| R29 = 101.29 | D29 = 5.0 | N17 = 1.51633 | ν17 = 64.1 |

-continued

| F = 36.0 − 295 FNo = 1:4 − 5.6 2ω = 63 − 8° | | | |
|---|---|---|---|
| R30 = −173.33 | D30 = 10.0 | | |
| R31 = −55.31 | D31 = 2.2 | N18 = 1.80518 | ν18 = 25.4 |
| R32 = −121.28 | D32 = 5.0 | N19 = 1.49388 | ν19 = 66.1 |
| R33 = −113.49 | | | |

NUMERICAL EXAMPLE 13

(FIG. 28)

| Focal Length | 36.0 | 342.0 |
|---|---|---|
| f1 | 115 | |
| f2 | −23 | |
| f3 | 57.5 | |
| f4 | −83.35 | |
| f5 | 75.11 | |
| e1' | 16.0 | 75.11 |
| e2' | 65.65 | 24.0 |
| e3' | 15.0 | 73.23 |
| e4' | 39.35 | 8.0 |

TABLE-5

| | | Numerical Example | | | | |
|---|---|---|---|---|---|---|
| Condition | | 9 | 10 | 11 | 12 | 13 |
| (13) $(\beta F2 - 1)/\sqrt{Z}$ | Wide Angle End | 1.0722 | 1.0722 | 1.7609 | 0.926 | 1.2765 |
| | Intermediate Point | 2.0146 | 2.291 | 2.623 | 1.457 | 2.278 |
| | Telephoto End | 1.8555 | 2.1748 | 2.503 | 1.3891 | 2.1498 |
| (14) f1/fT | | 0.365 | 0.365 | 0.340 | 0.407 | 0.336 |
| (15) \|f2/FT\| | | 0.0673 | 0.0673 | 0.0678 | 0.078 | 0.0673 |
| (16) \|f3/f2\| | | 2.391 | 2.5 | 2.25 | 2.174 | 2.5 |

A further embodiment of the invention wherein a focusing operation is performed on the basis of the fourth lens unit by utilizing an air space obtained on the telephoto side of zooming is described with reference to FIGS. 29 to 40. In the case of the embodiment, the image forming magnification $\beta 4w$ of the focusing fourth lens unit IV which is obtained at the wide angle end is arranged to satisfy the following condition:

$$0.1 < |\beta 4w| < 1 \qquad (17)$$

This condition formula (17) aims to ensure that the sensitivity value of the fourth lens unit obtained at the wide angle end is adequate and to minimize the drawing-out extent thereof for reduction in size of the whole lens system. If the upper limit value defined by the formula (17) is exceeded, the image forming magnification $|\beta 4w|$ becomes too large. In that event, the image forming magnification $|\beta 4w|$ becomes 1 at some point either during the power varying process or during the focusing operation. Then, this makes the focusing operation impossible. Further, if the image forming magnification $|\beta 4w|$ becomes too small with the lower limit value of the formula (17) not reached, the sensitivity becomes higher on the wide angle side. In order to lessen a difference between the drawing-out extent of the fourth lens unit obtained at the wide angle end and the drawing-out extent thereof obtained at the telephoto end, the sensitivity must be arranged to be higher at the telephoto end than at the wide angle end. However, if the sensitivity becomes too high with the lower limit value of the formula (17) not reached, the fourth lens unit must be arranged to be drawn out at a higher degree of precision. However, a mechanical arrangement to meet this requirement is very difficult Further, in the embodiment, the fourth lens unit is arranged to have, at the telephoto end, an image forming magnification $\beta 4T$ which satisfies the following condition:

$$0 < \beta 4T/\beta 4w < 1 \qquad (18)$$

The condition formula (18) above relates to the power varying ratio of the fourth lens unit. In accordance with the formula (18), the fourth lens unit serves to make a reduction during the power varying process. If the upper limit value defined by the formula (18) is exceeded, the image forming magnification of the fourth lens unit becomes 1.0 at some point during the power varying process. Focusing becomes impossible at that point. If the lower limit value of the formula (18) is not reached, the sensitivity becomes negative. Then, the fourth lens unit comes to move toward the image side in shifting the focused state of the lens from an infinity distance object to a near distance object.

In the case of this embodiment, the sensitivity and the drawing-out or delivery extent are set at apposite values. To permit speedy focusing, the drawing-out extent is arranged to be larger on the telephoto side of the zoom lens than on the wide angle side. Therefore, if the fourth lens unit is shifted toward the image side in focusing, the total lens length would increase at the telephoto end. It is therefore difficult to shorten the total lens length by arranging the focusing operation to be performed utilizing the air space obtainable through the power varying process at the telephoto end where the drawing-out degree increases.

The fifth lens unit of this embodiment has the following technological meaning: In varying the lens power by shifting it from the wide angle end to the telephoto end, the fifth lens unit is shifted toward the object side in such a way as to let the fifth lens unit participate in the power varying process, so that a high power varying ratio can be attained without difficulty. Further, the fifth lens unit is arranged to act to increase magnification in focusing in such a way as to increase the ratio between the sensitivity obtained at the wide angle end and the sensitivity obtained at the telephoto end so that the difference in the drawing-out extent can be minimized.

Further, in order to allow the zoom lens to have a high degree of optical performance as well as a high power varying ratio, the embodiment is preferably arranged to satisfy the following conditions:

Assuming that the focal lengths of the first, second and third lens units are f1, f2 and f3, respectively and that the focal length of the whole lens system as obtained at the telephoto end position thereof is FT, the above stated conditions can be expressed as follows:

$$0.22 < f1/FT < 0.6 \quad (19)$$

$$0.046 < |f2/FT| < 0.093 \quad (20)$$

$$1.8 < |f3/f2| < 3.0 \quad (21)$$

If the refractive power of the first lens unit becomes too weak with the upper limit value of the formula (19) exceeded, the shifting extent of the first lens unit for obtaining the given power varying ratio increases. This in turn increases the total lens length. Further, in that event, the shifting extents of the third and fourth lens units for focusing become too short for adequate mechanical control. Meanwhile, if the refractive power of the first lens unit becomes too strong with the lower limit value of the formula (19) not reached, the shifting extent of the third lens unit for focusing increases. This necessitate the lens system to have some additional air space included therein. As a result, the total lens length increases both at the wide angle end and telephoto end positions of the zoom lens.

The condition formula (20) relates to the refractive power of the second lens unit and is chiefly aimed to enhance the power varying effect of the second lens unit for attaining a given power varying ratio without hindering reduction in size of the whole lens system. If the refractive power of the second lens unit becomes weak with the upper limit value of the formula (20) exceeded, the shifting extent of the first lens unit must be increased for obtaining the given power varying ratio. Then, this causes not only an increase in the total lens length but also an increase in the effective diameter of the first lens unit. Further, in order to obtain the given power varying ratio, the shifting extent of the third lens unit must be increased. This necessitates the lens to have a wider space in between the second and third lens units. As a result, for securing a given amount of an off-axial light flux, the effective diameter of the first lens unit must be increased. If the refractive power of the second lens unit becomes too strong with the lower limit value of the formula (20) not reached, it becomes difficult to keep the image surface characteristic in an adequate state as the Petzval sum increases in the negative direction, although the total lens length becomes shorter. Besides, in that instance, the second lens unit brings about spherical aberration in a greater degree and it becomes difficult to adequately correct the fluctuations of the spherical aberration.

The condition formula (21) pertains to the ratio of the refractive power of the third lens unit to the focal length of the second lens unit. If the refractive power of the third lens unit becomes weak with the upper limit value of the formula (21) exceeded, the varying degree of the space between the second and third lens units must be increased for obtaining a given power varying ratio. Then, the lens must be arranged to have a wider space reserved in between the second and third lens units. This results in an increase in the total lens length. Besides, in order to secure a given amount of an off-axial light flux, the effective diameter of the first lens unit must be increased. The space which is obtained between the third and fourth lens units at the telephoto end then also increases. Besides, it becomes difficult to adequately correct fluctuations of spherical aberration during the power varying process.

The numerical examples 14 to 17 of the embodiment of this invention are as described in the following: In numerical examples 14, 15, 16 and 17, a reference symbol Ri denotes the radius of curvature of a lens surface located in an i-th place as counted from the object side of the lens system; a symbol Di denotes the lens thickness and the air space located in the i-th place; and symbols Ni and $\nu i$ denote the refractive index of glass and the Abbe number of the lens located in the i-th place, respectively.

Further, the relation of the above stated condition formulas to the various values of the numerical examples is as shown in Table-6.

NUMERICAL EXAMPLE 14

(FIGS. 29, 33 and 37(A) to 37(F))

| F = 36.0 − 295 FNo = 1:4 − 5.6 2ω = 62 − 8.4° | | | |
|---|---|---|---|
| R1 = 174.39 | D1 = 3.5 | N1 = 1.72047 | ν1 = 34.7 |
| R2 = 76.27 | D2 = 12.5 | N2 = 1.49700 | ν2 = 81.6 |
| R3 = −273.75 | D3 = 0.1 | | |
| R4 = 67.21 | D4 = 7.0 | N3 = 1.49700 | ν3 = 81.6 |
| R5 = 296.00 | D5 = 3.0<br>− 37.2 − 60.0 | | |
| R6 = 103.18 | D6 = 2.0 | N4 = 1.88300 | ν4 = 40.8 |
| R7 = 26.17 | D7 = 7.0 | | |
| R8 = −69.01 | D8 = 3.0 | N5 = 1.84666 | ν5 = 23.9 |
| R9 = −57.11 | D9 = 1.5 | N6 = 1.88300 | ν6 = 40.8 |
| R10 = 82.56 | D10 = 1.2 | | |
| R11 = 43.40 | D11 = 6.7 | N7 = 1.84666 | ν7 = 23.9 |
| R12 = −44.79 | D12 = 1.4 | | |
| R13 = −32.44 | D13 = 1.5 | N8 = 1.88300 | ν8 = 40.8 |
| R14 = 319.64 | D14 = 33.7<br>− 16.6 − 0.5 | | |
| R15 = Stop | D15 = 1.09 | | |
| R16 = 148.74 | D16 = 4.0 | N9 = 1.69680 | ν9 = 56.5 |
| R17 = −149.34 | D17 = 0.1 | | |
| R18 = 76.08 | D18 = 4.0 | N10 = 1.60311 | ν10 = 60.7 |
| R19 = 208.42 | D19 = 0.1 | | |
| R20 = 1000.00 | D20 = 5.0 | N11 = 1.62299 | ν11 = 58.2 |
| R21 = −39.13 | D21 = 3.0 | N12 = 1.84666 | ν12 = 23.9 |

-continued

| F = 36.0 − 295 FNo = 1:4 − 5.6 2ω = 62 − 8.4° | | | |
|---|---|---|---|
| R22 = −109.54 | D22 = 4.6 − 22.0 − 33.6 | | |
| R23 = −199.38 | D23 = 5.0 | N13 = 1.92286 | ν13 = 20.9 |
| R24 = −47.67 | D24 = 1.8 | N14 = 1.88300 | ν14 = 40.8 |
| R25 = 98.86 | D25 = 30.4 − 15.3 − 5.2 | | |
| R26 = −174.67 | D26 = 9.0 | N15 = 1.62299 | ν15 = 58.2 |
| R27 = −31.16 | D27 = 2.5 | N16 = 1.88300 | ν16 = 40.8 |
| R28 = −59.63 | D28 = 0.1 | | |
| R29 = 328.43 | D29 = 7.0 | N17 = 1.51823 | ν17 = 59.0 |
| R30 = −73.26 | D30 = 0.1 | | |
| R31 = 62.31 | D31 = 2.0 | N18 = 1.84666 | ν18 = 23.9 |
| R32 = 40.08 | D32 = 8.0 | N19 = 1.65160 | ν19 = 58.6 |
| R33 = 115.30 | | | |

NUMERICAL EXAMPLE 15

(FIGS. 30, 34 and 38(A) to 38(C))

| F = 36 − 342 FNo = 1:4 − 5.6 2ω = 62 − 62 − 7.2° | | | |
|---|---|---|---|
| R1 = 194.48 | D1 = 3.8 | N1 = 1.72047 | ν1 = 34.7 |
| R2 = 78.92 | D2 = 13.0 | N2 = 1.49700 | ν2 = 81.6 |
| R3 = −283.05 | D3 = 0.1 | | |
| R4 = 70.17 | D4 = 7.6 | N3 = 1.49700 | ν3 = 81.6 |
| R5 = 292.01 | D5 = 2.0 − 42.1 − 68.9 | | |
| R6 = 98.48 | D6 = 2.0 | N4 = 1.88300 | ν4 = 40.8 |
| R7 = 27.88 | D7 = 7.0 | | |
| R8 = −76.03 | D8 = 3.0 | N5 = 1.84666 | ν5 = 23.9 |
| R9 = −55.86 | D9 = 1.5 | N6 = 1.88300 | ν6 = 40.8 |
| R10 = 60.72 | D20 = 1.2 | | |
| R11 = 42.45 | D11 = 6.7 | N7 = 1.84666 | ν7 = 23.9 |
| R12 = −42.45 | D12 = 1.4 | | |
| R13 = −32.62 | D13 = 1.5 | N8 = 1.88300 | ν8 = 40.8 |
| R14 = 229.43 | D14 = 33.8 − 17.5 − 1.1 | | |
| R15 = Stop | D15 = 3.41 | | |
| R16 = 110.64 | D16 = 4.0 | N9 = 1.69700 | ν9 = 48.5 |
| R17 = −163.70 | D17 = 0.1 | | |
| R18 = 57.75 | D18 = 4.0 | N10 = 1.66672 | ν10 = 48.3 |
| R19 = 309.28 | D19 = 0.1 | | |
| R20 = 615.63 | D20 = 5.0 | N11 = 1.62280 | ν11 = 57.0 |
| R21 = −58.51 | D21 = 2.3 | N12 = 1.84666 | ν12 = 23.9 |
| R22 = −1009.91 | D22 = 3.4 − 9.9 − 14.3 | | |
| R23 = −184.04 | D23 = 4.0 | N13 = 1.84666 | ν13 = 23.9 |
| R24 = −39.89 | D24 = 1.5 | N14 = 1.88300 | ν14 = 40.8 |
| R25 = 82.83 | D25 = 25.5 − 12.1 − 3.1 | | |
| R26 = −747.16 | D26 = 9.0 | N15 = 1.62374 | ν15 = 47.1 |
| R27 = −29.42 | D27 = 2.4 | N16 = 1.88300 | ν16 = 40.8 |
| R28 = −70.61 | D28 = 0.1 | | |
| R29 = 451.12 | D29 = 7.0 | N17 = 1.53256 | ν17 = 45.9 |
| R30 = −63.51 | D30 = 0.1 | | |
| R31 = 173.21 | D31 = 2.0 | N18 = 1.84666 | ν18 = 23.9 |
| R32 = 46.78 | D32 = 8.0 | N19 = 1.69700 | ν19 = 48.5 |
| R33 = −254.08 | | | |

NUMERICAL EXAMPLE 16

(FIGS. 31, 35 and 39(A) to 39(C))

| F = 39.8 − FNo = 1:4 − 5.6 2ω = 57 − 7.2 | | | |
|---|---|---|---|
| R1 = 206.28 | D1 = 4.0 | N1 = 1.72047 | ν1 = 34.7 |
| R2 = 82.61 | D2 = 15.0 | N2 = 1.49700 | ν2 = 81.6 |
| R3 = −246.58 | D3 = 0.1 | | |
| R4 = 71.27 | D4 = 8.5 | N3 = 1.49700 | ν3 = 81.6 |
| R5 = 235.77 | D5 = 7.24 − 47.16 72.87 | | |
| R6 = 201.19 | D6 = 2.0 | N4 = 1.88300 | ν4 = 40.8 |
| R7 = 27.89 | D7 = 7.1 | | |
| R8 = −77.76 | D8 = 3.0 | N5 = 1.84666 | ν5 = 23.9 |
| R9 = −32.26 | D9 = 1.5 | N6 = 1.88300 | ν6 = 40.8 |
| R10 = 93.01 | D10 = 1.23 | | |
| R11 = 55.73 | D11 = 7.0 | N7 = 1.84666 | ν7 = 23.9 |
| R12 = −56.46 | D12 = 1.4 | | |
| R13 = −42.26 | D13 = 1.5 | N8 = 1.88300 | ν8 = 40.8 |
| R14 = −46483.78 | D14 = 31 | | |

-continued

| F = 39.8 — FNo = 1:4 — 5.6 2ω = 57 — 7.2 | | | |
|---|---|---|---|
| | − 15.94 − 0.08 | | |
| R15 = Stop | D15 = 1.15 | | |
| R16 = 135.02 | D16 = 4.0 | N9 = 1.69680 | ν9 = 56.5 |
| R17 = −290.41 | D17 = 0.1 | | |
| R18 = 52.44 | D18 = 6.8 | N10 = 1.55963 | ν10 = 61.2 |
| R19 = −60.37 | D19 = 2.0 | N11 = 1.84666 | ν11 = 23.9 |
| R20 = −195.14 | D20 = 7.98 | | |
| | − 14.3 − 18.37 | | |
| R21 = −26.36 | D22 = 1.5 | N13 = 1.88300 | ν12 = 25.4 |
| R22 = −26.36 | D22 = 1.5 | N13 = 1.88300 | ν13 = 40.8 |
| R23 = −49.09 | D23 = 1.0 | | |
| R24 = −212.77 | D24 = 2.0 | N14 = 1.88300 | ν14 = 40.8 |
| R25 = 91.55 | D25 = 24.19 | | |
| | − 11.02 − 2.55 | | |
| R26 = −1795.85 | D26 = 9.8 | N15 = 1.62299 | ν15 = 58.2 |
| R27 = −34.92 | D27 = 2.5 | N16 = 1.80610 | ν16 = 40.9 |
| R28 = −66.74 | D28 = 0.1 | | |
| R29 = −303.28 | D29 = 5.0 | N17 = 1.51742 | ν17 = 52.4 |
| R30 = −85.64 | D30 = 0.1 | | |
| R31 = 81.58 | D31 = 2.5 | N18 = 1.80518 | ν18 = 25.4 |
| R32 = 46.01 | D32 = 8.2 | N19 = 1.60311 | ν19 = 60.7 |
| R33 = −2461.39 | | | |

NUMERICAL EXAMPLE 17
(FIGS. 32, 36 and 40(A) to 40(C))

| F = 39.2 − 291.8 FNo = 1:4 − 5.6 2ω = 57.8 − 8.5° | | | |
|---|---|---|---|
| R1 = 168.82 | D1 = 3.5 | N1 = 1.72047 | ν1 = 34.7 |
| R2 = 76.48 | D2 = 12.5 | N2 = 1.49700 | ν2 = 81.6 |
| R3 = −268.11 | D3 = 0.1 | | |
| R4 = 65.02 | D4 = 7.0 | N3 = 1.49700 | ν3 = 81.6 |
| R5 = 233.44 | D5 = 5.7 | | |
| | − 37.05 − 59.68 | | |
| R6 = 98.00 | D6 = 2.0 | N4 = 1.88300 | ν4 = 40.8 |
| R7 = 25.60 | D7 = 7.0 | | |
| R8 = −65.55 | D8 = 3.0 | N5 = 1.84666 | ν5 = 23.9 |
| R9 = −57.44 | D9 = 1.5 | N6 = 1.88300 | ν6 = 40.8 |
| R10 = 80.59 | D10 = 1.2 | | |
| R11 = 44.70 | D11 = 6.7 | N7 = 1.84666 | ν7 = 23.9 |
| R12 = −42.89 | D12 = 1.4 | | |
| R13 = −31.86 | D13 = 1.5 | N8 = 1.88300 | ν8 = 40.8 |
| R14 = 563.26 | D14 = 30.97 | | |
| | − 15.98 − 0.08 | | |
| R15 = Stop | D15 = 0.08 | | |
| R16 = 97.14 | D16 = 4.0 | N9 = 1.69700 | ν9 = 48.5 |
| R17 = 4286.86 | D17 = 0.1 | | |
| R18 = 198.44 | D18 = 4.0 | N10 = 1.65160 | ν10 = 58.6 |
| R19 = −17285.65 | D19 = 0.1 | | |
| R20 = 192.56 | D20 = 7.0 | N11 = 1.60729 | ν11 = 59.4 |
| R21 = −32.40 | D21 = 2.0 | N12 = 1.80518 | ν12 = 25.4 |
| R22 = −80.87 | D22 = 6.78 | | |
| | − 22.72 − 34.23 | | |
| R23 = −169.90 | D23 = 5.0 | N13 = 1.92286 | ν13 = 20.9 |
| R24 = −55.82 | D24 = 1.8 | N14 = 1.88300 | ν14 = 40.8 |
| R25 = 110.41 | D25 = 28.76 | | |
| | − 14.86 − 4.83 | | |
| R26 = −227.44 | D26 = 9.0 | N15 = 1.62299 | ν15 = 58.2 |
| R27 = −32.86 | D27 = 2.1 | N16 = 1.88300 | ν16 = 40.8 |
| R28 = −63.32 | D28 = 0.1 | | |
| R29 = 268.52 | D29 = 7.0 | N17 = 1.51823 | ν17 = 59.0 |
| R30 = −80.88 | D30 = 0.1 | | |
| R31 = 74.74 | D31 = 2.0 | N18 = 1.80518 | ν18 = 25.4 |
| R32 = 46.72 | D32 = 8.5 | N19 = 1.60311 | ν19 = 60.7 |
| R33 = 214.01 | | | |

TABLE 6

| | Numerical Example | | | |
|---|---|---|---|---|
| Condition | 14 | 15 | 16 | 17 |
| (17) β4w | −0.468 | −0.517 | −0.448 | −0.408 |
| (18) β4T | −0.13 | −0.221 | −0.211 | −0.113 |
| (19) f1/FT | 0.389 | 0.365 | 0.383 | 0.394 |
| (20) |f2/FT| | 0.078 | 0.067 | 0.070 | 0.079 |

TABLE 6-continued

| | Numerical Example | | | |
|---|---|---|---|---|
| Condition | 14 | 15 | 16 | 17 |
| (21) |f3/f2| | 2.609 | 2.39 | 2.391 | 2.609 |

Figure 41:
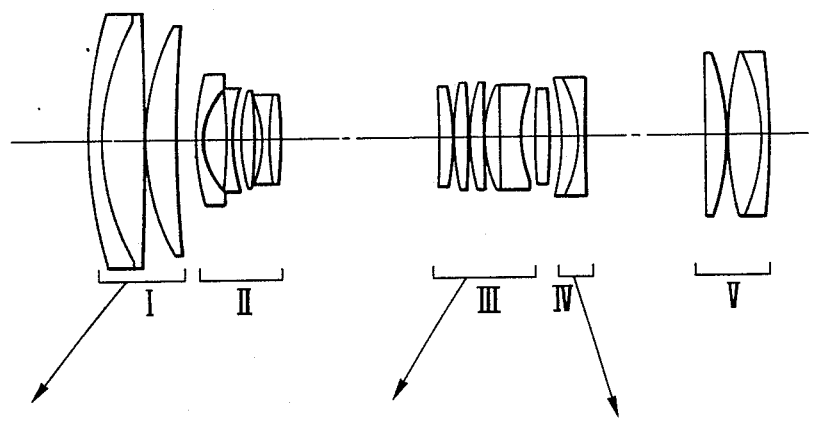
FIGS. 41 and 42 are sectional views showing numerical examples 18 and 19 of lenses embodying this invention.
Figure 42:
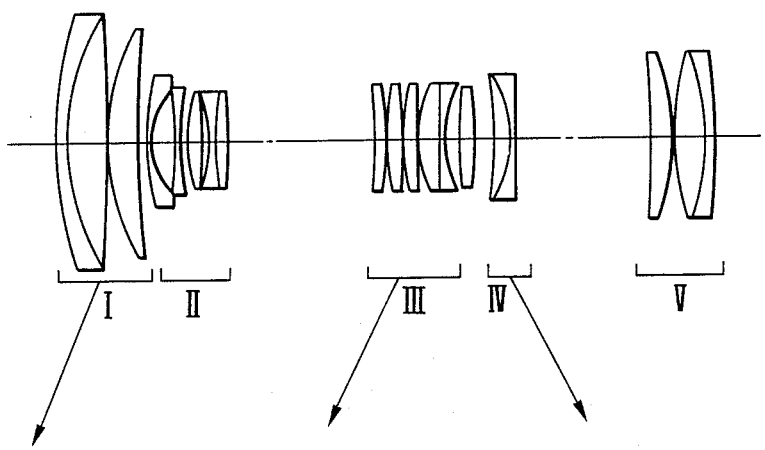
Figure 45A:
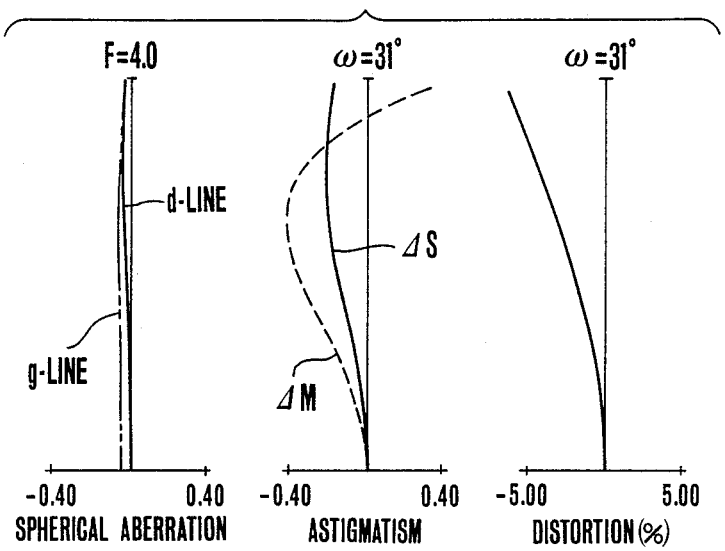
FIGS. 45(A) to 45(C) and 46(A) to 46(C) show the aberrations of the example 18 taking place for objects located at an infinity distance and at a distance of 3 m.
Figure 45B:
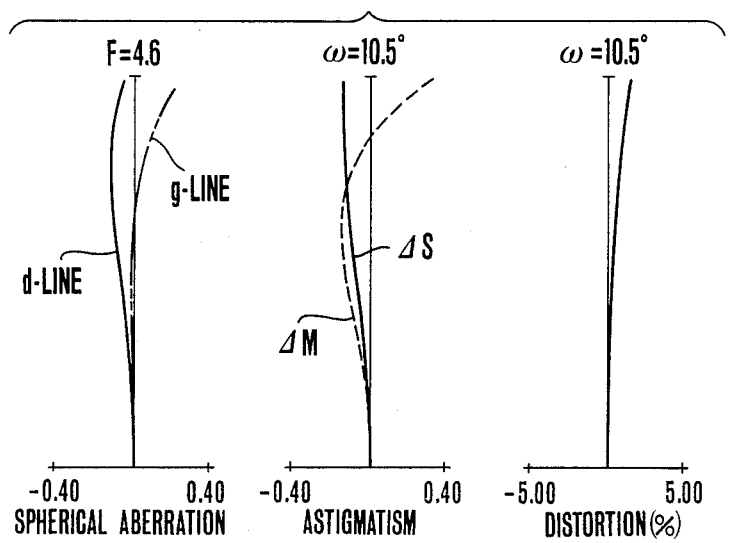
Figure 45C:
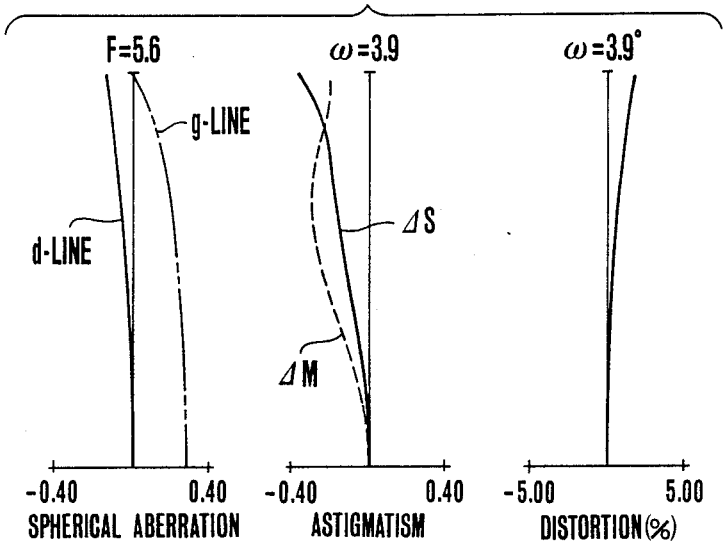
Figure 46A:
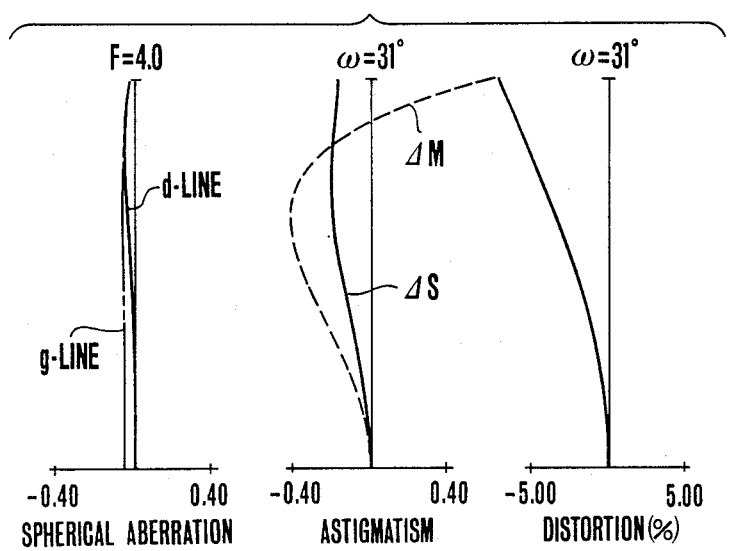
Figure 46B:
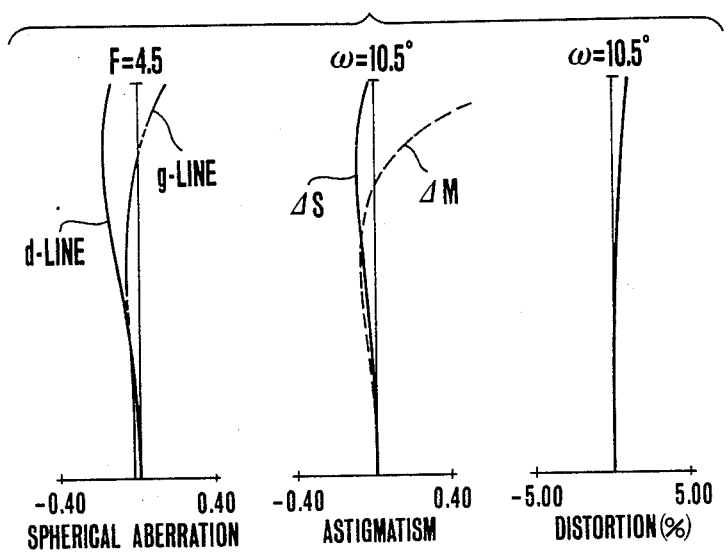
Figure 46C:
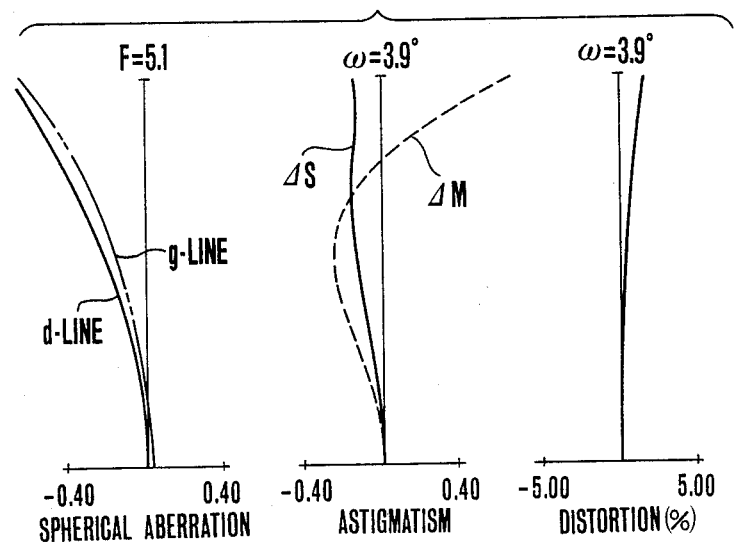
Figure 47A:
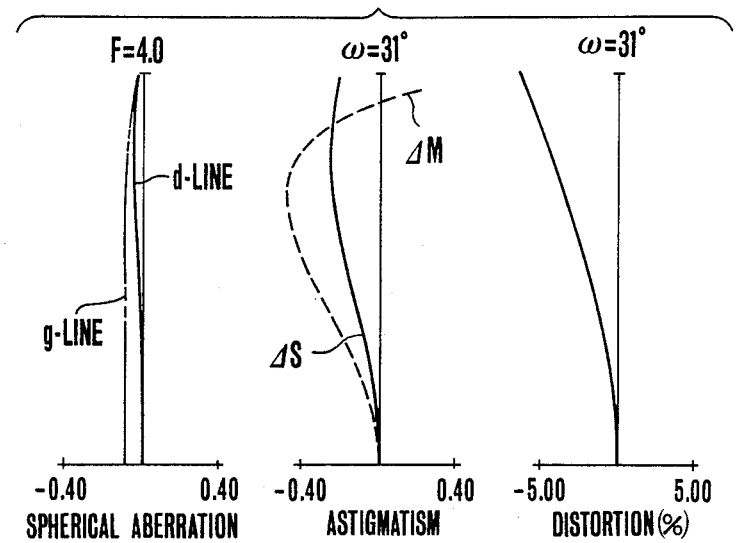
FIGS. 47(A) to 47(C) and 48(A) to 48(C) show the aberrations of the example 19 taking place for objects located at the infinity distance and at the distance of 3 m. Of these drawings.
Figure 47B:
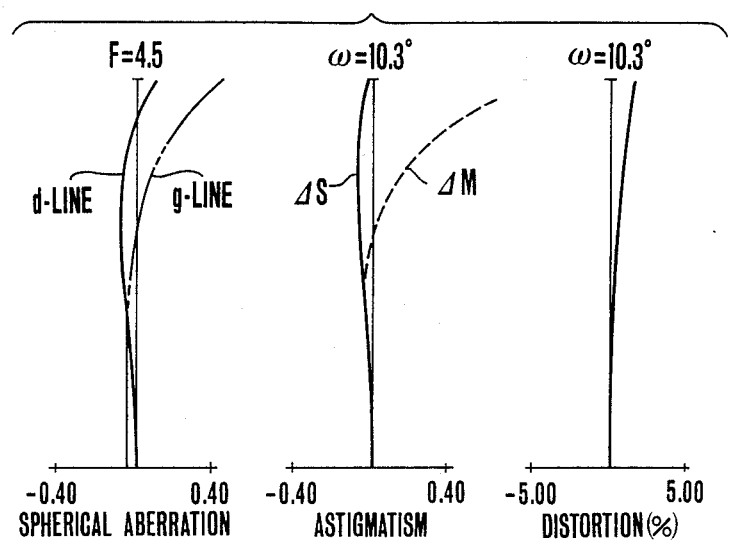
Figure 47C:
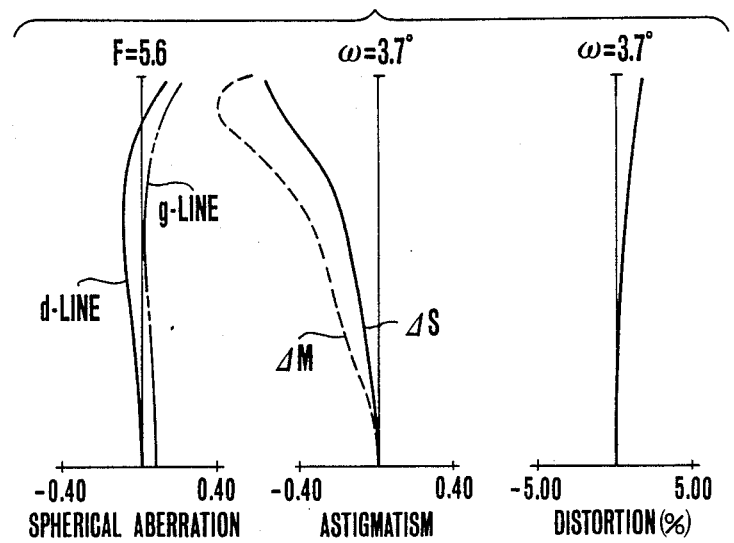
Figure 48A:
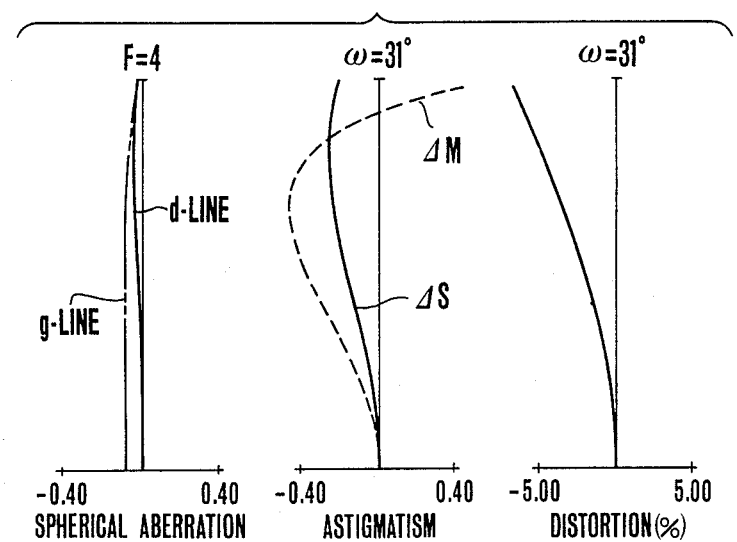
Figure 48B:
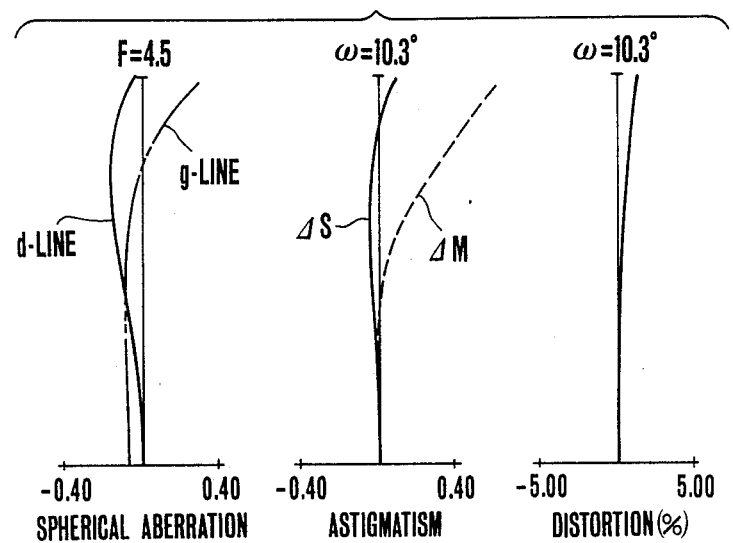
Figure 48C:
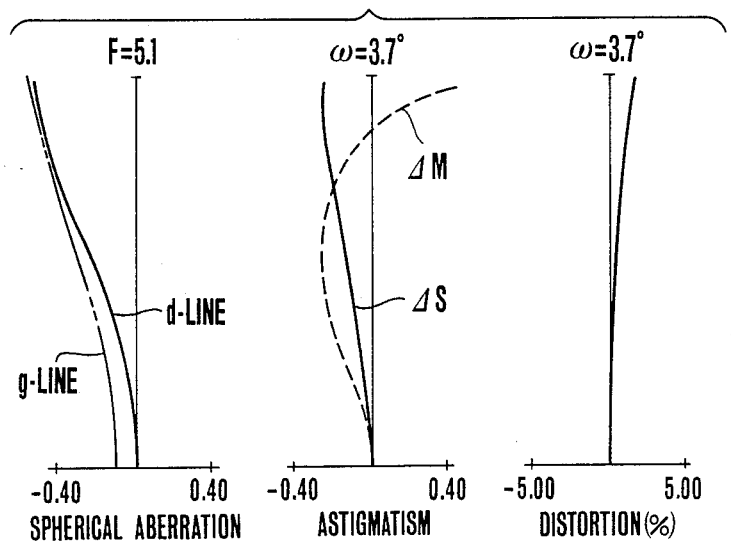

A further embodiment of this invention is arranged to have a less number of lens units shifted for maximum zooming. FIGS. 41 to 48 show the arrangement of this embodiment. Referring to FIG. 41, for example, zooming is performed with the second lens unit II and the fifth lens unit V left stationary. Focusing is performed by shifting the third lens unit toward the image side of the lens system.

As mentioned in the foregoing, the degree of defocus for one and the same object distance increases approximately in proportion to the square of the zooming ratio. In order to lessen a difference between the drawing-out or delivery extent of the focusing lens group obtained at the wide angle end and that of the focusing lens group obtained at the telephoto end, the sensitivity of the lens system must be arranged to increase accordingly as the position of the lens shifts from the wide angle end to the telephoto end for varying its power. Further, to attain the high power varying ratio of the zoom lens, the focusing lens group is preferably arranged also to increase the magnifying power. In view of this, this embodiment is arranged to have an image forming magnification βF which satisfies the following condition:

$$|\beta F| > 1$$

More specifically, the refracting powers of the lens units are allocated in such a manner that the focusing lens group is shifted toward an image surface in shifting the focus of the lens system from an infinity distance object to a near distance object.

In this embodiment, the fourth and fifth lens units are disposed closer to the image surface than the focusing lens group. The reason for this is as follows:

Assuming that the focal length of the lens group disposed closer to the object than the focusing lens group is f1B the focal length F of the whole lens system can be expressed as $$F = f1B \cdot \beta F \cdot Bi, \ Bi+1, \ Bx$$

In order to arrange a zoom lens to have a high power varying ratio, the sensitivity of the lens system must be arranged to be mechanically controllable for all the lens positions from the wide angle end to the telephoto end and the drawing-out or delivery extent of the focusing lens group must be minimized. In short, the zoom lens must be arranged to have no excessively large ratio between its sensitivity obtained at the wide angle end and its sensitivity obtained at the telephoto end. More specifically, in shifting the magnifying power by shifting the position of the zoom lens from the wide angle end to the telephoto end, the drawing-out extent of the focusing lens group for the same object distance must be arranged either to remain unvarying or to increase.

The upper limit of the power varying ratio of the focusing lens group is controlled by the above stated arrangement. In other words, in case where there is no lens unit on the image side of the focusing lens group, the power varying ratio of the lens group located on the object side of the focusing lens group must be arranged to have a greater power varying ratio. Therefore, it becomes necessary either to increase the extent to which the lens group on the object side of the focusing lens group is to be shifted for varying the power or to increase the number of lens units on that side. For this purpose, therefore, this embodiment has the fourth and fifth lens units disposed on the image side of the focusing lens group.

In the case of the above stated lens arrangement, the zoom lens is preferably arranged to satisfy the following condition, assuming that a focal length obtained at an arbitrary zooming point with the zoom lens focused on an infinity distance object by shifting the third lens unit is F, a focal length of the whole lens system obtained at the wide angle end is Fw and the image forming magnification of the third lens unit obtained at the above stated focal length F is βF and that there obtains a relation of Z = F/Fw:

$$0.65 < (\beta F^2 - 1)/\sqrt{Z} < 3.46 \tag{22}$$

The condition formula (22) defines the range within which the third lens unit is allowed to be drawn out in focusing at all the zooming points between the wide angle end and the telephoto end. If the image forming magnification βF becomes too much for the value Z with the upper limit value of the formula (22) exceeded, the sensitivity of the focusing lens group increases and the drawing-out extent of the lens group decreases. In that event, although the total lens length decreases, it becomes difficult to accurately perform mechanical control over the focusing lens group. Further, the refractive power of the third lens unit becomes weaker and the extent to which the third lens unit must be shifted for varying the power increases. This requires a wider space between the second and third lens units and thus results in an increase in the total lens length. In addition to that, the effective diameter of the first lens unit must be increased for the purpose of securing a given amount of an off-axial light flux.

Further, if the image forming magnification βF becomes too small for the value Z with the lower limit value of the condition formula (22) not reached, the sensitivity of the focusing lens group becomes lower thus requiring a larger drawing-out or delivery extent. This necessitates the zoom lens to have a wider space for shifting the lens group and thus results in an increase in the total lens length.

In order to further the high power varying ratio of this embodiment without impairing the high optical performance thereof, the zoom lens of the embodiment is preferably arranged to satisfy the following conditions, with the focal lengths of the first, second and third lens units assumed to be f1, f2 and f3, respectively, and the focal length of the whole lens system as obtained at the telephoto end to be FT:

$$0.22 < f1/FT < 0.6 \tag{23}$$

$$0.046 < |f2/FT| < 0.093 \tag{24}$$

$$1.8 < |f3/f2| < 3.0 \tag{25}$$

If the upper limit value which is defined by the condition formula (23) is exceeded, the refractive power of the first lens unit becomes too weak. In that event, in order to obtain a given power varying ratio, the shifting extent of the first lens unit must be increased. Then, as a result, the total lens length obtained at the telephoto end becomes longer. Besides, the extent to which the third and fourth lens units are to be shifted for a focusing operation becomes too short for adequate mechanical control over them.

If, on the other hand, the refractive power of the first lens unit becomes too strong with the lower limit value of the formula (23) not reached, the extent to which the third lens unit must be shifted for focusing comes to increase. This necessitates the lens system to have additional space arranged therein and thus increases the total lens lengths at both the wide angle end and the telephoto end.

The condition formula (24) pertains to the refractive power of the second lens unit and is chiefly aimed to reduce the size of the whole lens system while allowing the second lens unit to fully give its power varying effect for attaining a given power varying ratio. If the refractive power of the second lens unit becomes weak with the upper limit value of the formula (24) exceeded, the first lens unit must be shifted to a greater extent for attaining the given power varying ratio. Then, this not only increases the total lens length but also the effective diameter of the first lens unit. Besides, in order to attain the given power varying ratio, the third lens unit must be shifted to a greater extent. Therefore, a wider space must be arranged between the second and third lens units. Then, to secure a given amount of an off-axial light flux, the effective diameter of the first lens unit also must be increased.

If the refractive power of the second lens unit becomes too strong with the lower limit value of the formula (24) not reached, the Petzval sum increases in the negative direction to make it difficult to adequately maintain the image surface characteristic, although the total lens length can be shortened. Further, in that event, the second lens unit causes spherical aberration to a greater degree during the power varying process. Then, it becomes difficult to adequately correct the fluctuations of the spherical aberration.

The condition formula (25) pertains to the ratio of the refractive power of the third lens unit to the focal length of the second lens unit. If the upper limit value defined by the formula (25) is exceeded, the refractive power of the third lens unit becomes weak. In that event, for attaining a given power varying ratio, the variable degree of a space between the second and third lens units must be increased. This necessitates the lens system to have a wider space arranged between the second and third lens units. As a result, the total lens length increases accordingly. Meanwhile, in order to secure a given amount of an off-axial light flux, the effective diameter of the first lens unit also must be increased. Then, a space which obtains between the third and fourth lens units at the telephoto end increases to increase the total lens length at the telephoto end.

If the refractive power of the third lens unit becomes too strong with the lower limit value of the formula (25) not reached, the refractive powers of other lens units must be increased for the purpose of correcting aberrations. As a result, it becomes difficult to adequately keep the Petzval sum. Further, it also becomes difficult to adequate correct the fluctuations of aberration which take place in power varying.

Numerical examples 18 and 19 of this embodiment of the invention are as shown in the following: In the examples 18 and 19, a reference symbol Ri denotes the radius of curvature of a lens surface located in an i-th place as counted from the object side of the lens system; a symbol Di denotes the lens thickness and an air space located in the i-th place; and symbols Ni and $\nu$i denote the refractive index of glass and the Abbe number of a lens located in the i-th place, respectively.

Further, the relation of the above stated condition formulas to the various values of the numerical examples is as shown in Table-7.

NUMERICAL EXAMPLE 18

(FIGS. 41, 43, 45(A) to 45(C) and 46(A) to 46(C))

| F = 36 FNo = 1:4 — 5.6 2 = 62 — 7.8° | | | |
|---|---|---|---|
| R1 = 137.27 | D1 = 3.53 | N1 = 1.72047 | $\nu$1 = 34.7 |
| R2 = 67.50 | D2 = 12.06 | N2 = 1.49700 | $\nu$2 = 81.6 |
| R3 = −982.44 | D3 = 0.09 | | |
| R4 = 64.90 | D4 = 8.82 | N3 = 1.49700 | $\nu$3 = 81.6 |
| R5 = 350.65 | D5 = 2.1 − 39.2 − 60.9 | | |
| R6 = 82.19 | D6 = 2.0 | N4 = 1.88300 | $\nu$4 = 40.8 |
| R7 = 22.93 | D7 = 6.5 | | |
| R8 = −101.00 | D8 = 1.5 | N5 = 1.88300 | $\nu$5 = 40.8 |
| R9 = 69.56 | D9 = 1.8 | | |
| R10 = 45.33 | D10 = 4.0 | N6 = 1.84666 | $\nu$6 = 23.9 |
| R11 = −175.00 | D11 = 2.8 | | |
| R12 = −36.18 | D12 = 1.5 | N7 = 1.88300 | $\nu$7 = 40.8 |
| R13 = −89.43 | D13 = 4.0 | N8 = 1.84666 | $\nu$8 = 23.9 |
| R14 = −97.99 | D14 = 40.3 − 22.9 − 3.1 | | |
| R15 = −618.02 | D15 = 4.0 | N9 = 1.53256 | $\nu$9 = 45.9 |
| R16 = −90.34 | D16 = 0.1 | | |
| R17 = 126.34 | D17 = 4.0 | N10 = 1.53256 | $\nu$10 = 45.9 |
| R18 = −441.99 | D18 = 0.1 | | |
| R19 = 71.98 | D19 = 4.0 | N11 = 1.49388 | $\nu$11 = 66.1 |
| R20 = 607.37 | D20 = 0.1 | | |
| R21 = 42.15 | D21 = 4.0 | N12 = 1.51742 | $\nu$12 = 52.4 |
| R22 = 423.06 | D22 = 6.0 | N13 = 1.84666 | $\nu$13 = 23.9 |
| R23 = 40.13 | D23 = 3.5 | | |
| R24 = 208.89 | D24 = 4.5 | N14 = 1.75500 | $\nu$14 = 52.3 |
| R25 = −125.85 | D25 = 3.2 − 44.3 − 68.3 | | |
| R26 = −65.76 | D26 = 5.22 | N15 = 1.84666 | $\nu$15 = 23.9 |
| R27 = −30.58 | D27 = 1.57 | N16 = 1.88300 | $\nu$16 = 40.8 |
| R28 = −1143.97 | D28 = 30.6 − 7.0 − 2.8 | | |
| R29 = 4597.59 | D29 = 5.53 | N17 = 1.81600 | $\nu$17 = 46.6 |
| R30 = −65.08 | D30 = 1.01 | | |
| R31 = 116.34 | D31 = 9.06 | N18 = 1.49388 | $\nu$18 = 66.1 |
| R32 = −53.01 | D32 = 2.21 | N19 = 1.84666 | $\nu$19 = 23.9 |
| R33 = −188.91 | | | |

NUMERICAL EXAMPLE 19
(FIGS. 42, 44, 47(A) to 47(C) and 48(A) to 48(C))

| F = 35 FNo = 1:4 − 5.6 2ω = 62 − 7.4° | | | |
|---|---|---|---|
| R1 = 128.40 | D1 = 3.3 | N1 = 1.72047 | ν1 = 34.7 |
| R2 = 64.43 | D2 = 11.0 | N2 = 1.49700 | ν2 = 81.6 |
| R3 = −934.34 | D3 = 0.1 | | |
| R4 = 61.92 | D4 = 8.5 | N3 = 1.49700 | ν3 = 81.6 |
| R5 = 320.76 | D5 = 2.5<br>− 38.1 − 58.5 | | |
| R6 = 75.37 | D6 = 1.8 | N4 = 1.88300 | ν4 = 40.8 |
| R7 = 22.00 | D7 = 6.2 | | |
| R8 = −97.53 | D8 = 1.5 | N5 = 1.88300 | ν5 = 40.8 |
| R9 = 68.97 | D9 = 1.8 | | |
| R10 = 43.13 | D10 = 4.0 | N6 = 1.84666 | ν6 = 23.9 |
| R11 = −172.88 | D11 = 2.6 | | |
| R12 = −34.87 | D12 = 1.5 | N7 = 1.88300 | ν7 = 40.8 |
| R13 = 77.99 | D13 = 3.8 | N8 = 1.84666 | ν8 = 23.9 |
| R14 = −104.93 | D14 = 40.4<br>− 21.4 − 0.6 | | |
| R15 = −355.96 | D15 = 4.0 | N9 = 1.53256 | ν9 = 45.9 |
| R16 = −84.01 | D16 = 0.1 | | |
| R17 = 125.28 | D17 = 4.0 | N10 = 1.53256 | ν10 = 45.9 |
| R18 = −427.41 | D18 = 0.1 | | |
| R19 = 70.79 | D19 = 4.0 | N11 = 1.49388 | ν11 = 66.1 |
| R20 = 346.60 | D20 = 0.1 | | |
| R21 = 41.97 | D21 = 6.0 | N12 = 1.51742 | ν12 = 52.4 |
| R22 = 413.10 | D22 = 2.0 | N13 = 1.84666 | ν13 = 23.9 |
| R23 = 40.31 | D23 = 3.5 | | |
| R24 = 214.65 | D24 = 4.5 | N14 = 1.75500 | ν14 = 52.3 |
| R25 = −106.94 | D25 = 5.4<br>− 51.7 − 78.4 | | |
| R26 = −71.65 | D26 = 4.0 | N15 = 1.84666 | ν15 = 23.9 |
| R27 = −32.56 | D27 = 1.5 | N16 = 1.88300 | ν16 = 40.8 |
| R28 = −455.82 | D28 = 36.7<br>− 9.4 − 3.7 | | |
| R29 = −457.21 | D29 = 6.0 | N17 = 1.77250 | ν17 = 49.6 |
| R30 = −65.40 | D30 = 1.0 | | |
| R31 = 98.36 | D31 = 9.0 | N18 = 1.49388 | ν18 = 66.1 |
| R32 = −59.20 | D32 = 2.0 | N19 = 1.84666 | ν19 = 23.9 |
| R33 = −205.61 | | | |

TABLE-7

| | Condition | Numerical Example 18 | Numerical Example 19 |
|---|---|---|---|
| (22) $(\beta F2 - 1)/\sqrt{Z}$ | Wide Angle End | 1.25 | 1.25 |
| | Intermediate Point | 1.34 | 2.46 |
| | Telephoto End | 2.02 | 2.11 |
| (23) f1/FT | | 0.37 | 0.33 |
| (24) \|f2/FT\| | | 0.073 | 0.065 |
| (25) \|f3/f2\| | | 2.28 | 2.39 |

What is claimed is:

1. A zoom lens comprising, as counted from the object side of te lens, a first lens group having a positive refractive power, a second lens group having a negative refractive power, a third lens group having a positive refractive power, a fourth lens group having a negative refractive power and a fifth lens group having a positive refractive power, wherein, assuming that, when varying the magnifying power of said lens from a wide angle end to a telephoto end, an air space between an i-th lens unit and an i+1-th lens unit varies to a degree $\Delta Di$, said i-th lens unit has a focal length fi, the focal length of the whole lens system as obtained at the telephoto end is FT, and a space between said first and second lens units varies to a degree $\Delta E1$ between the wide angle end and the telephoto end, the following conditions are satisfied:

$\Delta D1 > 0$ $\Delta D2 < 0$ $\Delta D3 > 0$ $\Delta D4 < 0$ $0.046 < |f2/FT| < 0.093$ $0.22 < |f1/FT| < 0.6$ $2.1 < |\Delta E1 f2| < 3.6$ 2. A zoom lens according to claim 1, wherein, assuming that a space obtained between said second and third lens groups varies to a degree $\Delta E2$ between the wide angle end and the telephoto end, the following conditions are satisfied:

$1.8 < |f3/f2| < 3.0$ $3.2 < f4/f2 < 7.3$ $3.7 < |f5/f2| < 12$ $1.6 < \Delta E2/f2 < 3.4$ 3. A zoom lens according to claim 1, wherein focusing is effected by moving said third lens group.

4. A zoom lens according to claim 1, wherein focusing is effected by moving said fourth lens group.

5. A zoom lens according to claim 1, wherein focusing is effected by moving said third and fourth lens groups.

6. A zoom lens comprising, as counted from the object side of the lens, a first lens group having a positive refractive power, a second lens group having a negative refractive power, a third lens group having a positive refractive power, a fourth lens group having a negative refractive power and a fifth lens group having a positive refractive power, wherein the magnifying power variation from a wide end to a telephoto end is effected by increasing the space between said first lens group and second lens group and the space between said third lens group and fourth lens group while decreasing the space between said second lens group and third lens group and the space between said fourth lens group and fifth lens group and focusing is effected by shifting at least one of said third lens group and fourth lens group and said lens satisfies the condition of $1.5 < (\beta F^2 - 1)/z < 6.0$ wherein F represents a focal length of the whole lens system at any zooming position where focus is made on an infinite object, Fw represents a focal length of the whole lens system at the wide end, and $\beta F$ represents an overall image magnification of said third and fourth lens units at the focal length F, and Z=F/Fw.

7. A zoom lens according to claim 6, wherein said third and fourth lens groups move at the time of focusing.

8. A zoom lens according to claim 6, wherein said third lens group move at the time of focusing.

9. A zoom lens according to claim 6, wherein said fourth lens group move at the time of focusing.

10. A zoom lens according to claim 9, wherein, assuming that the image forming magnifications of said fourth lens group obtained at the wide angle end when focusing on an object located at an infinity distance is $\beta 4w$, the following condition is satisfied:

$$0.1 < |\beta 4w| < 1$$

11. A zoom lens according to claim 10, wherein assuming that the image forming magnification of said fourth lens group obtained at the telephoto end when focusing on an infinity distance object is $\beta 4t$, the following condition is satisified:

$$0 < \beta 4T/\beta 4w < 1$$

12. A zoom lens according to claim 6, wherein, assuming that the focal lengths of said first, second and third lens groups are f1, f2 and f3, respectively, and that the focal length of the whole lens system obtained at the telephoto end is FT, the following conditions are satisfied:

$$0.22 < f1/FT < 0.6$$

$$0.046 < |f2/FT < 0.093$$

$$1.8 < |f3/f2| < 3.0$$

13. A zoom lens according to claim 12, wherein, assuming that the focal lengths of said first, second and third lens group are f1, f2 and f3, respectively, and that the focal length of the whole lens system obtained at the telephoto end is FT, the following conditions are satisified:

$$0.22 < f1/FT < 0.6$$

$$0.046 < |f2/FT| < 0.093$$

$$1.8 < |f3/f2| < 3.0$$

14. A zoom lens according to claim 6, wherein said second lens group and said third lens group are stationary.

* * * * *

UNITED STATES PATENT AND TRADEMARK OFFICE
CERTIFICATE OF CORRECTION

PATENT NO. : 4,896,950

DATED : January 30, 1990

INVENTOR(S) : Hiroshi Endo, et al.

It is certified that error appears in the above-identified patent and that said Letters Patent is hereby corrected as shown below:

COLUMN 3:

Line 40, "locate" should read --located--.

Line 59, "term" should read --terms--.

Line 60, "ns" should read --and--.

COLUMN 10:

Numerical Example 4

"R20 32 43.21" should read --R20=43.21--.

COLUMN 12:

Line 56, "ia" should read --is--.

COLUMN 16:

Line 21, "ether" should read --either--.

COLUMN 17:

Line 22, "come" should read --comes--

UNITED STATES PATENT AND TRADEMARK OFFICE
CERTIFICATE OF CORRECTION

PATENT NO. : 4,896,950
DATED : January 30, 1990
INVENTOR(S) : Hiroshi Endo, et al.

It is certified that error appears in the above-identified patent and that said Letters Patent is hereby corrected as shown below:

COLUMN 18:

Numerical Example 9

"$\sqrt{7}\ 23.9$" should read --$\sqrt{7}=23.9$--.

COLUMN 21:

Numerical Example 11

"N3 = 1,49700" should read --N3 = 1.49700--.

Numerical Example 12

"N2 = 1.72047" should read --N1 = 1.72047--.

"n14 = 1.88300" should read --N14 = 1.88300--.

COLUMN 24:

Line 10, "difficult" should read --difficult.--

UNITED STATES PATENT AND TRADEMARK OFFICE
CERTIFICATE OF CORRECTION

PATENT NO. : 4,896,950
DATED : January 30, 1990
INVENTOR(S) : Hiroshi Endo, et al.

It is certified that error appears in the above-identified patent and that said Letters Patent is hereby corrected as shown below:

COLUMN 27:

Numerical Example 15

"$2\omega = 62 - 62 - 7.2°$" should read --$2\omega = 62 - 7.2°$--.

COLUMN 28:

Numerical Example 16

"$F = 39.8 -$" should read --$F = 39.8 - 340$--.

"$- 47.16\ 72.87$" should read --- $47.16 - 72.87$--.

COLUMN 29:

Numerical Example 16

"$F = 39.8 -$" should read --$F = 39.8 - 340$--.

"$R21 = -26.36\ \ D\ 22 = 1.5\ \ N13 = 1.88300$" should read
--$R21 = -46.58\ \ D21 = 4.0\ \ N12 = 1.80518$--.

UNITED STATES PATENT AND TRADEMARK OFFICE
CERTIFICATE OF CORRECTION

PATENT NO. : 4,896,950           Page 4 of 5

DATED : January 20, 1990

INVENTOR(S) : Hiroshi Endo, et al.

It is certified that error appears in the above-identified patent and that said Letters Patent is hereby corrected as shown below:

Table 6

"-0.113" should read --0.13--.

COLUMN 34:

Line 18, "adequate" should read --adequately--.

COLUMN 35:

Line 53, "of te" should read --of the--.

COLUMN 36:

changing ""$2.1<|\Delta E_1 f2|<3.6$" to --$2.1<|\Delta E1/f2|<3.6$--.

COLUMN 37:

Line 15, "$1.5<(\beta F^2-1)/z<6.0$" should read --$1.5<(\beta F^2-1)/Z<6.0$--.

UNITED STATES PATENT AND TRADEMARK OFFICE
CERTIFICATE OF CORRECTION

PATENT NO. : 4,896,950

DATED : January 20, 1990

INVENTOR(S) : Hiroshi Endo, et al.

It is certified that error appears in the above-identified patent and that said Letters Patent is hereby corrected as shown below:

<u>COLUMN 37</u>:

Line 30, "magnifications" should read --magnification--

Line 36, "move" should read --moves--.

Line 38, "move" should read --moves--.

<u>COLUMN 38</u>:

Line 1, "wherein" should read --wherein,--.

Line 4, "ß4t," should read --ß4T,--.

Signed and Sealed this

Thirty-first Day of March, 1992

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,896,950

Page 1 of 5

DATED : January 30, 1990

INVENTOR(S) : Hiroshi Endo, et al.

It is certified that error appears in the above-identified patent and that said Letters Patent is hereby corrected as shown below:

COLUMN 3:

Line 40, "locate" should read --located--.

Line 59, "term" should read --terms--.

Line 60, "ns" should read --and--.

COLUMN 10:

Numerical Example 4

"R20 32 43.21" should read --R20=43.21--.

COLUMN 12:

Line 56, "ia" should read --is--.

COLUMN 16:

Line 21, "ether" should read --either--.

COLUMN 17:

Line 22, "come" should read --comes--

UNITED STATES PATENT AND TRADEMARK OFFICE
CERTIFICATE OF CORRECTION

PATENT NO. : 4,896,950
DATED : January 30, 1990
INVENTOR(S) : Hiroshi Endo, et al.

It is certified that error appears in the above-identified patent and that said Letters Patent is hereby corrected as shown below:

COLUMN 18:

Numerical Example 9

"$\sqrt{}$ 7 23.9" should read --$\sqrt{7}$=23.9--.

COLUMN 21:

Numerical Example 11

"N3 = 1,49700" should read --N3 = 1.49700--.

Numerical Example 12

"N2 = 1.72047" should read --N1 = 1.72047--.

"n14 = 1.88300" should read --N14 = 1.88300--.

COLUMN 24:

Line 10, "difficult" should read --difficult.--

UNITED STATES PATENT AND TRADEMARK OFFICE
CERTIFICATE OF CORRECTION

PATENT NO. : 4,896,950

DATED : January 30, 1990

INVENTOR(S) : Hiroshi Endo, et al.

It is certified that error appears in the above-identified patent and that said Letters Patent is hereby corrected as shown below:

COLUMN 27:

Numerical Example 15

"$2\omega = 62 - 62 - 7.2°$" should read --$2\omega = 62 - 7.2°$--.

COLUMN 28:

Numerical Example 16

"$F = 39.8 -$" should read --$F = 39.8 - 340$--.

"$- 47.16\ 72.87$" should read --- $47.16 - 72.87$--.

COLUMN 29:

Numerical Example 16

"$F = 39.8 -$" should read --$F = 39.8 - 340$--.

"$R21 = -26.36\ \ D\ 22 = 1.5\ \ N13 = 1.88300$" should read
--$R21 = -46.58\ \ D21 = 4.0\ \ N12 = 1.80518$--.

UNITED STATES PATENT AND TRADEMARK OFFICE
CERTIFICATE OF CORRECTION

PATENT NO. : 4,896,950

DATED : January 30, 1990

INVENTOR(S) : Hiroshi Endo, et al.

It is certified that error appears in the above-identified patent and that said Letters Patent is hereby corrected as shown below:

Table 6

"-0.113" should read --0.13--.

COLUMN 34:

Line 18, "adequate" should read --adequately--.

COLUMN 35:

Line 53, "of te" should read --of the--.

COLUMN 36:

Line 45, "$2.1<|\Delta E1f2|<3.6$" should read --$2.1<|\Delta E1|f2|<3.6$--.

COLUMN 37:

Line 14, "$1.5<(\beta F^2-1)/z<6.0$" should read --$1.5<(\beta F^2-1)/Z<6.0$--.

UNITED STATES PATENT AND TRADEMARK OFFICE
CERTIFICATE OF CORRECTION

PATENT NO. : 4,896,950

DATED : January 30, 1990

INVENTOR(S) : Hiroshi Endo, et al.

It is certified that error appears in the above-identified patent and that said Letters Patent is hereby corrected as shown below:

COLUMN 37:

Line 30, "magnifications" should read --magnification--

Line 36, "move" should read --moves--.

Line 38, "move" should read --moves--.

COLUMN 38:

Line 1, "wherein" should read --wherein,--.

Line 4, "ß4t," should read --ß4T,--.

This certificate supersedes the Certificate of Correction issued on March 31, 1992.

Signed and Sealed this

Second Day of March, 1993

Attest:

STEPHEN G. KUNIN

*Attesting Officer*  *Acting Commissioner of Patents and Trademarks*